US012722741B2

(12) United States Patent
Vezina et al.

(10) Patent No.: US 12,722,741 B2
(45) Date of Patent: Sep. 1, 2026

(54) SNOWMOBILE HAVING A CONTINUOUSLY VARIABLE TRANSMISSION

(71) Applicant: BOMBARDIER RECREATIONAL PRODUCTS INC., Valcourt (CA)

(72) Inventors: Sebastien Vezina, Sherbrooke (CA); Anne-Marie Dion, Granby (CA); Emilien Demers, Racine (CA); Nicolas Bedard, Granby (CA); Felix Labonte, Roxton Pond (CA); Jean-Sebastien Pard, Tingwick (CA); Rene Lemieux, Granby (CA); Xavier-Pierre Aitcin, St-Hyacinthe (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 487 days.

(21) Appl. No.: 18/262,748

(22) PCT Filed: Jan. 31, 2022

(86) PCT No.: PCT/IB2022/050830
§ 371 (c)(1),
(2) Date: Jul. 25, 2023

(87) PCT Pub. No.: WO2022/162638
PCT Pub. Date: Aug. 4, 2022

(65) Prior Publication Data

US 2024/0400157 A1 Dec. 5, 2024

Related U.S. Application Data

(60) Provisional application No. 63/175,143, filed on Apr. 15, 2021, provisional application No. 63/143,559, filed on Jan. 29, 2021.

(51) Int. Cl.
*B62M 27/02* (2006.01)

(52) U.S. Cl.
CPC ....... *B62M 27/02* (2013.01); *B62M 2027/023* (2013.01)

(58) Field of Classification Search
CPC ........................ B62M 27/02; B62M 2027/023
See application file for complete search history.

(56) References Cited

U.S. PATENT DOCUMENTS 3,613,811 A 10/1971 Brandli et al.
5,900,595 A 5/1999 Akima et al.
(Continued)

FOREIGN PATENT DOCUMENTS

CA 2925822 A1 10/2017
EP 2952383 A1 12/2015
(Continued)

OTHER PUBLICATIONS

International Search Report of PCT/IB2021/050830; Harry Kim; Apr. 12, 2022.
(Continued)

*Primary Examiner* — Kevin Hurley
(74) *Attorney, Agent, or Firm* — BCF LLP

(57) ABSTRACT

A snowmobile includes: a frame including a tunnel; a rear suspension assembly connected to the frame and disposed beneath the tunnel; an endless track supported by the rear suspension assembly; a motor supported by the frame and operatively connected to the endless track; a drive shaft driven by the motor, a driven shaft operatively connected to the 5 endless track; and a continuously variable transmission (CVT) operatively connecting the drive shaft to the endless track, the CVT comprising: a drive pulley mounted to the drive shaft, the drive pulley being operatively connected to the motor via the drive shaft; a driven pulley mounted to the driven shaft, the driven shaft operatively connecting the driven pulley to the endless track; a belt operatively con-
(Continued)

necting the drive and driven pulleys; and a CVT 0 housing having a rigid mounting portion connected to the frame and to the motor. Other aspects are also contemplated.

19 Claims, 71 Drawing Sheets

(56) References Cited

U.S. PATENT DOCUMENTS

| | | | | |
|---|---|---|---|---|
| 6,032,754 | A | 3/2000 | Izumi et al. | |
| 6,321,864 | B1 | 11/2001 | Forbes | |
| 6,783,579 | B2 | 8/2004 | Pettipiece | |
| 6,852,151 | B2 | 2/2005 | Bloomer | |
| 7,246,611 | B2 | 7/2007 | Mashiko | |
| 7,410,182 | B1 | 8/2008 | Giese et al. | |
| 7,533,749 | B1 | 5/2009 | Sampson et al. | |
| 8,733,773 | B2 | 5/2014 | Sampson | |
| 10,344,719 | B1 | 7/2019 | Wald et al. | |
| 11,110,994 | B2 | 9/2021 | Hedlund et al. | |
| 11,359,555 | B1 | 6/2022 | Reichardt et al. | |
| 2001/0040064 | A1 | 11/2001 | Girouard et al. | |
| 2006/0080958 | A1 | 4/2006 | Anthon | |
| 2010/0108427 | A1 | 5/2010 | Richer | |
| 2012/0178562 | A1 | 7/2012 | Monfette et al. | |
| 2013/0220259 | A1 | 8/2013 | Ozaki et al. | |
| 2017/0241326 | A1 | 8/2017 | Vezina et al. | |
| 2018/0128218 | A1 | 5/2018 | Ohta et al. | |
| 2018/0340498 | A1 | 11/2018 | Nakao | |
| 2019/0299882 | A1 | 10/2019 | Lecointre et al. | |
| 2021/0086869 | A1* | 3/2021 | Aitcin | B62M 27/02 |
| 2021/0188383 | A1 | 6/2021 | Rhodes et al. | |
| 2024/0400157 | A1* | 12/2024 | Vezina | F16H 57/035 |
| 2025/0065982 | A1* | 2/2025 | Vezina | B62M 9/08 |

FOREIGN PATENT DOCUMENTS

| | | | |
|---|---|---|---|
| EP | 3354545 | A1 | 8/2018 |
| WO | 2019123432 | A1 | 6/2019 |

OTHER PUBLICATIONS

International Search Report of PCT/IB2021/050828; Harry Kim; Jun. 8, 2022.

* cited by examiner 10
13
34
500L
500H
549
90
91
59
33
30
37
45
27
47
41
29
24
49
51
22
32
16
39
BW
TW
FSW
17
60
12
35

312
362
324
335
316
337
318
326
342
364
328
322
310
360
336
365
350
325
346
355
320
354
AF1
348
AF2
325
340
352
357
336
310
356
344
337

500L
502
506
507
508
510
512
514
516
518
520
522
524
526
528
532
540
542
544
545
546
547
548
552
560
561
562
564
565
566
574
576
578

SNOWMOBILE HAVING A CONTINUOUSLY VARIABLE TRANSMISSION

CROSS-REFERENCE

The present application claims priority from U.S. Provisional Patent Application No. 63/143,559, filed Jan. 29, 2021, and U.S. Provisional Patent Application No. 63/175,143, filed Apr. 15, 2021, the entirety of each of which is incorporated by reference herein.

TECHNICAL FIELD

The present technology relates to snowmobiles, and particularly to continuously variable transmissions for snowmobiles.

BACKGROUND

A snowmobile's engine is operatively connected to an endless track of the snowmobile to propel the snowmobile. Different transmission components are connected between the engine and the endless track to control a speed and torque applied at the endless track. Namely, a continuously variable transmission (CVT) is typically connected to the engine and provides a variable transmission ratio.

The components of the CVT, namely a drive pulley, a driven pulley and a transmission belt interconnecting the pulleys, can be subjected to much stress during use and thus generate a significant amount of heat. The heat generated by these components can be detrimental thereto, particularly in the case of the transmission belt. Therefore an efficient heat management solution is desirable to cool these components and prevent decreased efficiency or even failure of these components. This is even further exacerbated in high-powered snowmobiles as well as in the case of snowmobiles that are used at or near their maximum rated power for lengthy periods of time (e.g., snowmobiles travelling in deep snow).

In addition, during use, a snowmobile's engine can emit a significant amount of noise which, in some cases, can be a nuisance if not properly controlled. While a snowmobile's exhaust system includes a muffler to reduce and/or modulate the noise emitted therethrough, the snowmobile's air intake system also typically emits noise that travels "upstream" through the air intake system and exits through an air inlet thereof. To address this issue, the air intake system can be designed to provide expansion chambers whereby sound waves can expand therein so that the noise output of the air intake system is reduced. However, while providing expansion chambers can help reduce the noise output, it can also create air flow restrictions and thereby negatively affect air flow through the air intake system which can ultimately reduce the efficiency of the engine.

Comfort and ease of use is also an important consideration when designing snowmobiles. For instance, a driver's mobility while getting off the snowmobile should be made easy.

Furthermore, snowmobiles can be used in different types of conditions. Notably, while snowmobiles are often used to ride along trails, snowmobiles can also be used in deep snow conditions that present a large accumulation of snow through which a snowmobile must navigate. In some cases, a snowmobile may be less performant and harder to manoeuvre when operating in deep snow conditions. Also, the snowmobile is subject to a larger of accumulation of snow thereon and, in some cases, removal of the snow from the snowmobile can be difficult and laborious.

Lastly, proper illumination by the snowmobile's headlight system is particularly important after sunset. However, the headlight system's design may be limited by the relative narrow dimensions of the snowmobile and the bulky configuration of the headlight units. In addition, in some cases, cold temperatures can negatively affect the headlight system, reducing visibility provided thereby.

Therefore, there is a need for a snowmobile that addresses at least some of these drawbacks.

SUMMARY

It is an object of the present technology to ameliorate at least some of the inconveniences present in the prior art.

In accordance with an aspect of the present technology, there is provided a snowmobile including: a frame including a tunnel; a driver seat supported by the frame; a rear suspension assembly connected to the frame, the rear suspension assembly being disposed at least partly beneath the tunnel; an endless track supported by the rear suspension assembly; a motor supported by the frame, the motor being operatively connected to the endless track for propulsion of the snowmobile; a drive shaft driven by the motor; a driven shaft operatively connected to the endless track; and a continuously variable transmission (CVT) operatively connecting the drive shaft to the endless track, the CVT comprising: a drive pulley mounted to the drive shaft, the drive pulley being operatively connected to the motor via the drive shaft; a driven pulley mounted to the driven shaft, the driven shaft operatively connecting the driven pulley to the endless track; a belt operatively connecting the drive pulley to the driven pulley; and a CVT housing enclosing the drive pulley, the driven pulley and the belt, the CVT housing having a rigid mounting portion connected to the frame and to the motor.

In some embodiments, the rigid mounting portion defines an opening, the driven shaft extending into the CVT housing through the opening.

In some embodiments, the rigid mounting portion is connected to the tunnel.

In some embodiments, the rigid mounting portion is made of a metallic material.

In some embodiments, the motor is resiliently connected to the rigid mounting portion to allow movement of the motor relative to the CVT housing.

In some embodiments, the rigid mounting portion comprises at least one outer flange; the motor has at least one transmission mount for connecting the CVT housing thereto; and the snowmobile further comprises at least one interconnecting member connected between the at least one transmission mount and the at least one outer flange of the rigid mounting portion.

In some embodiments, the snowmobile further comprises at least one damping element for resiliently connecting the rigid mounting portion of the CVT housing to the motor, each damping element of the at least one damping element being disposed between a corresponding one of the at least one transmission mount and the at least one outer flange of the rigid mounting portion.

In some embodiments, each damping element of the at least one damping element is made of elastomeric material.

In some embodiments, the drive shaft is an output shaft of the motor; the motor is an internal combustion engine comprising: a crankcase; a crankshaft disposed in the crankcase; a cylinder block connected to the crankcase and defining at least one cylinder; and the output shaft operatively connected to the crankshaft; and the crankcase comprises the at least one transmission mount.

In some embodiments, the CVT housing comprises a back plate assembly defining a first opening and a second opening, the drive shaft and the driven shaft extending into the CVT housing through the first and second openings respectively; the back plate assembly comprises at least two separate plate members connected to one another, one of the at least two separate plate members being the rigid mounting portion; and the rigid mounting portion defines at least one of the first opening and the second opening.

In some embodiments, the rigid mounting portion is made of a different material than other ones of the at least two separate plate members.

In some embodiments, each of the at least two separate plate members other than the rigid mounting portion is made of non-metallic material.

In some embodiments, the at least two separate plate members includes a first plate member, a second plate member and the rigid mounting portion; the first plate member defines the first opening through which the drive shaft extends into the CVT housing; and the rigid mounting portion defines the second opening through which the driven shaft extends into the CVT housing.

In some embodiments, the motor is disposed on a first lateral side of the CVT; the back plate assembly is disposed on the first lateral side of the CVT; and the CVT housing further comprises a housing cover connected to the back plate assembly, the housing cover being disposed on a second lateral side of the CVT opposite the first lateral side.

In some embodiments, the CVT housing defines an air inlet and an air outlet.

In some embodiments, the drive pulley is rotatable about a drive shaft axis defined by the drive shaft; the driven pulley is rotatable about a driven shaft axis defined the driven shaft; and the driven shaft axis is disposed vertically higher than the drive shaft axis.

In some embodiments, the CVT housing further comprises a removable cover connected to the back plate assembly; and the drive pulley, the driven pulley and the belt are enclosed between the back plate assembly and the removable cover.

In some embodiments, the CVT housing further comprises a peripheral guard enclosed between the back plate assembly and the removable cover, the peripheral guard surrounding at least in part the belt of the CVT.

In some embodiments, the CVT housing defines an air inlet and an air outlet; the peripheral guard defines at least in part the air outlet; and the removable cover defines at least in part the air inlet.

In some embodiments, the CVT housing further comprises an intermediate cover enclosed between the back plate assembly and the removable cover, the drive pulley being disposed between the intermediate cover and the fixed assembly.

In some embodiments, the CVT housing further comprises an acoustic member enclosed between the back plate assembly and the removable cover, the acoustic member being made of acoustic material to dampen noise emitted by the CVT, the acoustic member being at least partly vertically aligned with the drive pulley and the driven pulley.

In some embodiments, the CVT housing defines a drive opening, the drive shaft extending into the CVT housing through the drive opening; and the CVT further comprises a sealing member connected to the CVT housing and covering at least in part the drive opening, the sealing member surrounding a part of the motor extending through the drive opening to form a seal between the CVT housing and the part of the motor, the sealing member being configured to allow relative movement between the CVT housing and the motor.

In some embodiments, the drive shaft is an output shaft of the motor; the drive pulley is mounted to the output shaft and moves together with the motor relative to the CVT housing; and the driven pulley moves together with the CVT housing relative to the motor.

In some embodiments, during operation, the CVT housing is fixed relative to the frame.

In some embodiments, the sealing member is a flexible sealing member.

In some embodiments, the sealing member is made of an elastomeric material.

In some embodiments, the sealing member is disposed at least in part in the drive opening.

In some embodiments, the drive shaft is an output shaft of the motor; the motor is an internal combustion engine comprising: a crankcase; a crankshaft disposed in the crankcase; a cylinder block connected to the crankcase and defining at least one cylinder; and the output shaft operatively connected to the crankshaft; and the part of the motor surrounded by the sealing member is a portion of the crankcase through which the output shaft extends from the crankcase.

According to another aspect of the present technology, there is provided a snowmobile comprising: a frame; a driver seat supported by the frame; a left footrest and a right footrest; a rear suspension assembly connected to the frame; an endless track supported by the rear suspension assembly; a motor supported by the frame, the motor being operatively connected to the endless track for propulsion of the snowmobile; a drive shaft driven by the motor; a driven shaft operatively connected to the endless track; and a continuously variable transmission (CVT) operatively connecting the drive shaft to the endless track, the CVT comprising: a drive pulley mounted to the drive shaft, the drive pulley being operatively connected to the motor via the drive shaft; a driven pulley mounted to the driven shaft, the driven shaft operatively connecting the driven pulley to the endless track; a belt operatively connecting the drive pulley to the driven pulley; and a CVT housing enclosing the drive pulley, the driven pulley and the belt, the CVT housing defining: an air inlet for allowing ambient air into the CVT housing; and a plurality of air outlets for discharging heated air from the CVT housing, the plurality of air outlets including: a first air outlet disposed at a lower portion of the CVT housing; and a second air outlet disposed at an upper portion of CVT housing such that the second air outlet is disposed vertically higher than the first air outlet.

In some embodiments, the first air outlet is positioned to discharge heated air near one of the left footrest and the right footrest to heat a driver's foot supported by the one of the left footrest and the right footrest.

In some embodiments, the driven pulley comprises a plurality of fins for pulling air into the CVT housing through the air inlet in response to the driven pulley being driven.

In some embodiments, at least part of the air inlet is vertically aligned with the driven pulley; and at least part of the first air outlet is vertically aligned with the drive pulley.

In some embodiments, the air inlet and the second air outlet are disposed closer to the driven pulley than to the drive pulley.

In some embodiments, the first air outlet is disposed closer to the drive pulley than to the driven pulley.

In some embodiments, the drive pulley is rotatable about a drive shaft axis defined by the drive shaft; the driven pulley is rotatable about a driven shaft axis defined the driven shaft; and the driven shaft axis is disposed vertically higher than the drive shaft axis.

In some embodiments, the CVT housing has an upper half and a lower half; the drive shaft axis extends through the lower half; the driven shaft axis extends through the upper half; the air inlet is defined by the upper half; and the first air outlet is defined by the lower half.

In some embodiments, the second air outlet is defined by the upper half.

In some embodiments, the second air outlet is positioned vertically higher than the air inlet.

In some embodiments, the CVT housing has an upper end, the second air outlet being defined by the upper end.

In some embodiments, the first air outlet is positioned on a rear side of the CVT housing in order for heated air discharged through the first air outlet to be directed generally rearwardly.

In some embodiments, the air inlet is positioned on a rear side of the CVT housing.

In some embodiments, the air inlet is a first air inlet, the CVT housing defining a second air inlet for allowing ambient air into the CVT housing, the second air inlet being disposed adjacent to the first air inlet.

In some embodiments, during operation, when the driven pulley is not rotating, at least a majority of heated air is discharged from the CVT housing through the second air outlet.

In some embodiments, during operation, when the driven pulley is rotating, at least a majority of heated air is discharged from the CVT housing through the first air outlet.

In some embodiments, during operation: an upper end of the driven pulley rotates away from the air inlet; and a lower end of the drive pulley rotates toward the first air outlet.

In some embodiments, the CVT housing comprises: a fixed assembly; and a removable cover connected to the fixed assembly, the drive pulley, the driven pulley and the belt being enclosed between the fixed assembly and the removable cover.

In some embodiments, the CVT housing further comprises a peripheral guard enclosed between the fixed assembly and the removable cover, the peripheral guard surrounding at least in part the belt of the CVT.

In some embodiments, the peripheral guard defines at least in part the second air outlet; and the removable cover defines at least in part the air inlet.

In some embodiments, the CVT housing further comprises an intermediate cover enclosed between the fixed assembly and the removable cover, the drive pulley being disposed between the intermediate cover and the fixed assembly.

In some embodiments, the CVT housing further comprises an acoustic member enclosed between the fixed assembly and the removable cover, the acoustic member being made of acoustic material to dampen noise emitted by the CVT, the acoustic member being at least partly vertically aligned with the drive pulley and the driven pulley.

In some embodiments, the CVT housing defines a drive opening, the drive shaft extending into the CVT housing through the drive opening; and the CVT further comprises a sealing member connected to the CVT housing and covering at least in part the drive opening, the sealing member surrounding a part of the motor extending through the drive opening to form a seal between the CVT housing and the part of the motor, the sealing member being configured to allow relative movement between the CVT housing and the motor.

According to another aspect of the present technology, there is provided a snowmobile comprising: a frame; a driver seat supported by the frame; a left footrest and a right footrest; a rear suspension assembly connected to the frame; an endless track supported by the rear suspension assembly; a motor supported by the frame, the motor being operatively connected to the endless track for propulsion of the snowmobile; a drive shaft driven by the motor; a driven shaft operatively connected to the endless track; and a continuously variable transmission (CVT) operatively connecting the drive shaft to the endless track, the CVT comprising: a drive pulley mounted to the drive shaft, the drive pulley being operatively connected to the motor via the drive shaft; a driven pulley mounted to the driven shaft, the driven shaft operatively connecting the driven pulley to the endless track; a belt operatively connecting the drive pulley to the driven pulley; and a CVT housing having a first lateral side, a second lateral side, and a peripheral wall extending between the first and second lateral sides, the first lateral side, the second lateral side and the peripheral wall defining together an internal volume of the CVT housing, the drive pulley, the driven pulley and the belt being disposed within the internal volume of the CVT housing, the CVT housing defining: an air inlet for allowing ambient air into the CVT housing; and an air outlet for discharging heated air from the CVT housing, the air outlet being positioned to discharge heated air near the left footrest.

In some embodiments, the CVT housing comprises: a fixed assembly; and a removable cover connected to the fixed assembly, the drive pulley, the driven pulley and the belt being enclosed between the fixed assembly and the removable cover.

In some embodiments, the CVT housing further comprises a peripheral guard enclosed between the fixed assembly and the removable cover, the peripheral guard surrounding at least in part the belt of the CVT.

In some embodiments, the removable cover defines at least in part the air inlet and the air outlet.

In some embodiments, the CVT housing further comprises an intermediate cover enclosed between the fixed assembly and the removable cover, the drive pulley being disposed between the intermediate cover and the fixed assembly.

In some embodiments, the CVT housing further comprises an acoustic member enclosed between the fixed assembly and the removable cover, the acoustic member being made of acoustic material to dampen noise emitted by the CVT, the acoustic member being at least partly vertically aligned with the drive pulley and the driven pulley.

In some embodiments, the CVT housing is disposed on a left side of the engine.

In some embodiments, the CVT housing extends vertically higher than the engine.

In some embodiments, the snowmobile further comprises: at least one ski; and at least one front suspension assembly connecting the at least one ski to the frame; and the CVT housing is disposed rearwardly of the at least one front suspension assembly.

In some embodiments, the snowmobile further comprises a steering assembly including a handlebar; and at least a majority of the CVT housing is disposed forwardly of the handlebar.

In some embodiments, the frame includes a tunnel having a left side surface facing generally leftwardly and a right side surface facing generally rightwardly; and a plane containing the left side surface of the tunnel extends through the CVT housing.

In some embodiments, the CVT housing is disposed forwardly of the drive seat.

In some embodiments, the CVT housing defines a drive opening, the drive shaft extending into the CVT housing through the drive opening; and the CVT further comprises a sealing member connected to the CVT housing and covering at least in part the drive opening, the sealing member surrounding a part of the motor extending through the drive opening to form a seal between the CVT housing and the part of the motor, the sealing member being configured to allow relative movement between the CVT housing and the motor.

According to another aspect of the present technology, there is provided a snowmobile comprising: a frame; a driver seat supported by the frame; a rear suspension assembly connected to the frame; an endless track supported by the rear suspension assembly; a motor supported by the frame, the motor being operatively connected to the endless track for propulsion of the snowmobile; a drive shaft driven by the motor; a driven shaft operatively connected to the endless track; and a continuously variable transmission (CVT) operatively connecting the drive shaft to the endless track, the CVT comprising: a drive pulley mounted to the drive shaft, the drive pulley being operatively connected to the motor via the drive shaft; a driven pulley mounted to the driven shaft, the driven shaft operatively connecting the driven pulley to the endless track; a belt operatively connecting the drive pulley to the driven pulley; and a CVT housing enclosing the drive pulley, the driven pulley and the belt, the CVT housing comprising: a fixed assembly; and a removable cover removably toollessly connected to the fixed assembly.

In some embodiments, the CVT housing further comprises: at least one quick-release fastener selectively connecting the removable cover to the fixed assembly, the at least one quick-release fastener being movable by a user between a locked position in which the at least one quick-release fastener engages the fixed assembly and an unlocked position in which the at least one quick-release fastener disengages the fixed assembly.

In some embodiments, the CVT housing further comprises a peripheral guard enclosed between the fixed assembly and the removable cover, the peripheral guard surrounding at least in part the belt of the CVT.

In some embodiments, the CVT housing further comprises an intermediate cover enclosed between the fixed assembly and the removable cover, the drive pulley being disposed between the intermediate cover and the fixed assembly.

In some embodiments, the CVT housing further comprises an acoustic member enclosed between the fixed assembly and the removable cover, the acoustic member being made of acoustic material to dampen noise emitted by the CVT, the acoustic member being at least partly vertically aligned with the drive pulley and the driven pulley.

In some embodiments, the CVT housing defines an air inlet and an air outlet; the peripheral guard defines at least in part the air outlet; and the removable cover defines at least in part the air inlet.

In some embodiments, the CVT housing defines a drive opening, the drive shaft extending into the CVT housing through the drive opening; and the CVT further comprises a sealing member connected to the CVT housing and covering at least in part the drive opening, the sealing member surrounding a part of the motor extending through the drive opening to form a seal between the CVT housing and the part of the motor, the sealing member being configured to allow relative movement between the CVT housing and the motor.

For purposes of this application, terms related to spatial orientation when referring to the vehicle orientation and positioning of its components such as forwardly, rearwardly, left, and right are as they would normally be understood by a driver of the vehicle sitting thereon in a normal riding position.

Embodiments of the present technology each have at least one of the above-mentioned aspects, but do not necessarily have all of them.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
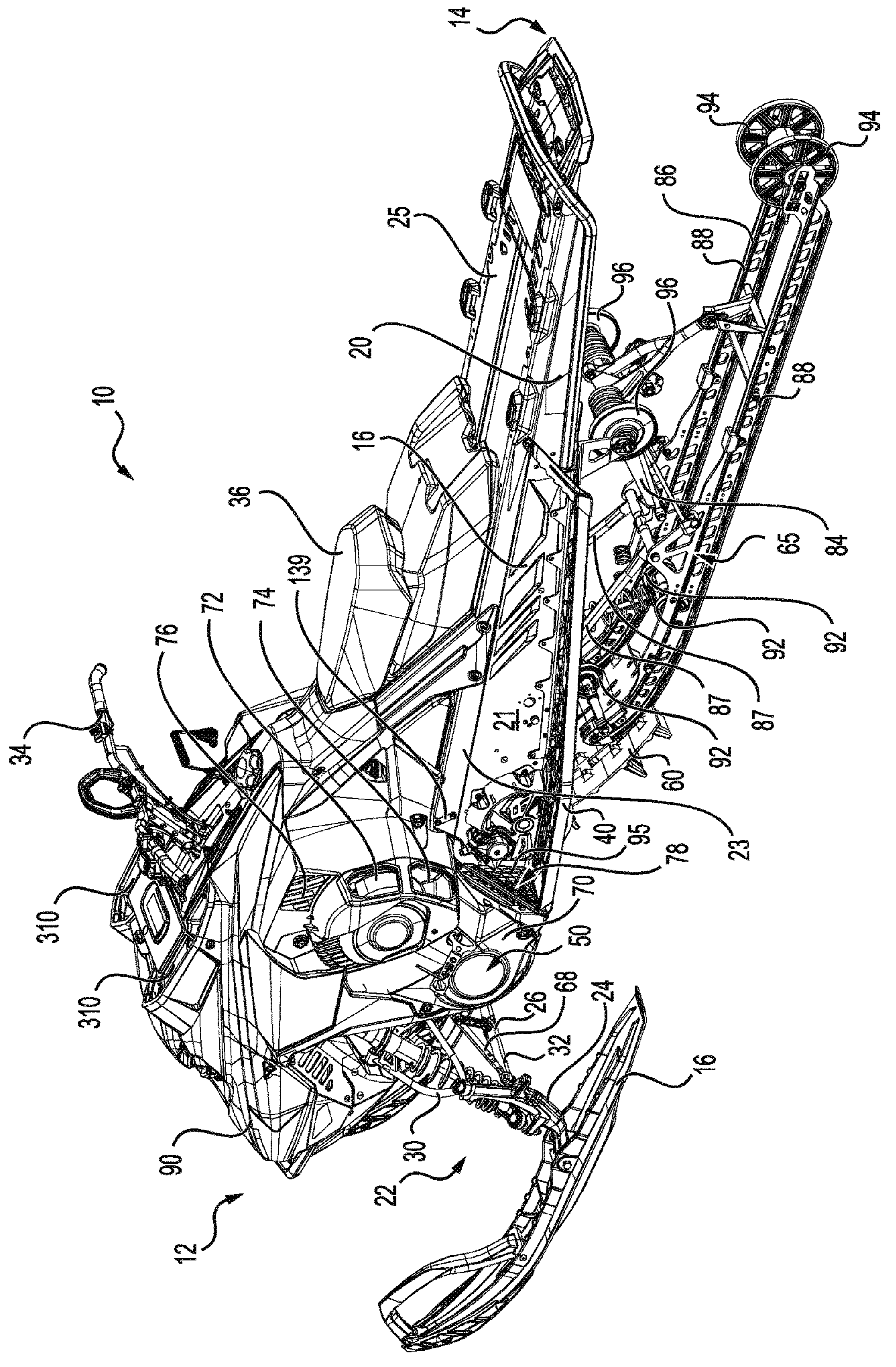
FIG. 1 is a perspective view, taken from a top, rear, left side, of a snowmobile according to an embodiment of the present technology.

With reference to FIGS. 1 to 4, a snowmobile 10 in accordance with an embodiment of the present technology will be described herein. The snowmobile 10 has a front end 12 and a rear end 14, which are defined consistently with the forward travel direction of the snowmobile 10. The snowmobile 10 has a frame 16, including a tunnel 20, for supporting the various components of the snowmobile 10. The tunnel 20 has left and right side surfaces 21 that extend generally longitudinally and face generally leftward and rightward respectively. The tunnel 20 also has left and right beveled surfaces 23 that extend between a top surface 25 of the tunnel 20 and the left and right side surfaces 21.

The snowmobile 10 has a ski and steering assembly including left and right skis 18 (FIG. 3) positioned at the front end 12 of the snowmobile 10 and connected to a front portion 17 of the frame 16 through left and right front suspension assemblies 22. Left and right ski legs 24, also referred to as spindles, are connected to the left and right skis 18 respectively and extend upwardly therefrom. As best shown in FIG. 1, the ski legs 24 are also operatively connected to a steering column 28 (shown schematically in FIG. 2A) via a respective steering link 68. At its upper end, the steering column 28 is attached to a handlebar 34 which is positioned forward of a driver to rotate the ski legs 24 and thus the skis 18, in order to steer the snowmobile 10.

Each of the front suspension assemblies 22 operatively connects a corresponding one of the ski legs 24 to the frame 16. In this embodiment, the left front suspension assembly 22 is a mirror image of the right front suspension assembly 22 and therefore only the right front suspension assembly 22 will be described in detail herein. It is to be understood that the same description applies to the left front suspension assembly 22.

With reference to FIGS. 1 to 4, in this embodiment, the front suspension assembly 22 includes two supporting arms 26 connected between the front portion 17 of the frame 16 and the corresponding ski leg 24. A shock absorber 33 is connected between the frame 16 and one of the supporting arms 26 to dampen shocks to which the snowmobile 10 is subjected during use. In this embodiment, the supporting arms 26 of the front suspension assembly 22 include an upper A-arm 30 and a lower A-arm 32 disposed vertically lower than the upper A-arm 30. The shock absorber 33 is connected between the lower A-arm 32 and the front portion 17 of the frame 16.

Figure 2A:
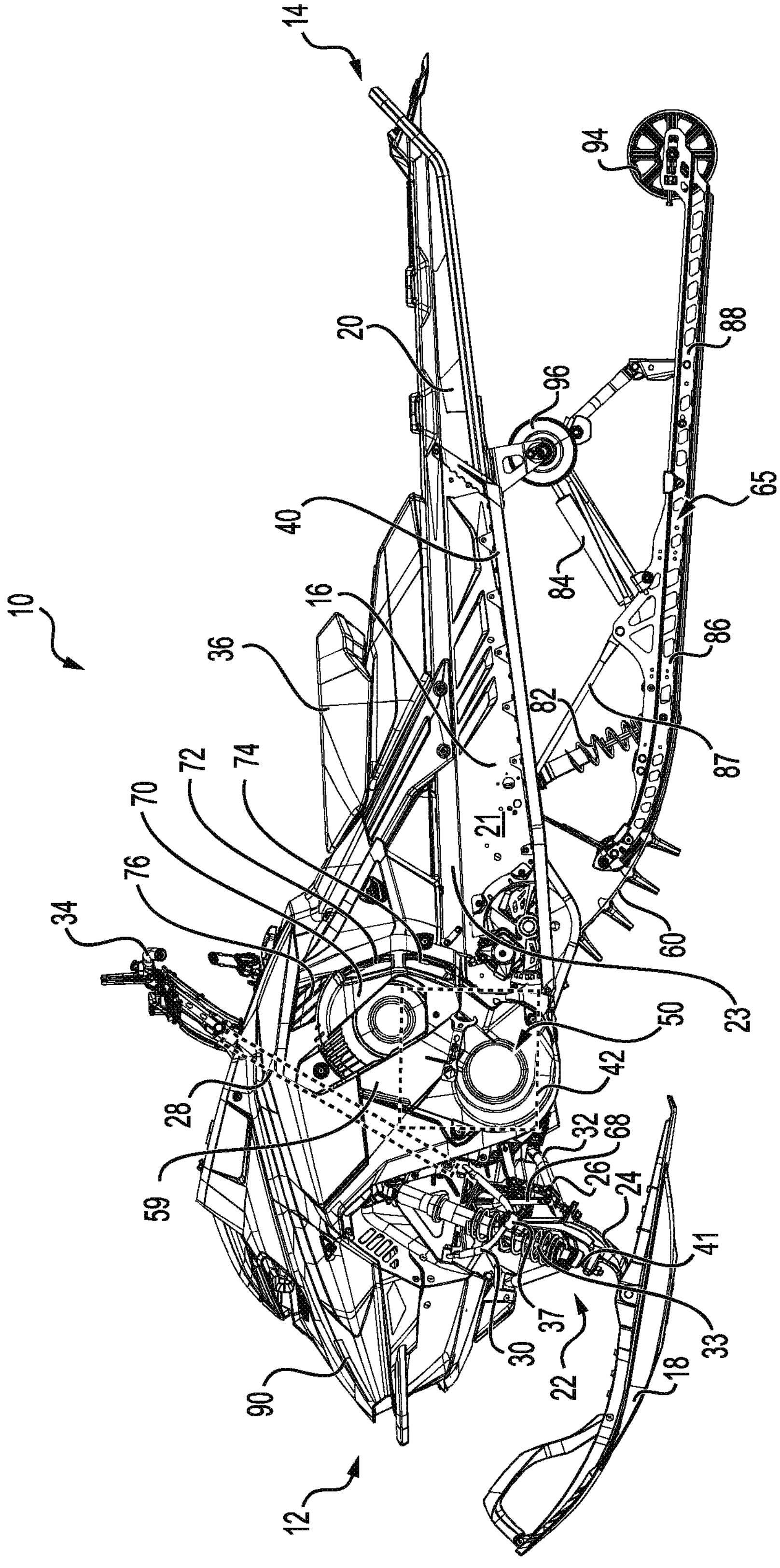
FIG. 2A is a left side elevation view of the snowmobile of FIG. 1.
Figure 2B:
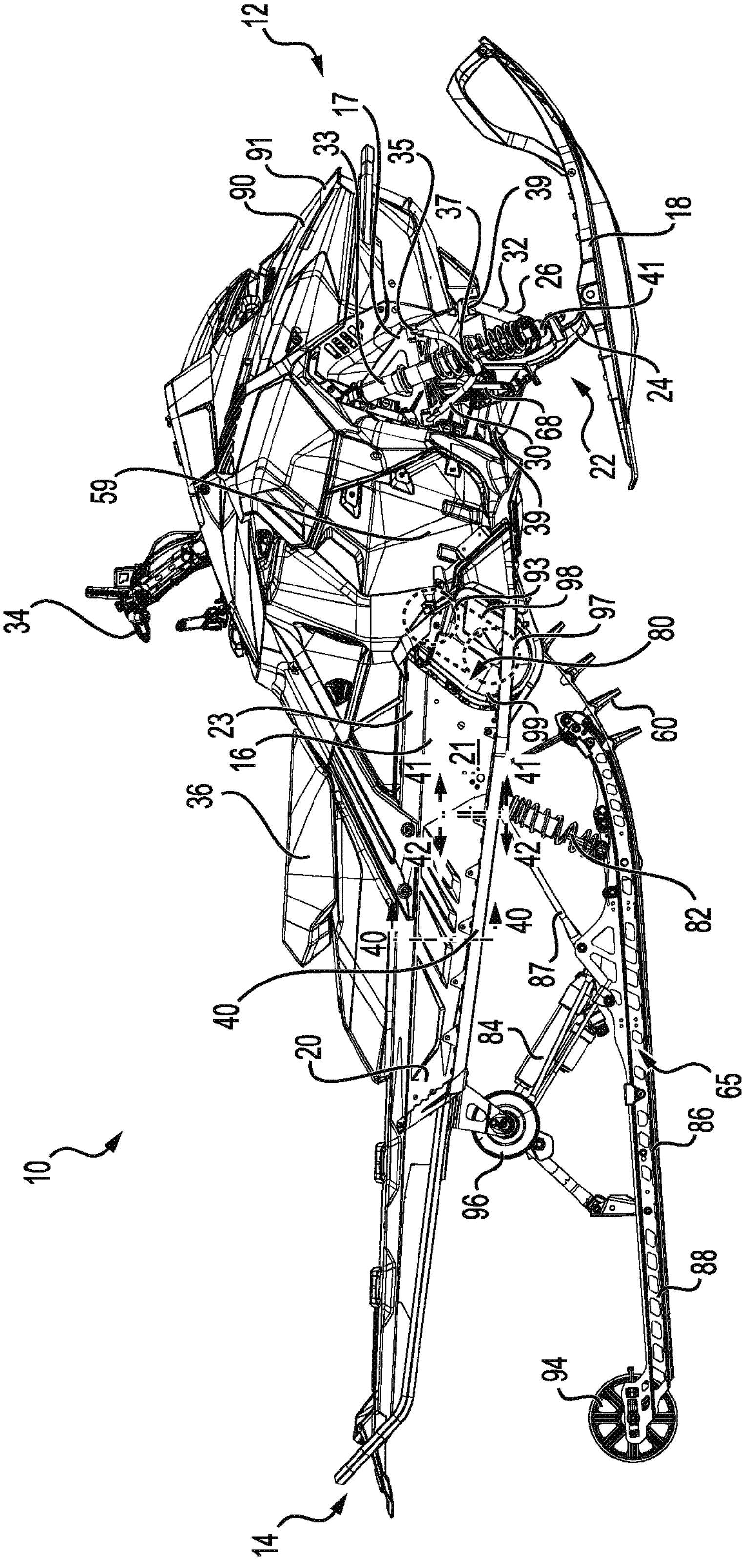
FIG. 2B is a right side elevation view of the snowmobile of FIG. 1.
Figure 3:
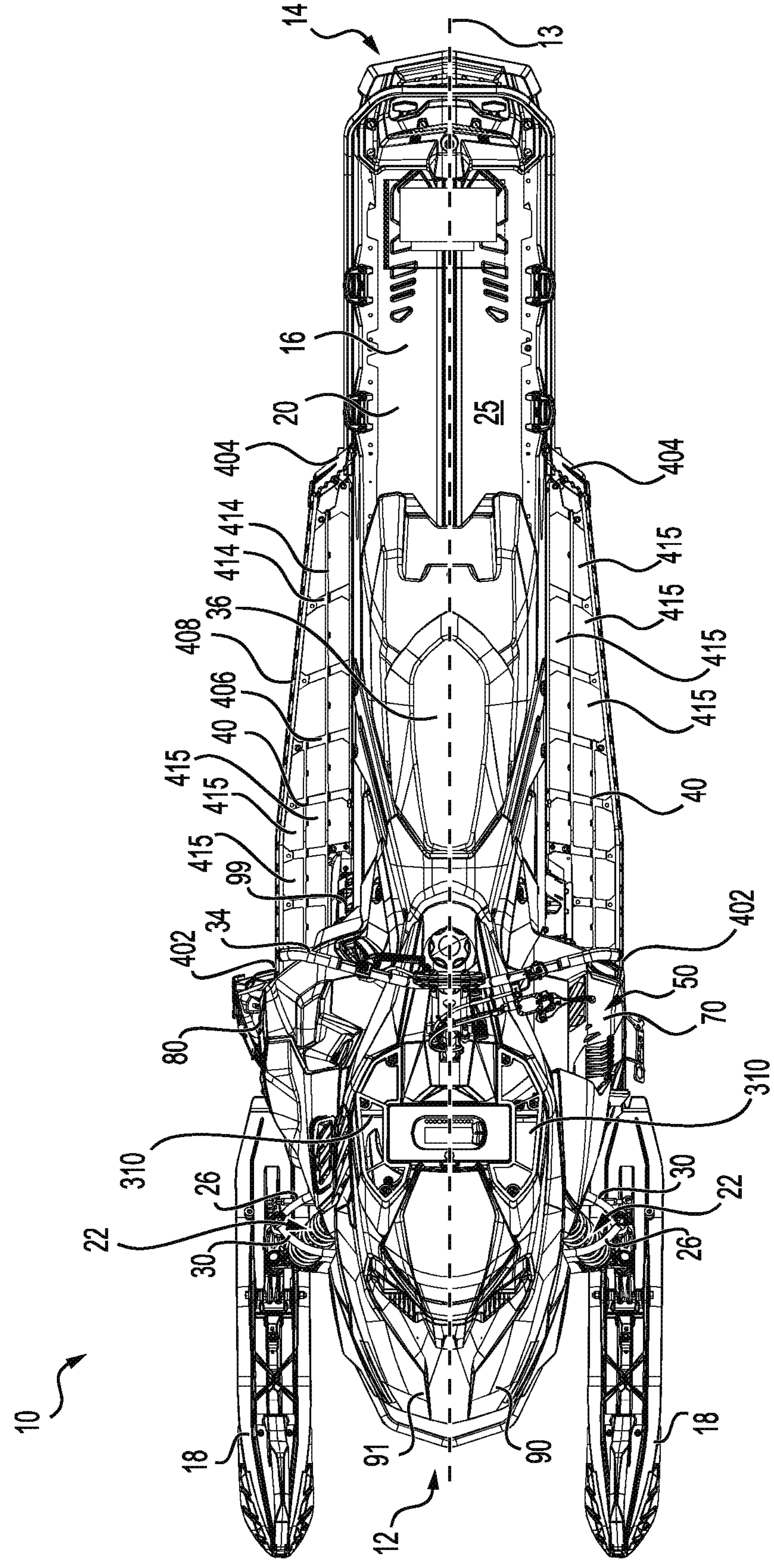
FIG. 3 is a top plan view of the snowmobile of FIG. 1.
Figure 4:
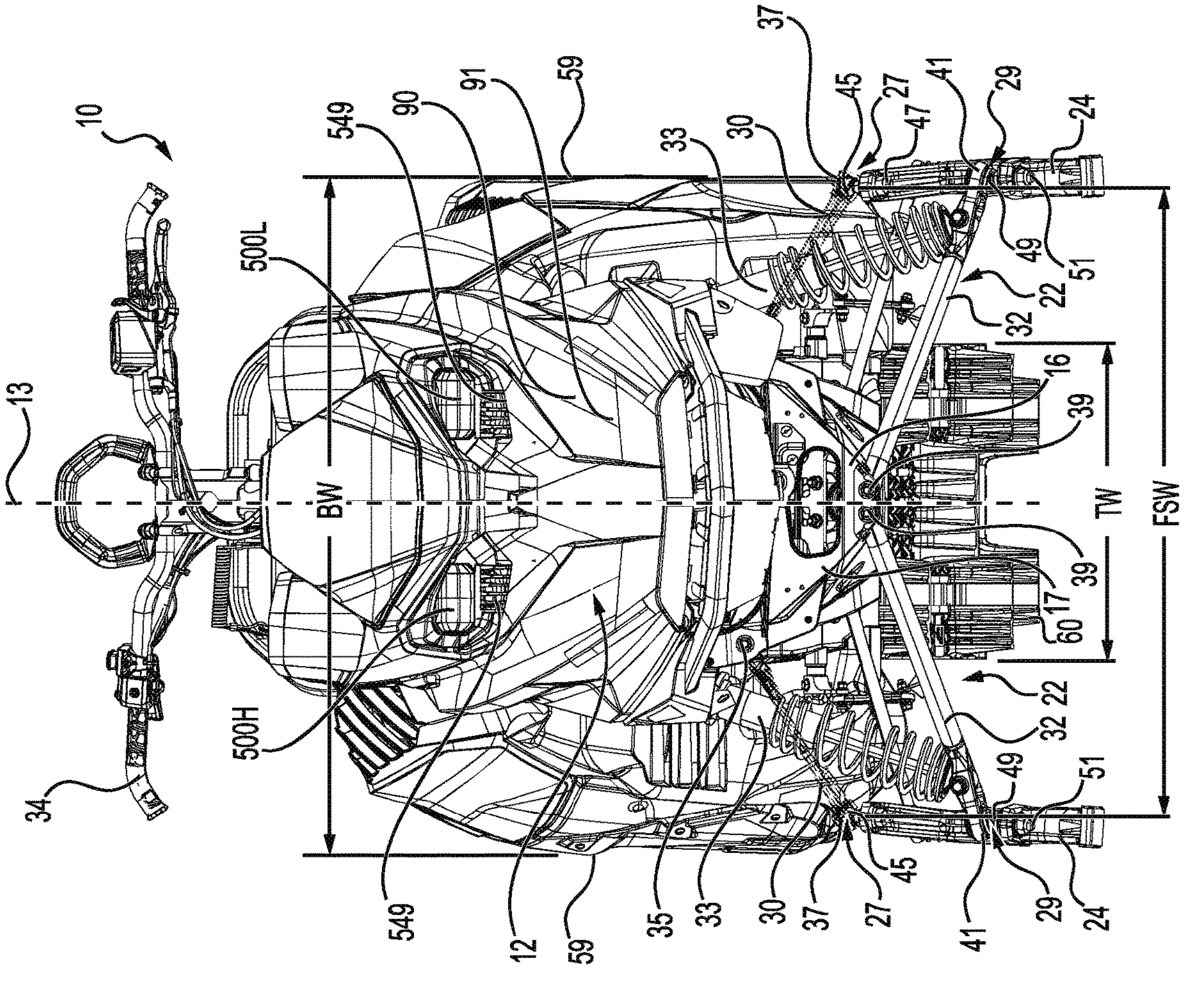
FIG. 4 is a front elevation view of the snowmobile of FIG. 1, with skis thereof removed and a front fairing removed to expose connections between a front right suspension assembly and a frame of the snowmobile.
Figure 5:
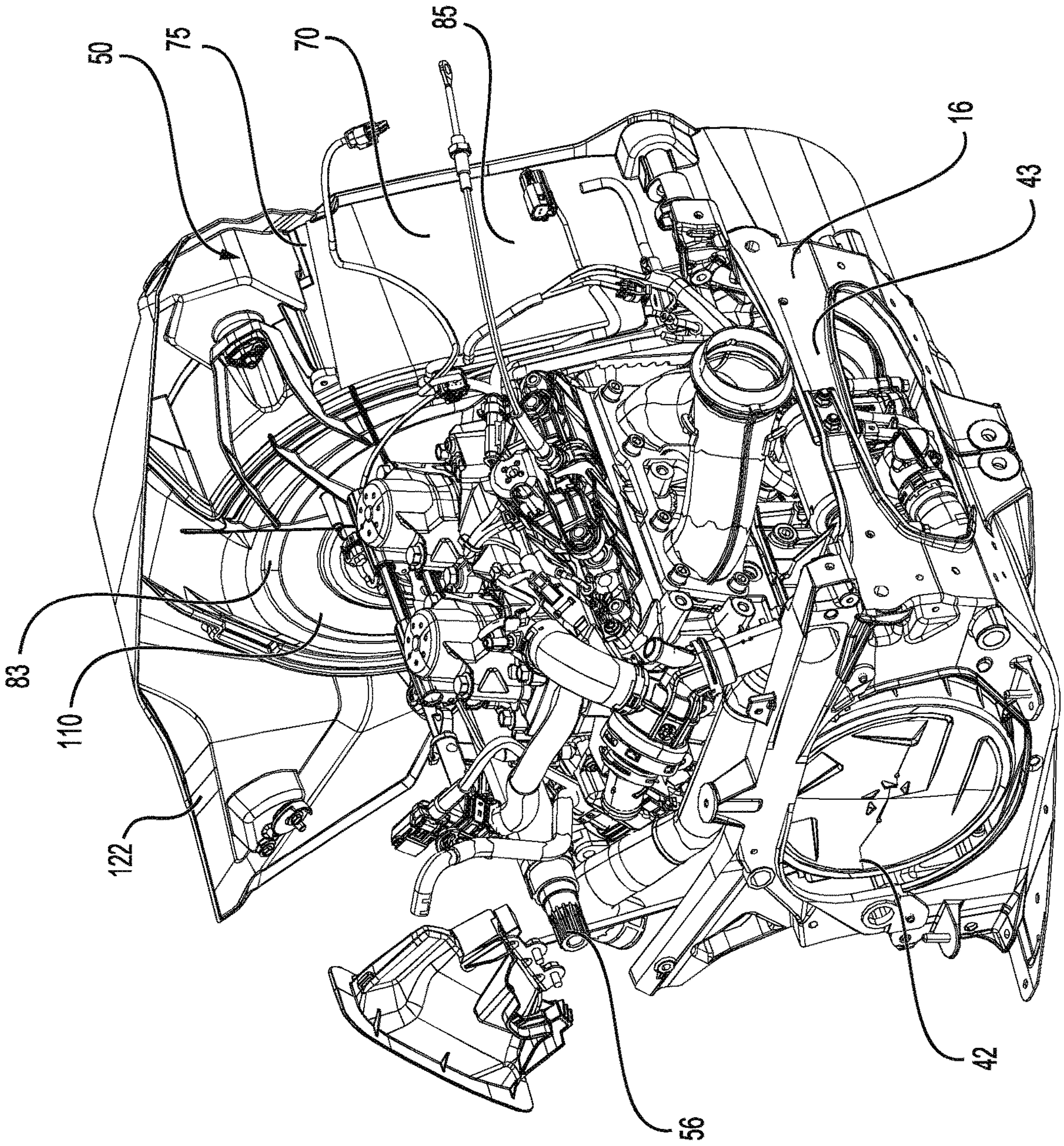
FIG. 5 is a perspective view, taken from a top, front, right side, of part of the snowmobile of FIG. 1, including an engine, a continuously variable transmission (CVT) and part of a frame of the snowmobile.
Figure 6:
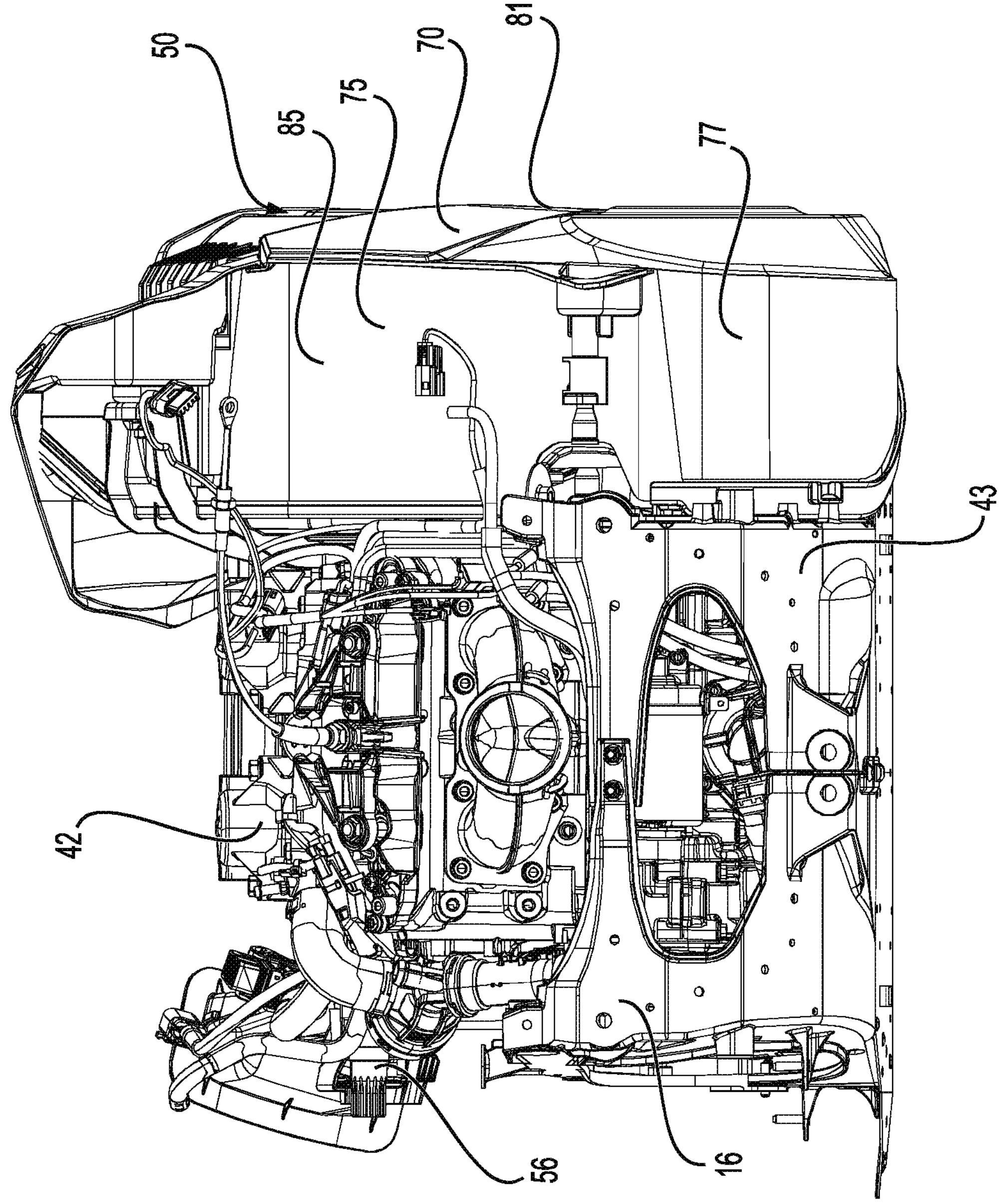
FIG. 6 is a front elevation view of the part of the snowmobile of FIG. 5.

As shown in FIG. 2B, the upper A-arm 30 has two inner lateral ends that are connected to the front portion 17 of the frame 16 at respective (right) upper frame connections 35 (one of which is shown in FIG. 4). The upper A-arm 30 also has an outer lateral end that is connected to the ski leg 24 at a (right) upper suspension connection 37. In particular, the front suspension assembly 22 includes a (right) upper ball joint 27 defining, together with the ski leg 24, the upper suspension connection 37. Notably, as shown in FIG. 4, a socket of the upper ball joint 27 is disposed at the outer lateral end of the upper A-arm 30, and a ball 45 of a bearing stud 47 of the upper ball joint 27 is received in part within the socket. A lower portion of the bearing stud 47 is fastened to the ski leg 24.

Similarly, the lower A-arm 32 has two inner lateral ends that are connected to the front portion 17 of the frame 16 at a (right) lower frame connection 39. The lower A-arm 32 also has an outer lateral end that is connected to the ski leg 24 at a (right) lower suspension connection 41 disposed vertically lower than the upper suspension connection 37. In particular, the front suspension assembly 22 includes a (right) lower ball joint 29 defining, together with the ski leg 24, the lower suspension connection 41. Notably, as shown in FIG. 4, a socket of the lower ball joint 29 is disposed at the outer lateral end of the lower A-arm 32, and a ball 49 of a bearing stud 51 of the lower ball joint 29 is received in part within the socket. A lower portion of the bearing stud 51 is fastened to the ski leg 24.

It is contemplated that the front suspension assemblies 22 could be different from the double A-arm suspensions described above.

In this embodiment, the front left and front right suspension assemblies 22 are configured to keep a width thereof relatively narrow. Notably, the upper suspension connection 37 of each of the front left and front right suspension assemblies 22 is relatively close to a longitudinal centerplane 13 of the snowmobile 10 (FIGS. 3, 4) compared to most conventional snowmobiles. As such, as shown in FIG. 4, the upper suspension connections 37 are close, along the lateral direction of the snowmobile 10, to the lateral outermost edges of left and right body panels 59 of the snowmobile 10. The left and right body panels 59 are fairings disposed along the left and right sides of the snowmobile 10 for covering internal components of the snowmobile 10. The left and right body panels 59 respectively define leftmost and rightmost points of the fairings of the snowmobile 10. Each of the left and right body panels 59 can include various different side panels according to different embodiments.

In this embodiment, when the snowmobile 10 is at rest and unloaded on a horizontal ground surface, the right upper suspension connection 37 is disposed laterally inward of a lateral outermost edge of the right body panel 59. More particularly, as shown in FIG. 4, a center of the ball 45 of the upper ball joint 27 of the front right suspension assembly 22 is disposed laterally inward (i.e., to the left) of the rightmost edge of the right body panel 59. As will be appreciated, the rightmost edge of the right body panel 59 defines the rightmost point of the fairings of the snowmobile 10.

Figure 39:
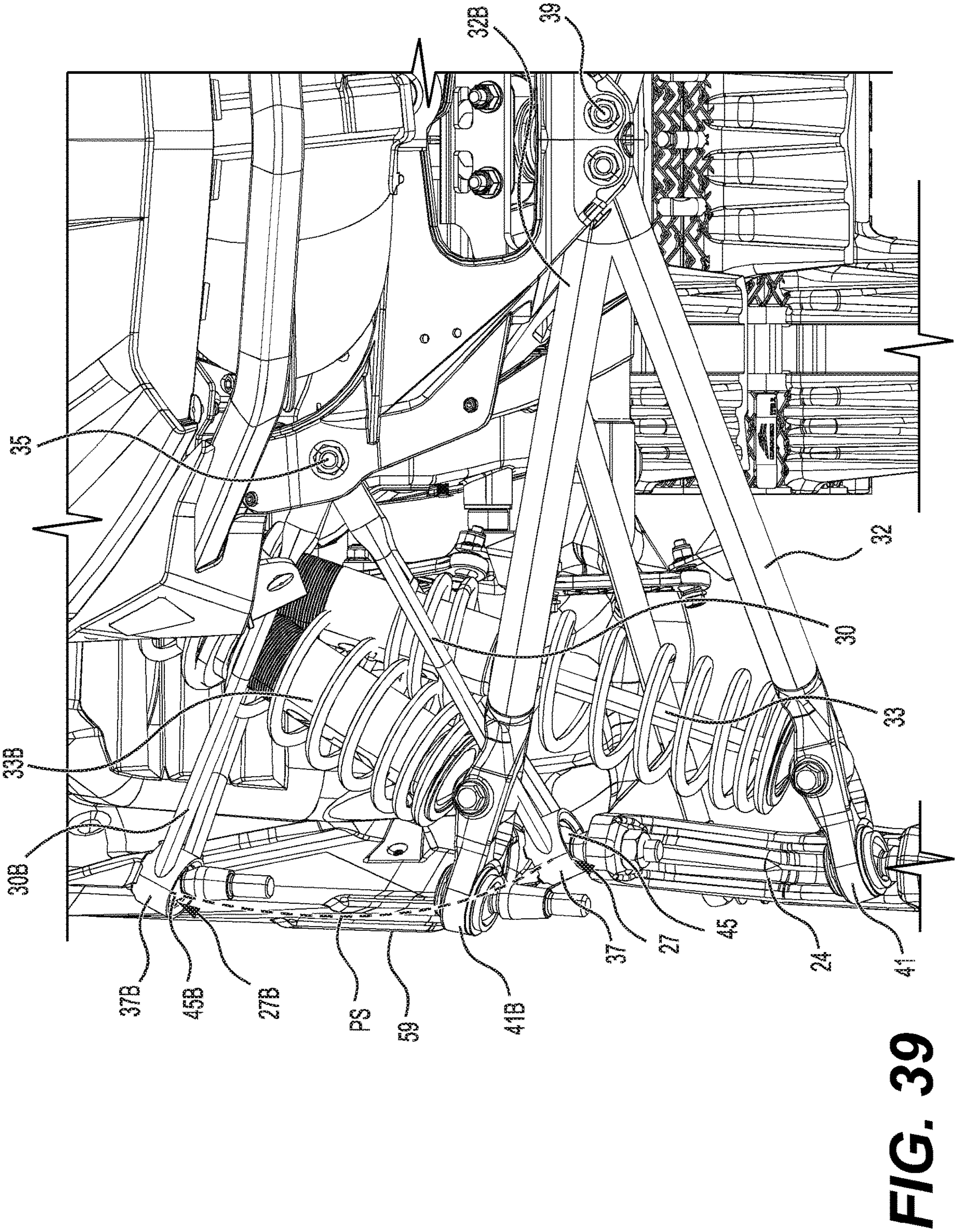
FIG. 39 is a front elevation view of part of the front right suspension assembly of the snowmobile of FIG. 1, showing the front right suspension assembly in a full droop position and a full bump position.

Furthermore, in this embodiment, the right upper suspension connection 37 remains disposed laterally inward of the lateral outermost edge of the right body panel 59 throughout a range of motion of the front right suspension assembly 22. Notably, FIG. 39 illustrates the components of the front right suspension assembly 22 in a full droop position in which the shock absorber 33 is extended at its maximum (i.e., the distance between the opposite pivot axes of the shock absorber 33 is at its maximum) and some of the components of the front right suspension assembly 22 in a full bump position of the front right suspension assembly 22 in which the shock absorber 33 is compressed at its maximum (i.e., the distance between the opposite pivot axes of the shock absorber 33 is at its minimum). For clarity, the components in the full bump position of the front right suspension assembly 22 have been denoted with the same reference numerals with a modifier letter "B". As can be seen, in the full bump position, the upper A-arm 30B is at its highest vertical position. Conversely, in a full droop position of the front right suspension assembly 22, the upper A-arm 30 is at its lowest vertical position. A path PS of the upper suspension connection 37, namely of the center of the ball 45 of the upper ball joint 27, between the full droop and full bump positions is illustrated by a dashed line. As can be seen, throughout a range of motion between the full droop position and the full bump position, the upper suspension connection 37 of the front right suspension assembly 22 remains disposed laterally inward of the lateral outermost edge of the right body panel 59.

While the left upper suspension connection 37 is disposed at a same lateral distance from the longitudinal centerplane 13 than the right upper suspension connection 37, in this embodiment, the left body panel 59 is shaped and dimensioned differently from the right body panel 59 such that the distance between the leftmost edge of the left body panel 59 and the longitudinal centerplane 13 is less than the distance between the rightmost edge of the right body panel 59 and the longitudinal centerplane 13. As such, in this embodiment, the position of the left upper suspension connection 37 does not remain lateral laterally inward of a lateral outermost edge (i.e., a leftmost edge) of the left body panel 59. However, it is contemplated that, in other embodiments (e.g., in which the left body panel 59 is symmetric to the right body panel 59 about the longitudinal centerplane 13), the left upper suspension connection 37 could also be disposed laterally inward of the lateral outermost edge of the left body panel 59 when the snowmobile 10 is at rest and unloaded on the horizontal ground surface and throughout a range of motion between the full bump and full droop positions.

Thus, as can be appreciated from FIG. 4, a front suspension width FSW measured, laterally, between the front left and front right suspension assemblies 22 is relatively small. In particular, the front suspension width FSW is measured laterally between the left and right upper suspension connections 37 of the front left and front right suspension assemblies 22 (i.e., between the vertically highest ones of the left and right suspension connections 37, 41), namely between the centers of the balls 45 of the left and right upper ball joints 27. In this embodiment, when the snowmobile 10 is at rest and unloaded on a horizontal ground surface, the front suspension width FSW is less than a body width BW (FIG. 4) of the snowmobile 10 measured between the lateral outermost edges of the left body panel 59 and the right body panel 59.

With continued reference to FIG. 4, the front suspension width FSW is also greater than a track width TW of an endless track 60 of the snowmobile 10. Notably, when the snowmobile 10 is at rest and unloaded on a horizontal ground surface, a ratio of the front suspension width FSW over the track TW is less than 2.5. In particular, in this embodiment, the ratio of the front suspension width FSW over the track TW is approximately 2. The front suspension width FSW is greater than the track width TW at all positions of the front suspension assemblies 22.

Due to the narrower front suspension assemblies 22, in this embodiment, the shock absorbers 33 are disposed more vertically than in many conventional snowmobiles. In particular, as shown in FIG. 4, when the snowmobile 10 is at rest and unloaded on a horizontal ground surface, each of the left and right shock absorbers 33 is disposed at an angle of less than 30° from vertical in all directions. More specifically, in this embodiment, each of the left and right shock absorbers 33 is approximately 20° from vertical in all directions.

In light of the above-described configuration of the left and right front suspension assemblies 22, in this embodiment, a lateral distance between the left and right skis 18 is kept relatively small compared to many conventional snowmobiles. This can help a driver manoeuvre the snowmobile 10 in deep snow conditions, for example when “boondocking” (i.e., going off trails) or “sidehilling” (i.e., riding along the side of a hill). Notably, the skis 18, the ski legs 24 and the front suspension assemblies 22 may drag less in the snow during operation in deep snow with this narrow configuration of the left and right front suspension assemblies 22, which can make it easier for the driver to manoeuvre in deep snow.

Returning now to FIG. 1, a driver straddle seat 36 is disposed rearward of the handlebar 34 and supported by the frame 16. In some embodiments, a passenger seat may be provided behind the straddle seat 36 to accommodate a passenger behind the driver. Left and right footrests 40 extend along opposite lateral sides of the tunnel 20 vertically lower than the straddle seat 36 to accommodate the driver’s and, if applicable, the passenger’s feet. The left and right footrests 40 will be described in greater detail further below.

As shown schematically in FIG. 2A, a motor 42 is supported by the frame 16 and is operatively connected to the endless track 60 (partially illustrated in FIGS. 1 to 2B) for propulsion of the snowmobile 10. Notably, as shown in FIGS. 5 to 9, the motor 42 is connected to and supported by an engine bay portion 43 of the frame 16 that extends in part beneath the motor 42. In particular, the motor 42 is resiliently mounted to the engine bay portion 43 to prevent excessive vibrations being transmitted to the frame 16. As such, the engine 42 moves to a certain extent relative to the frame 16.

Figure 28:
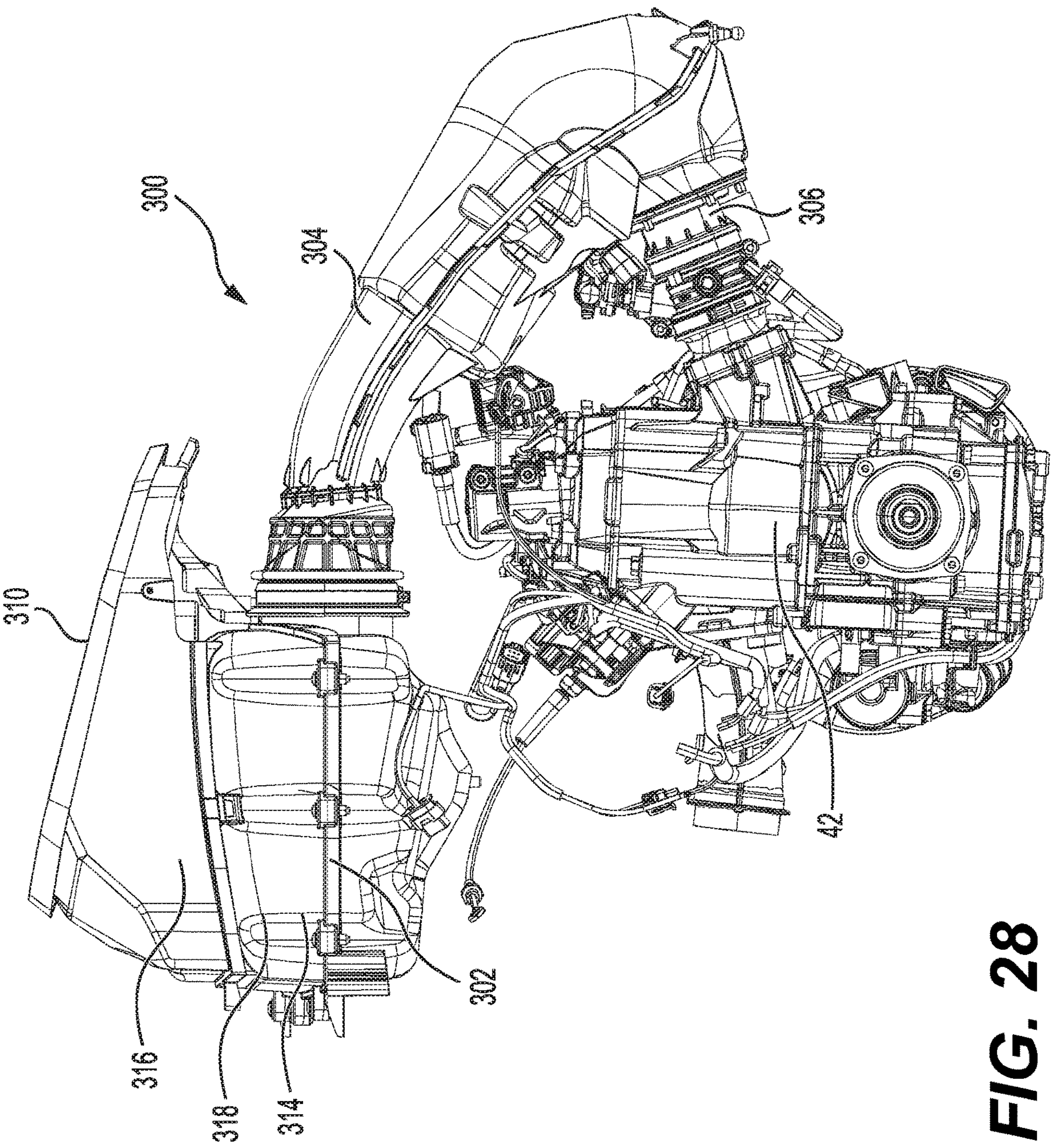
FIG. 28 is a left side elevation view of the engine and an air intake system of the snowmobile of FIG. 1.
Figure 29:
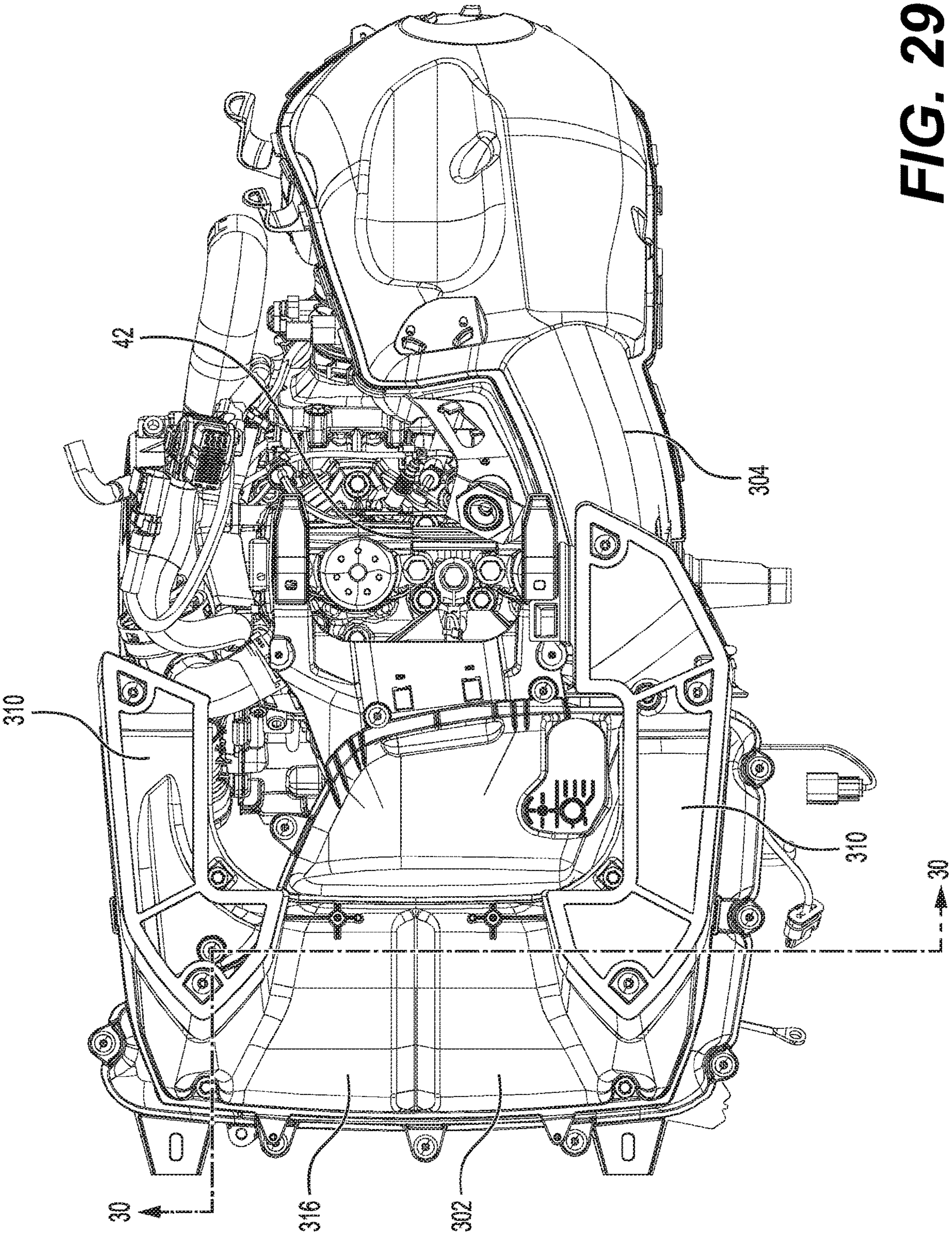
FIG. 29 is a top plan view of the engine and the air intake system of FIG. 28.

In this embodiment, the motor 42 is an internal combustion engine operating on a two-stroke engine cycle such that the engine 42 completes a power cycle with two strokes (an upstroke and a downstroke) of the engine’s pistons (not shown). The engine 42 can thus be referred to as a two-stroke engine. The engine 42 has a crankcase 44, a cylinder block 46 defining two cylinders (not shown) connected on top of the crankcase 44 and a cylinder head 48 connected on top of the cylinder block 46. The engine 42 also has a crankshaft (not shown) disposed in the crankcase 44 and driven by the motion of the pistons. As shown in FIG. 28, the engine 42 has an air intake system 300 for providing air to the engine 42. The air intake system 300 includes an airbox 302, an air intake manifold 304 fluidly connected to the airbox 302, and two throttle bodies 306 fluidly connecting the air intake manifold 304 to the engine 42. A throttle valve 307 is disposed in each throttle body 306 and is operable to adjust the amount of air fed to the engine 42. The throttle valves are controlled based on the position of a throttle operator (not shown) that is operable by the user (e.g., a throttle lever provided at the handlebar 34). The throttle bodies 306 fluidly connect the air intake manifold 304 to the intake ports of the cylinders of the engine 42. A detailed description of the airbox 302 will be provided further below.

It is contemplated that, in other embodiments, the motor 42 could be another type of motor such as an electric motor. In such embodiments, the air intake system 300 is omitted.

Figure 18:
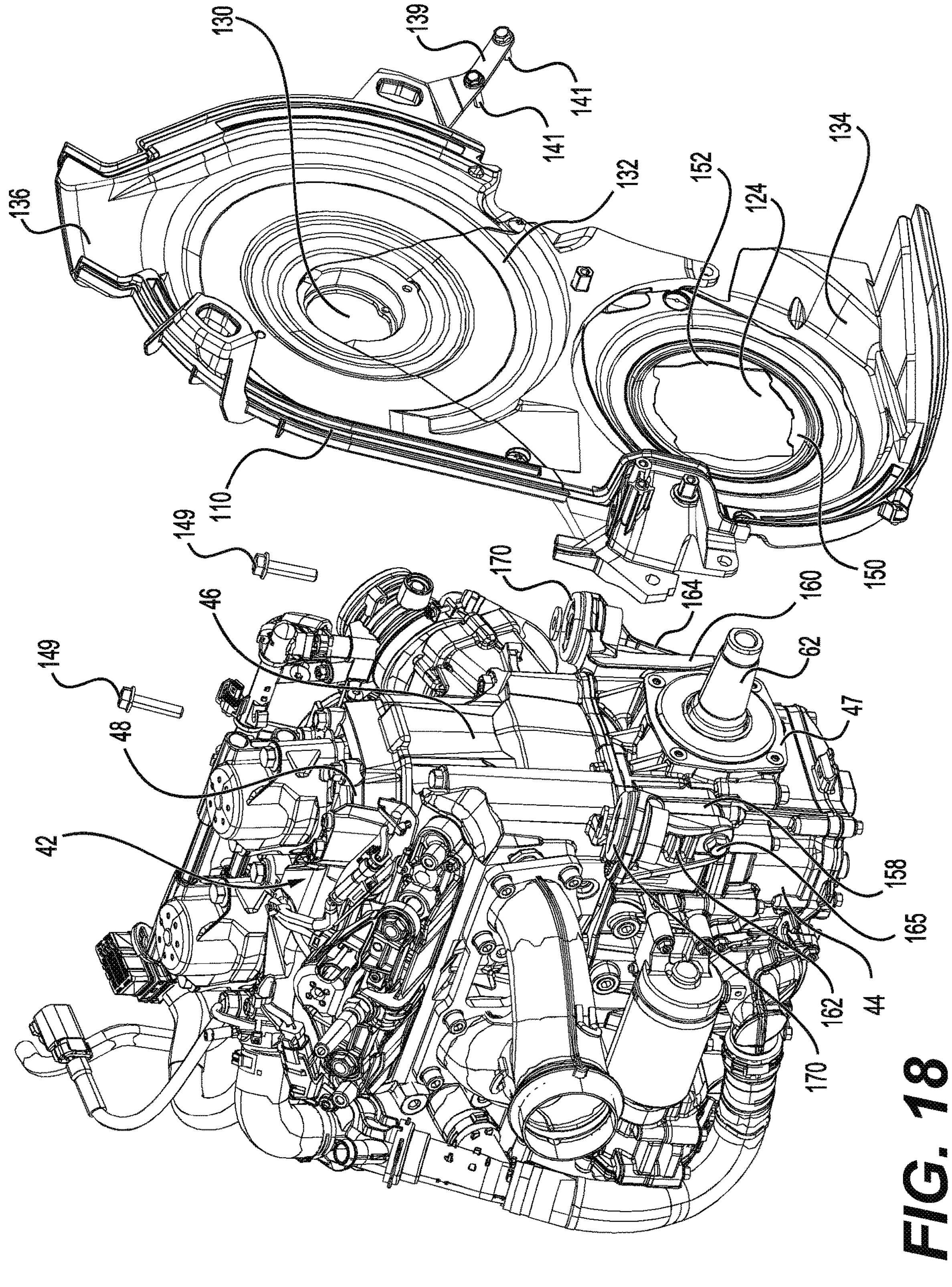
FIG. 18 is a perspective view, taken from a top, front, left side, of the engine and the back plate assembly in an exploded configuration.

In this embodiment, as best shown in FIG. 18, an output shaft 62 of the engine 42 extends outwardly from an output portion 69 of the crankcase 44, on a left side thereof, and is operatively connected to the crankshaft. The output shaft 62 is thus driven by the crankshaft and is generally coaxial therewith. The output shaft 62 is configured to drive a powertrain of the snowmobile 10 and may thus also be referred to as a "drive shaft". It is contemplated that, in other embodiments, rather than providing the output shaft 62, part of the crankshaft may extend outwards from the output portion 69 of the crankcase 44 to drive the powertrain of the snowmobile 10. The crankshaft may thus be considered as being the drive shaft in such embodiments.

Figure 9:
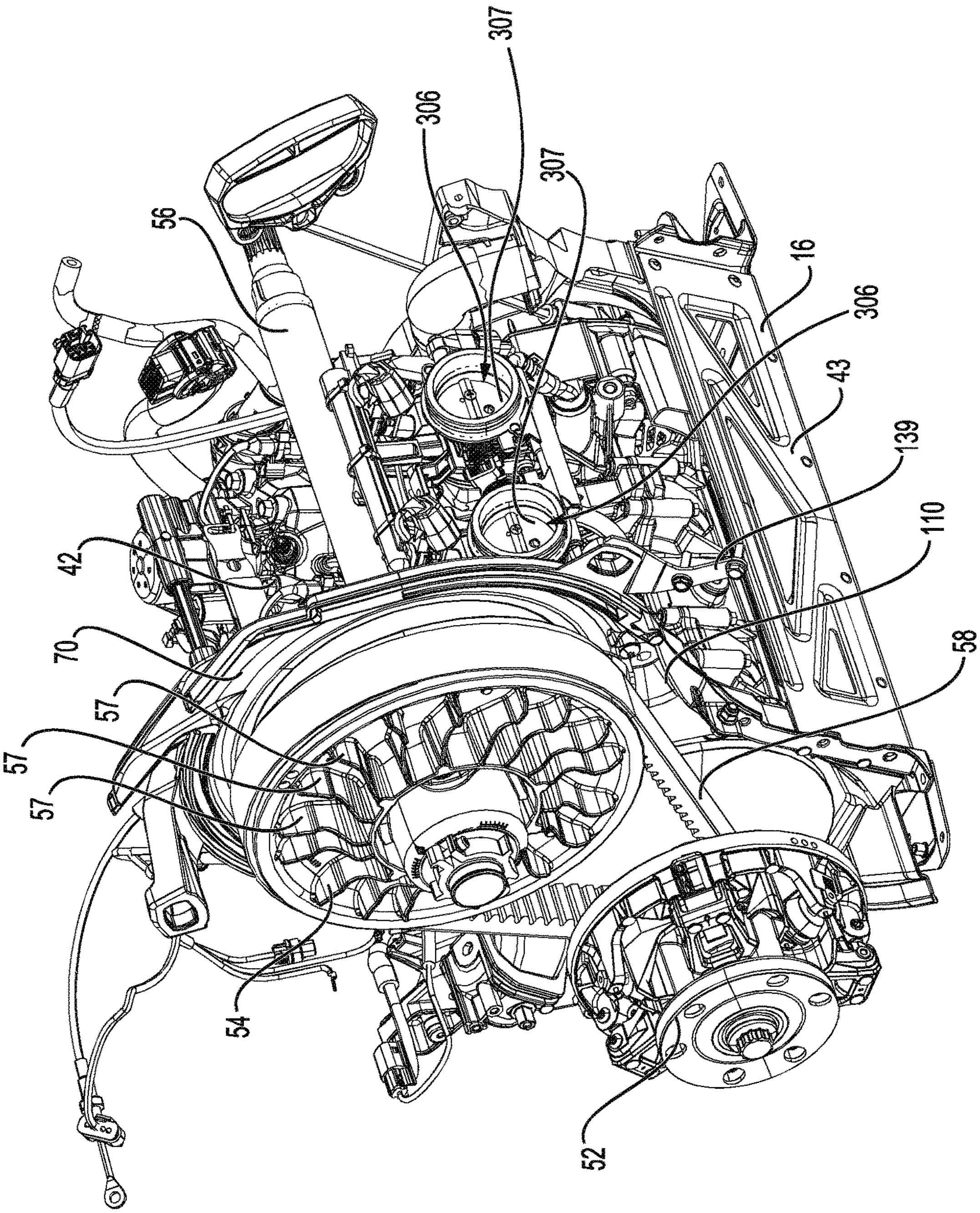
FIG. 9 is a perspective view, taken from a top, rear, left side, of the part of the snowmobile of FIG. 5, with part of a CVT housing removed to expose internal components of the CVT.

The engine 42 is operatively connected to a continuously variable transmission (CVT) 50 disposed on a left side of the engine 42. The CVT 50 operatively connects the output shaft 62 of the engine 42 to the endless track 60. With reference to FIG. 9, the CVT 50 includes a drive pulley 52 mounted to the output shaft 62, a driven pulley 54 mounted to a driven shaft 56 (alternatively referred to as a "countershaft") for rotation therewith, and a transmission belt 58 disposed around both pulleys 52, 54 to transmit torque from the drive pulley 52 to the driven pulley 54. During operation, the drive pulley 52 moves, together with the engine 42, with respect to the frame 16. Notably, during operation, the engine 42 vibrates and thus moves relative to the frame 16, and the drive pulley 52 moves together with the engine 42. As such, during operation, the drive pulley 52 moves longitudinally, vertically and/or laterally with respective to the driven pulley 54. This relative movement is compensated in part by the flexible transmission belt 58.

Figure 11:
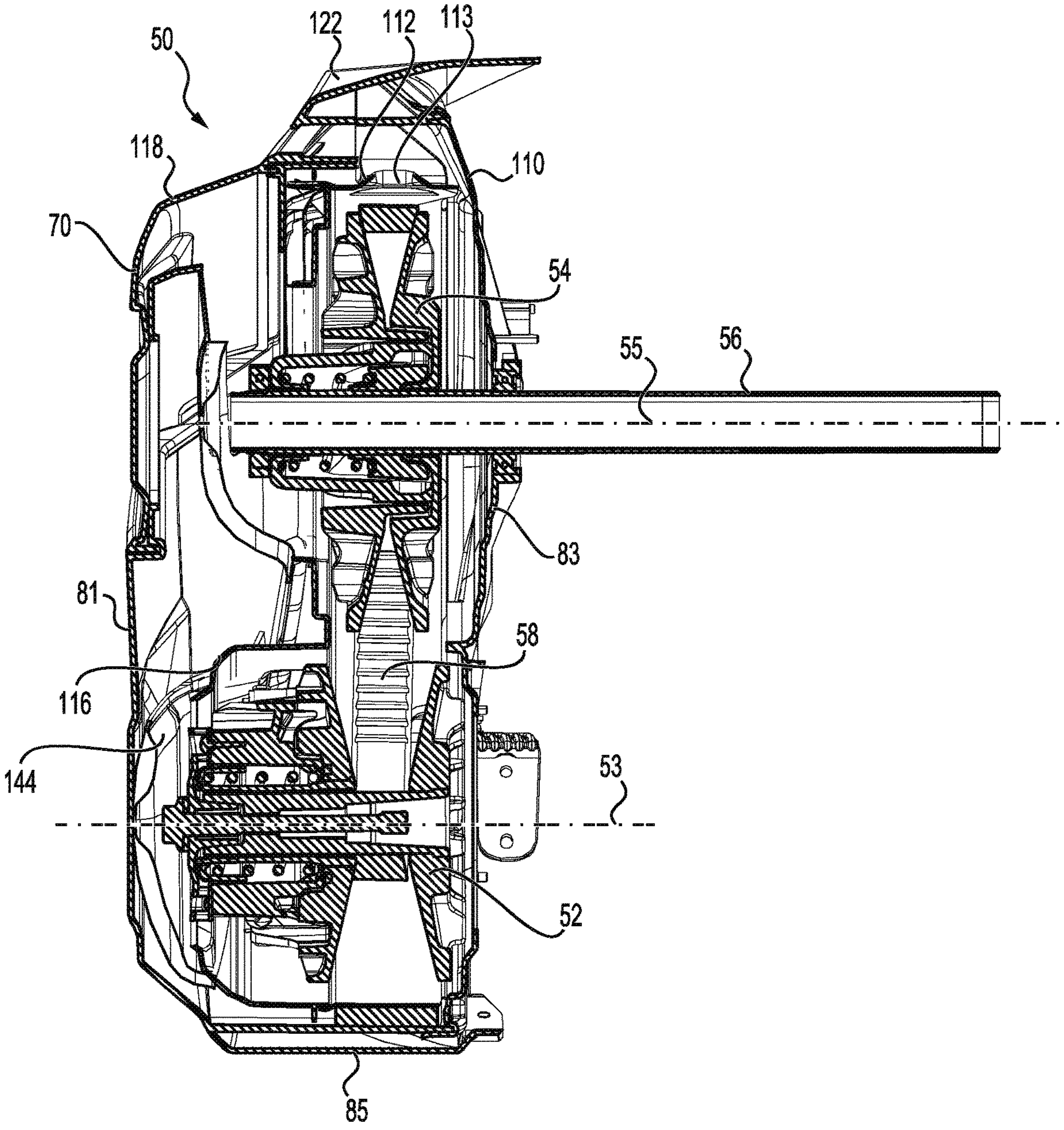
FIG. 11 is a cross-sectional view of the CVT of FIG. 5 taken along a vertical plane extending containing a driven shaft axis.

With reference to FIG. 11, the drive pulley 52 is rotatable about a drive shaft axis 53 defined by the output shaft 62, and the driven pulley 54 is rotatable about a driven shaft axis 55 defined by the driven shaft 56 and parallel to the drive shaft axis 53. As can be seen, the driven shaft axis 55 is disposed vertically higher than the drive shaft axis 53. Notably, the driven pulley 54 is disposed rearward and upward of the drive pulley 52 such that the driven shaft axis 55 is disposed rearward and upward of the drive shaft axis 53.

Each of the pulleys 52, 54 includes a movable sheave that can move axially relative to a fixed sheave to modify an effective diameter of the corresponding pulley 52, 54. The drive pulley 52 is a centrifugal pulley in that the sheaves thereof move in response to a centrifugal force applied thereon. The effective diameters of the pulleys 52, 54 are in inverse relationship. In the illustrated embodiment, the CVT 50 is a purely mechanical CVT 50, in which the diameter of the drive pulley 52 increases with increasing rotational speed of the drive pulley 52 (i.e., with increasing engine speed). The effective diameter of the driven pulley 54 therefore decreases when the torque required at the driven shaft 56 increases. The CVT 50 may thus be referred to as an "unassisted" CVT in that a gear ratio of the CVT 50 (i.e., an effective diameter of the driven pulley 54 over the effective diameter of the drive pulley 52) is automatically mechanically adjusted in accordance with the speed of the engine 42 and the torque requirement at the driven 56. It is contemplated that, in other embodiments, the CVT 50 could be an assisted CVT such as a hydraulic CVT.

A CVT housing 70 encloses the drive pulley 52, the driven pulley 54 and the transmission belt 58 therein. The driven pulley 54 moves together with the CVT housing 70 relative to the engine 42. The configuration of the CVT housing 70 will be described in greater detail further below.

Figure 43:
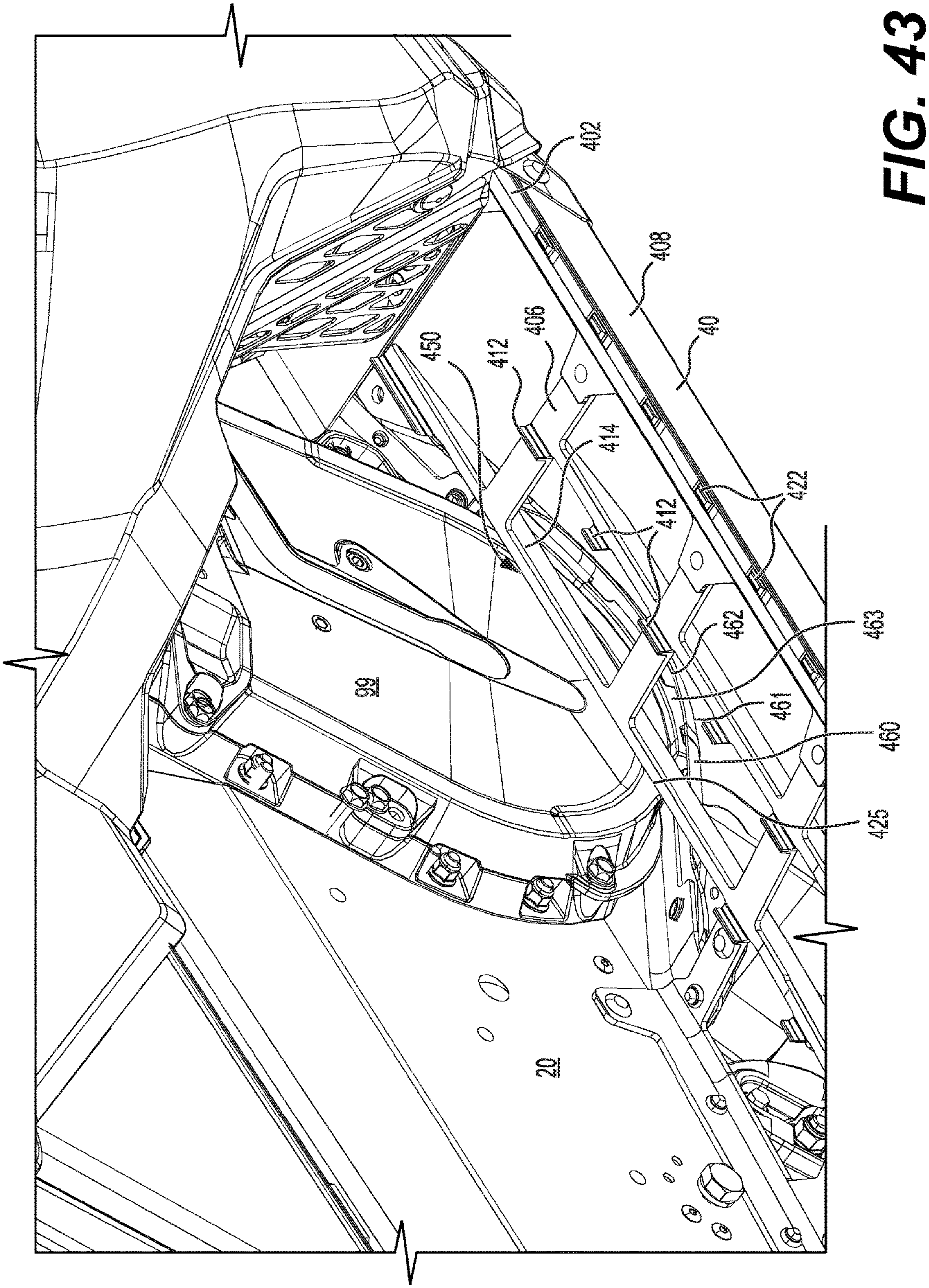
FIG. 43 is a perspective view, taken from a top, rear, right side, of part of the snowmobile, including part of the right footrest and a chaincase housing a chain drive of the snowmobile of FIG. 1.
Figure 44:
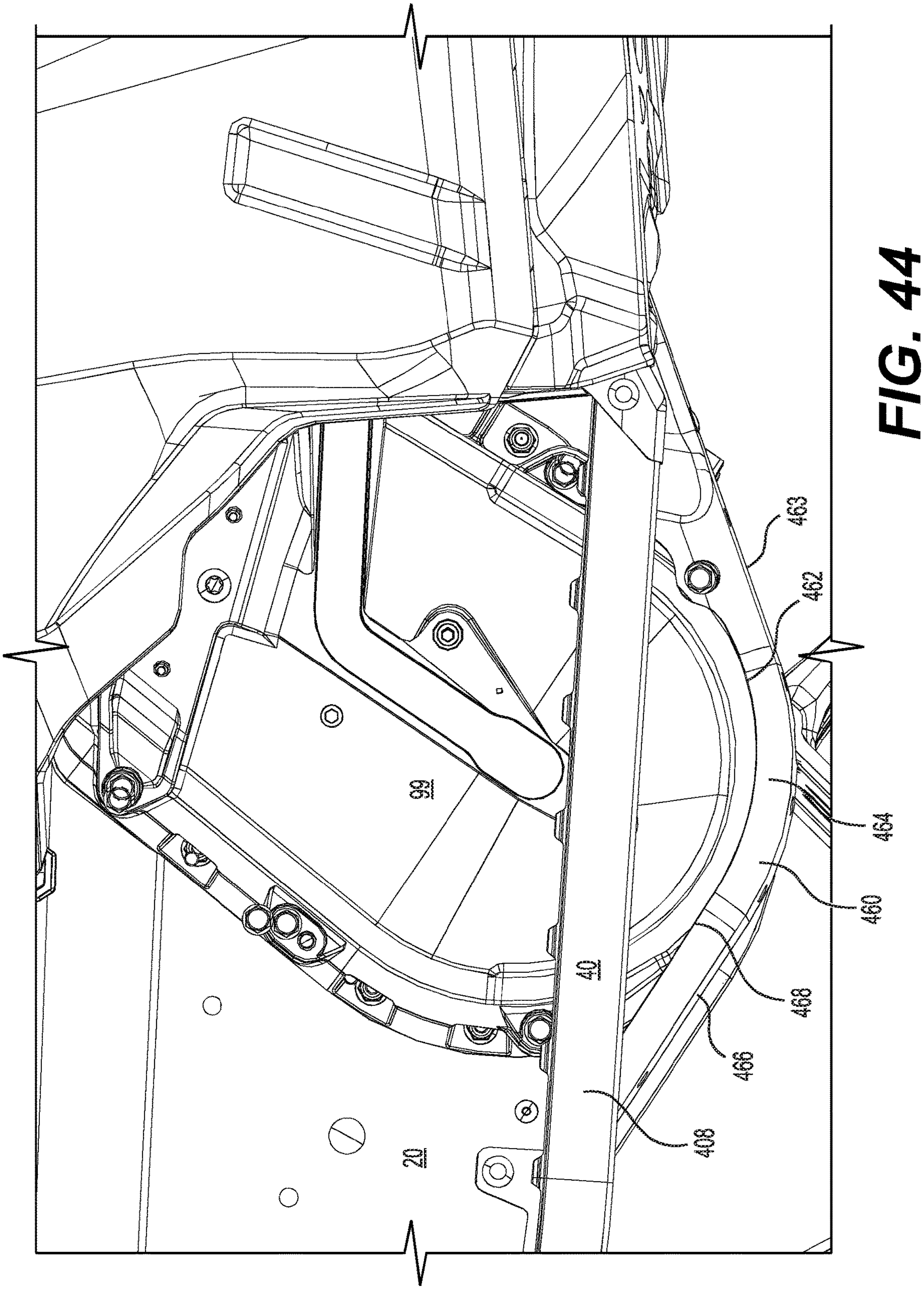
FIG. 44 is a right side elevation view of the part of the snowmobile of FIG. 43.
Figure 45:
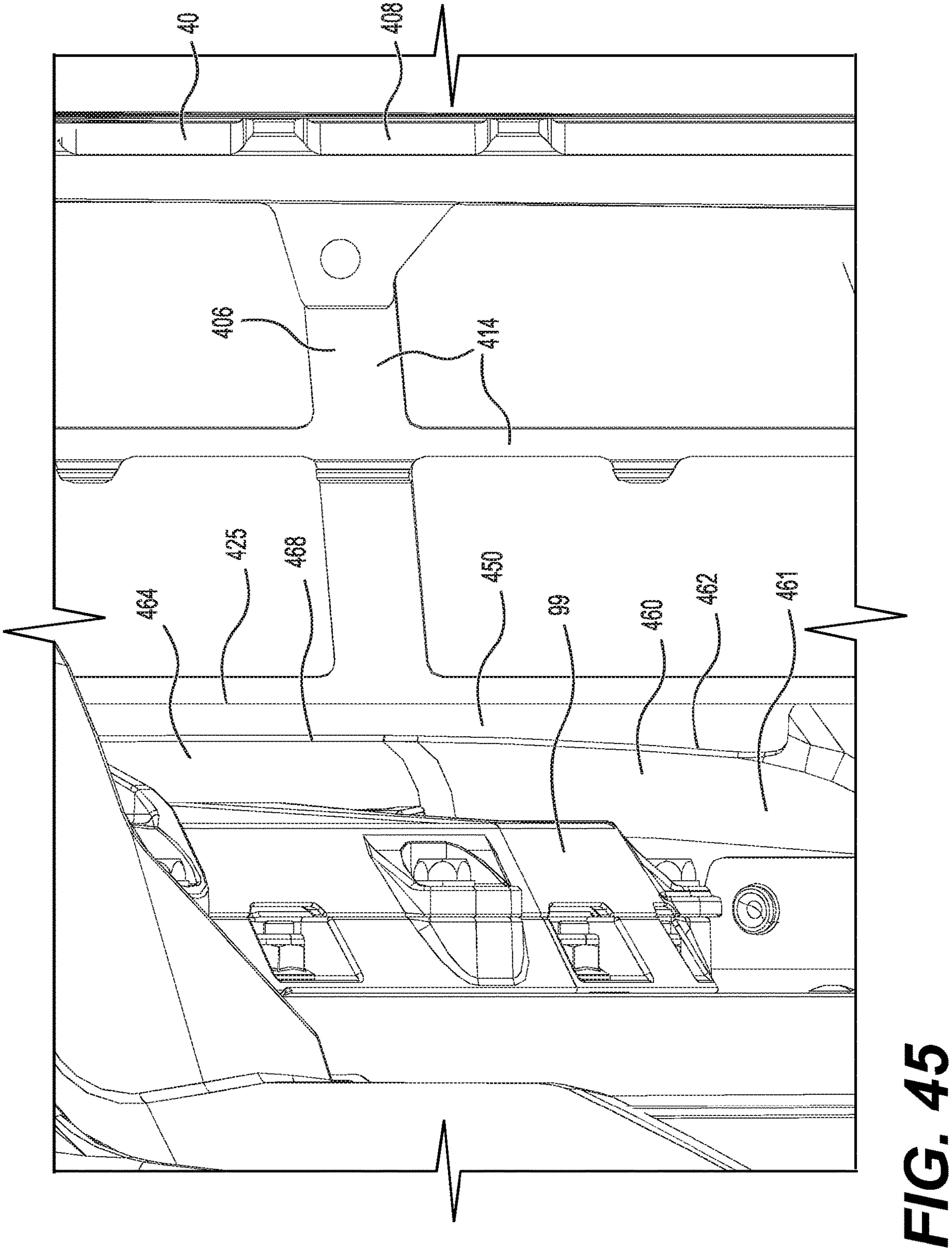
FIG. 45 is a top plan view of the part of the snowmobile of FIG. 43.
Figure 46:
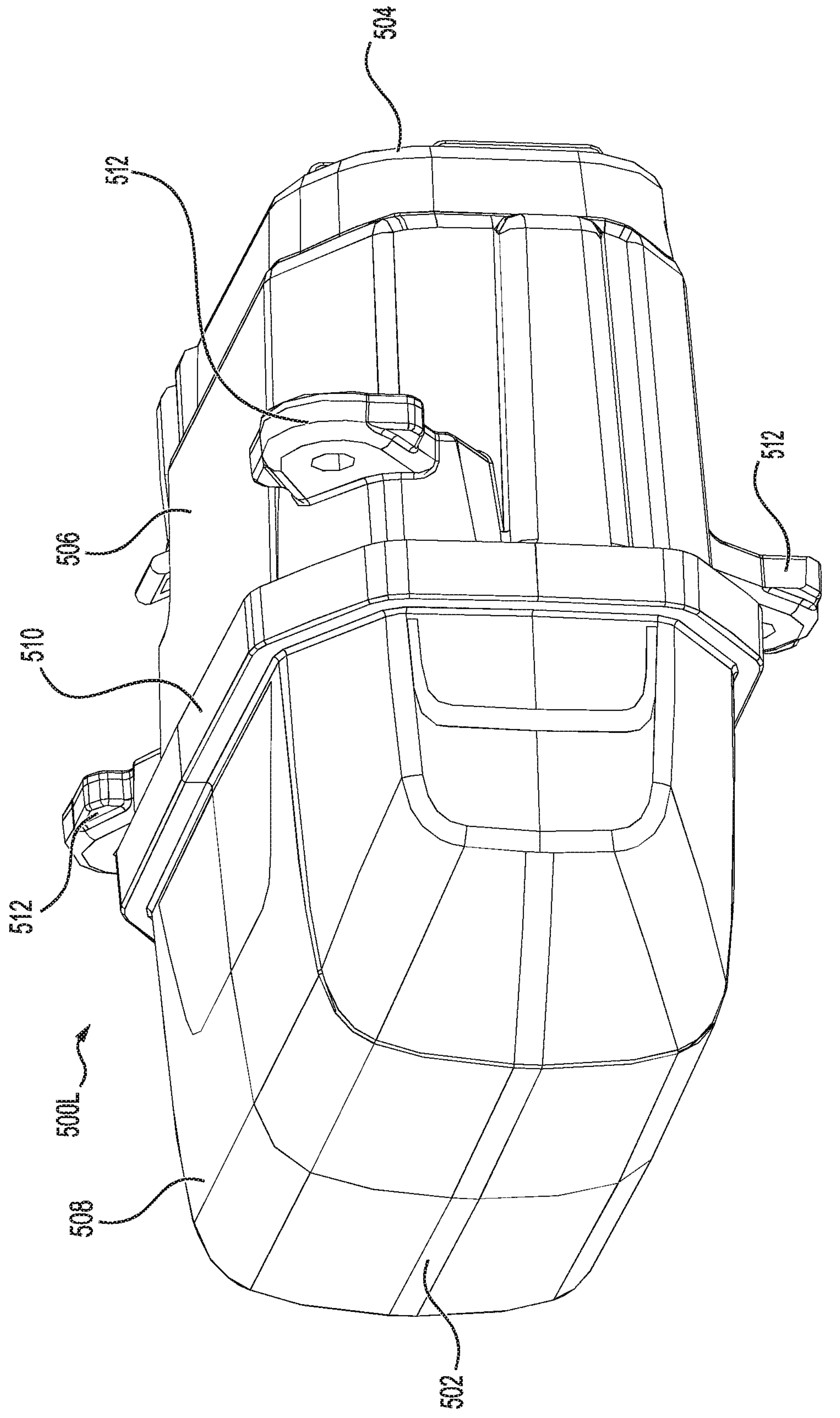
FIG. 46 is a perspective view, taken from a top, front, left side, of a low beam headlight unit of a headlight system of the snowmobile of FIG. 1.

With reference to FIG. 2B, a chain drive 80 disposed on the right side of the snowmobile 10, notably on the right side of the engine 42, is connected to the CVT 50 via the driven shaft 56 (FIG. 9). Notably, the driven shaft 56 extends from the left side to the right side of the engine 42 to engage the chain drive 80. It is contemplated that, in other embodiments, the positions of the CVT 50 and the chain drive 80 could be switched such that the CVT 50 is disposed on the right side of the engine 42 and the chain drive 80 is disposed on the left side of the engine 42. The chain drive 80 includes a drive sprocket 93, a driven sprocket 97, and a drive chain 98 operatively connecting the drive sprocket 93 to the driven sprocket 97. The drive sprocket 93 is rotatable about a drive sprocket axis extending laterally and is operatively connected to the CVT 50 via the driven shaft 56. The driven sprocket 97 is rotatable about a driven sprocket axis extending parallel to the drive sprocket axis. A chaincase 99 at least partly houses the drive sprocket 93, the driven sprocket 97 and the drive chain 98. In this embodiment, a metallic protective cover 460 (FIG. 44) extends beneath the chaincase 99 to protect a lower portion of the chaincase 99. Notably, the protective cover 460 protects the lower portion of the chaincase 99 from impacts with hard ground, ice or rock, which could otherwise damage the chaincase 99. In this embodiment, the protective cover 460 has a curved shape that generally corresponds to a curved shape of the lower portion of the chaincase 99. In particular, as shown in FIGS. 43 to 45, the protective cover 460 has an upper concave side 461 and a lower convex side 463, and the concave side 461 faces the chaincase 99. As will be described in more detail below, the protective cover 460 is connected to the right footrest 40.

Returning to FIG. 1, at the front end 12 of the snowmobile 10, fairings 90 are provided that enclose internal components of the snowmobile 10 such as the engine 42 and the chain drive 80, thereby providing an external shell that not only protects these components of the snowmobile 10, but also make the snowmobile 10 more aesthetically pleasing. The fairings 90 include a hood 91 and the side body panels 59 described above. The fairings 90 may be opened to allow access to the engine 42 and the chain drive 80 when this is required, for example for inspection or maintenance thereof. An outermost part of the CVT housing 70 can be considered to be part of the left side body panel 59 and thus part of the fairings 90. Similarly, the chaincase 99 can be considered to be a part of the right side body panel 59 and thus part of the fairings 90.

As best shown in FIG. 1, the endless track 60 is supported by a rear suspension assembly 65 disposed beneath the tunnel 20. The endless track 60 is operatively connected to the engine 42 through the CVT 50 and the chain drive 80. Notably, the chain drive 80 drives two drive sprockets (not shown) which drivingly engage the endless track 60 to make the endless track 60 run about the rear suspension assembly 65. As such, the endless track 60 is driven, by the engine 42, the CVT 50 and the chain drive 80 to run about the rear suspension assembly 65 for propulsion of the snowmobile 10.

The rear suspension assembly 65 is connected to the frame 16, namely to the tunnel 20. As shown in FIGS. 2A and 2B, the rear suspension assembly 65 has front and rear shock absorbers 82, 84. The front shock absorber 82 extends rearwardly and downwardly from a front portion of the tunnel 20, and is disposed between the tunnel 20 and a slide frame assembly 86 of the rear suspension assembly 65, partially forward of front suspension arms 87 of the rear suspension assembly 65. The rear shock absorber 84 extends forwardly and downwardly from a rear portion of the tunnel 20, and is disposed at least in part rearwardly of the front suspension arms 87. The slide frame assembly 86 includes a pair of spaced apart slide rails 88 that engage the inner side of the ground-engaging portion of the endless track 60. As best shown in FIG. 1, the slide frame assembly 86 journals a plurality of backup rollers 92 and a larger idler roller 94. In addition, further rollers 96 are carried by the tunnel 20, in order to define the path over which the endless track 60 travels. Other types of rear suspension assemblies are contemplated.

As mentioned above, the endless track 60 is driven by two drive sprockets which are driven by the chain drive 80. Notably, the two drive sprockets are journaled by the tunnel 20 and are driven by the engine 42 via the CVT 50 and the chain drive 80. In particular, the drive sprockets are mounted to a drive axle (not shown) which is operatively connected to the chain drive 80.

The snowmobile 10 includes other elements well known in the art, and as such they will not be described in detail herein.

Continuously Variable Transmission

The CVT housing 70 will now be described in greater detail with reference to FIGS. 5 to 12. The CVT housing 70 has two opposite lateral sides, namely a left side 81 and a right side 83, and a peripheral wall 85 that extends between the left and right sides 81, 83. Together, the left side 81, the right side 83 and the peripheral wall 85 of the CVT housing 70 define an internal volume of the CVT housing 70 within which the drive pulley 52, the driven pulley 54 and the belt 58 are disposed.

As shown in FIGS. 5 to 9, the CVT housing 70 is generally disposed on a left side of the engine 42 and extends vertically higher than the engine 42. Moreover, the CVT housing 70 is disposed rearwardly of the front suspension assemblies 22 that connect the skis 18 to the frame 16 of the snowmobile 10. However, a majority of the CVT housing 70 is disposed forwardly of the handlebar 34 and of the driver seat 36. Furthermore, a plane containing the left side surface 21 of the tunnel 20 extends through the CVT housing 70. It is contemplated that the CVT housing 70 may be positioned differently in other embodiments.

As the CVT housing 70 encloses the drive pulley 52, the driven pulley 54 and the belt 58 within its internal volume, the CVT housing 70 is configured to allow the circulation of air therethrough to cool these internal components of the CVT 50, particularly the belt 58 which can be sensitive to excess heat due to its material construction. To that end, as shown in FIG. 1, in this embodiment, the CVT housing 70 defines two air inlets 72, 74 for allowing ambient air into the CVT housing 70 and two air outlets 76, 78 for discharging heated air from the CVT housing 70. It is contemplated that a different number of air inlets and air outlets may be provided in other embodiments.

Figure 7:
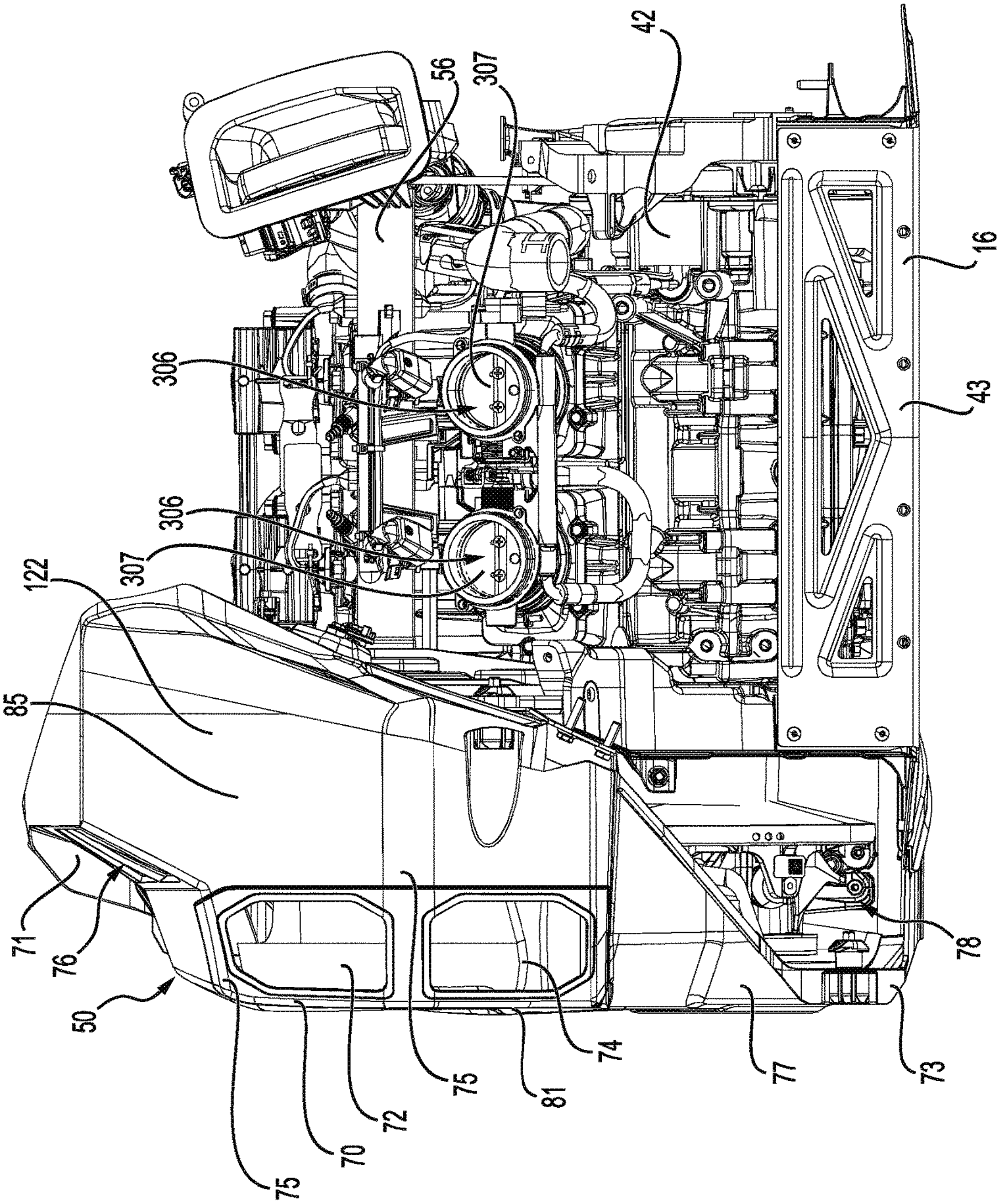
FIG. 7 is a rear elevation view of the part of the snowmobile of FIG. 5.
Figure 8:
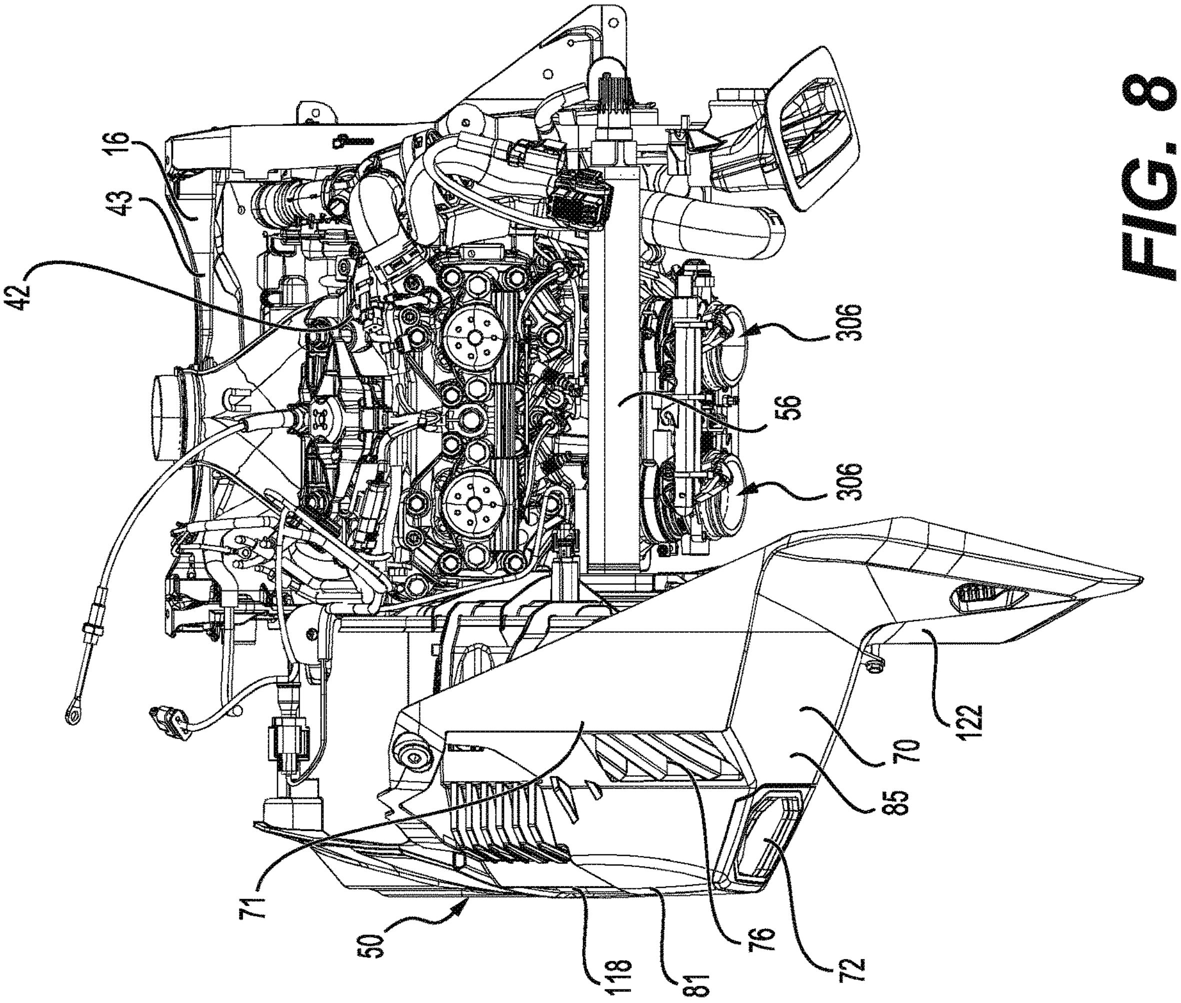
FIG. 8 is a top plan view of the part of the snowmobile of FIG. 5.

With reference to FIG. 7, in this embodiment, the two air inlets 72, 74 are defined by an upper half 75 of the CVT housing 70 that is vertically aligned with the driven pulley 54. Notably, the driven shaft axis 55 extends through the upper half 75 of the CVT housing 70. The two air inlet 72, 74 are thus disposed closer to the driven pulley 54 than to the drive pulley 52. The two air inlets 72, 74 are vertically adjacent to one another, with the air inlet 72 being disposed vertically higher than the air inlet 74. As shown in FIG. 1, the two air inlets 72, 74 are positioned on a rear side of the CVT housing 70 such that ambient air enters the CVT housing 70 from the rear side thereof. In order to promote the suction of air through the air inlets 72, 74, as shown in FIG. 9, the driven pulley 54 has a plurality of fins 57 on its left side. During operation, the fins 57 pull air into the CVT housing 70 through the air inlets 72, 74 in response to the driven pulley 54 being driven.

Figure 10:
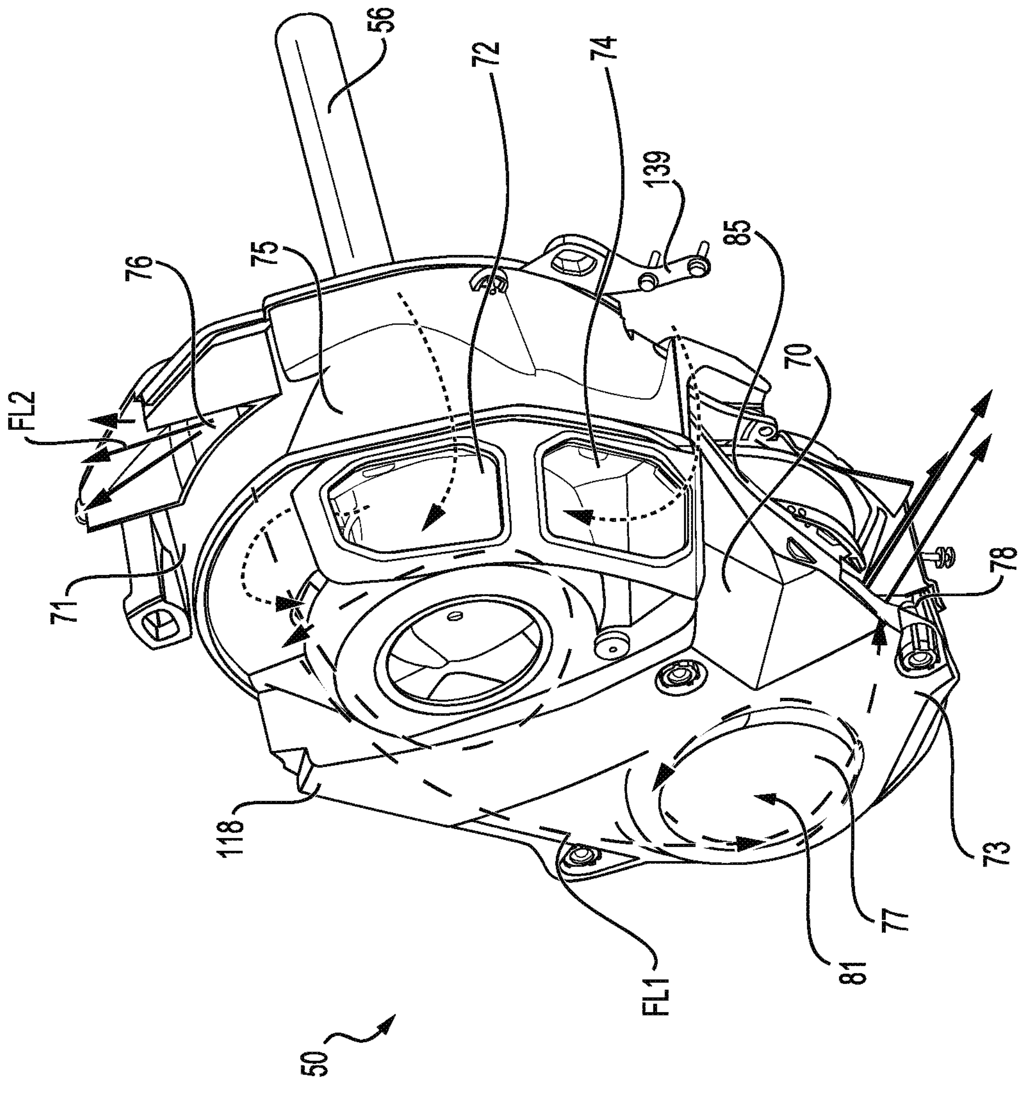
FIG. 10 is a perspective view, taken from a top, rear, left side, of part of the CVT of FIG. 5, with part of the CVT housing removed.

As shown in FIG. 10, the two air outlets 76, 78 are defined by the upper half 75 and a lower half 77 of the CVT housing 70 respectively. The drive shaft axis 53 extends through the lower half 77 of the CVT housing 70. The air outlet 76 is thus disposed vertically higher than the air outlet 78 and the air outlets 76, 78 may thus be referred to as an upper air outlet 76 and a lower air outlet 78 respectively. In this embodiment, the upper air outlet 76 is disposed at an upper end portion 71 of the CVT housing 70. The upper air outlet 76 is disposed closer to the driven pulley 54 than to the drive pulley 52, and is positioned vertically higher than the air inlets 72, 74.

In this embodiment, as shown in FIG. 7, the lower air outlet 78 is disposed at a lower end portion 73 of the CVT housing 70. The lower air outlet 78 is vertically aligned with the drive pulley 52 and is disposed closer to the drive pulley 52 than to the driven pulley 54. As best shown in FIG. 1, the lower air outlet 78 is positioned to discharge heated air near the left footrest 40 to heat the driver's left foot while it is supported by the left footrest 40. In particular, in this embodiment, the lower air outlet 78 is positioned forwardly from the front end of the left footrest 40 and is laterally aligned with the left footrest 40. The lower air outlet 78 extends vertically from the front end of the left footrest 40. Moreover, in this embodiment, the lower air outlet 78 is positioned on a rear side of the CVT housing 70 in order for heated air discharged through the lower air outlet 78 to be directed generally rearwardly. As shown in FIG. 1, in this embodiment, a grill 95 covers the lower air outlet 78.

As will be appreciated, the position of the lower air outlet 78 allows using the heated air discharged from the CVT housing 70 in order to heat the driver's left foot which may be particularly useful in very low temperature conditions. Thus efficiently cooling of the CVT 50 is achieved while at the same time benefitting the driver's comfort.

It is contemplated that, in embodiments in which the CVT 50 is disposed on the right side of the engine 42, the lower air outlet 78 could be positioned to discharge heated air near the right footrest 40 to heat the driver's right foot while it is supported by the right footrest 40.

The upper and lower air outlets 76, 78 are provided to discharge heated air in different scenarios. Notably, the upper air outlet 76 mainly discharges heated air when the snowmobile 10 is immobile and the engine 42 is turned on (i.e., when the engine 42 is idling). In other words, during operation, when the driven pulley 54 is not rotating, at least a majority of heated air is discharged from the CVT housing 70 through the upper air outlet 76 rather than the lower air outlet 78. In particular, as the upper air outlet 76 is disposed at the upper end portion 71 of the CVT housing 70, heated air within the CVT housing 70 rises therein such that a majority of the heated air is discharged through the upper air outlet 76, whereas a small portion of the heated air may be discharged through the lower air outlet 78. In contrast, the lower air outlet 78 mainly discharges heated air when the snowmobile 10 is underway (i.e., actively moving, with the endless track 60 running about the rear suspension assembly 65). In other words, during operation, when the driven pulley 54 is rotating, at least a majority of heated air is discharged from the CVT housing 70 through the lower air outlet 78.

With reference to FIG. 10, the rotation of the drive and driven pulleys 52, 54 guides air flow within the CVT housing 70. In this embodiment, when the engine 42 is driven forwardly, the drive and driven pulleys 52, 54 rotate in a counterclockwise direction when looked at from the left side of the CVT 50. As such, an upper end of the driven pulley 54 (i.e., an uppermost point of the driven pulley 54 at any given time) rotates away from the air inlets 72, 74. On the other hand, a lower end of the drive pulley 52 (i.e., a lowermost point of the drive pulley 52 at any given time) rotates toward the lower air outlet 78. This can facilitate guiding air flow from the air inlets 72, 74 to the lower air outlet 78 during operation of the snowmobile 10, namely as the air flows within the CVT housing 70, when the driven pulley 54 is rotating, following a path FL1 as illustrated in FIG. 10. As mentioned above, a small portion of the air flow may follow a path FL2 through the upper air outlet 76.

Figure 12:
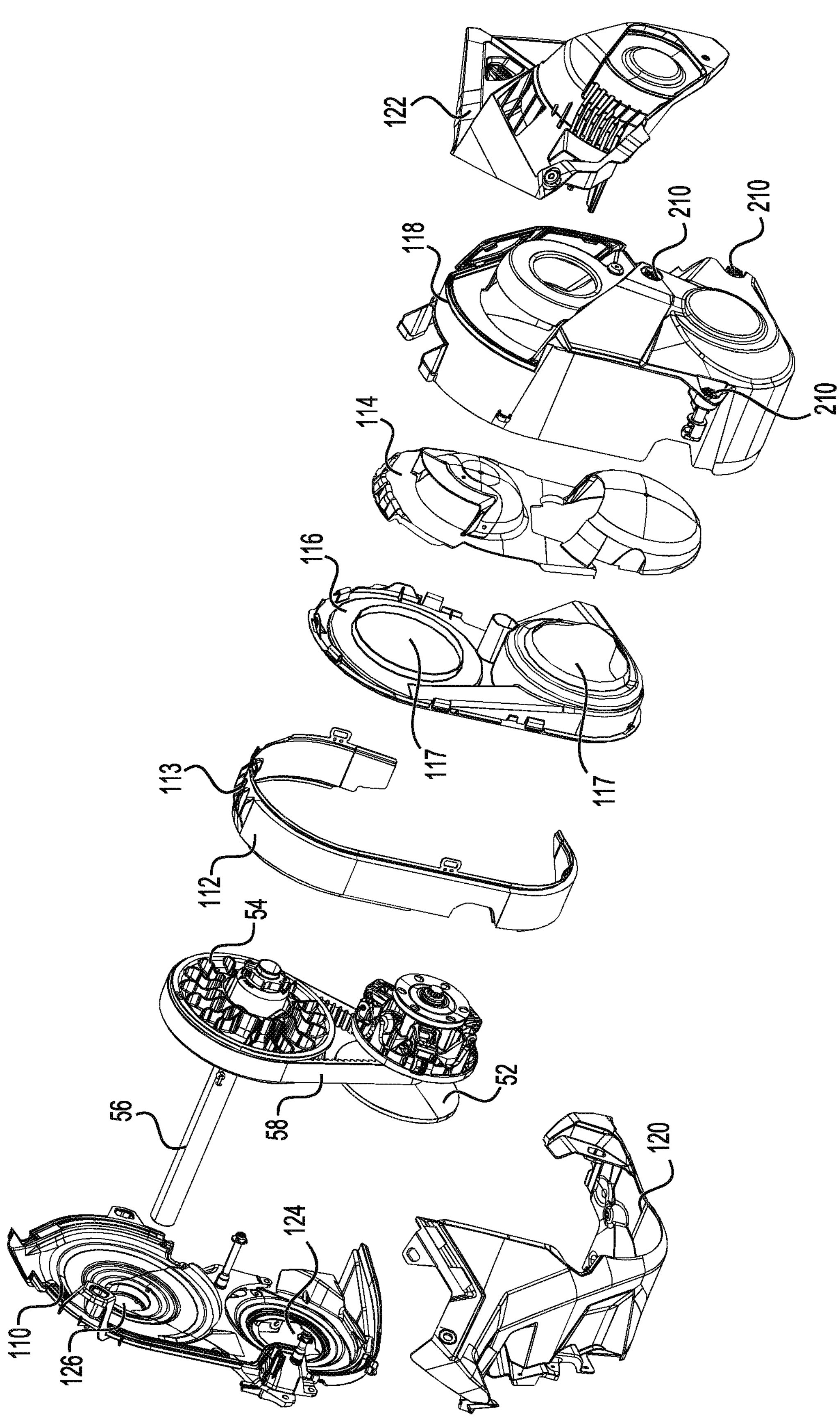
FIG. 12 is an exploded view of the CVT of FIG. 5.

With reference to FIG. 12, the CVT housing 70 includes a plurality of housing components that together enclose the drive pulley 52, the driven pulley 54 and the belt 58. Notably, in this embodiment, the CVT housing 70 includes a back plate assembly 110, a peripheral guard 112, an acoustic member 114, an intermediate cover 116 and a removable outer cover 118. In this embodiment, the CVT housing 70 also includes two optional aesthetic outer cover portions 120, 122 that provide continuous surfaces with adjacent fairings 90 of the snowmobile 10.

The peripheral guard 112 is enclosed between the back plate assembly 110 and the removable outer cover 118 and partly surrounds the belt 58. As shown in FIG. 12, the peripheral guard 112 has a vent 113 disposed at an upper end thereof which defines in part the upper air outlet 76 of the CVT housing 70. The intermediate cover 116 is enclosed between the back plate assembly 110 and the removable outer cover 118 such that the drive pulley 52 is disposed between the intermediate cover 116 and the back plate assembly 110. The intermediate cover 116 is provided to protect the acoustic member 114, which is made of a softer material than the intermediate cover 116, from moving parts of the CVT 50 and/or debris projected within the CVT housing 70. As shown in FIG. 12, the intermediate cover 116 defines two large openings 117 that are generally aligned with the drive and driven pulleys 52, 54. The openings 117 allow the noise emitted by the moving components of the CVT 50, namely the drive and driven pulleys 52, 54 and the transmission belt 58 to reach the acoustic member 114.

The acoustic member 114 is enclosed between the intermediate cover 116 and the removable outer cover 118. The acoustic member 114 is made of an acoustic material (e.g., foam) to dampen noise emitted by the CVT 50. The acoustic member 114 is vertically aligned with the drive and driven pulleys 52, 54.

The removable outer cover 118 is disposed on the left side 81 of the CVT housing 70 and is connected to the back plate assembly 110. In this embodiment, the removable outer cover 118 defines the two air inlets 72, 74 and also defines in part each of the upper and lower air outlets 76, 78. As will be described in greater detail further below, in this embodiment, the removable outer cover 118 is removably and toollessly connected to the back plate assembly 110.

Figure 13:
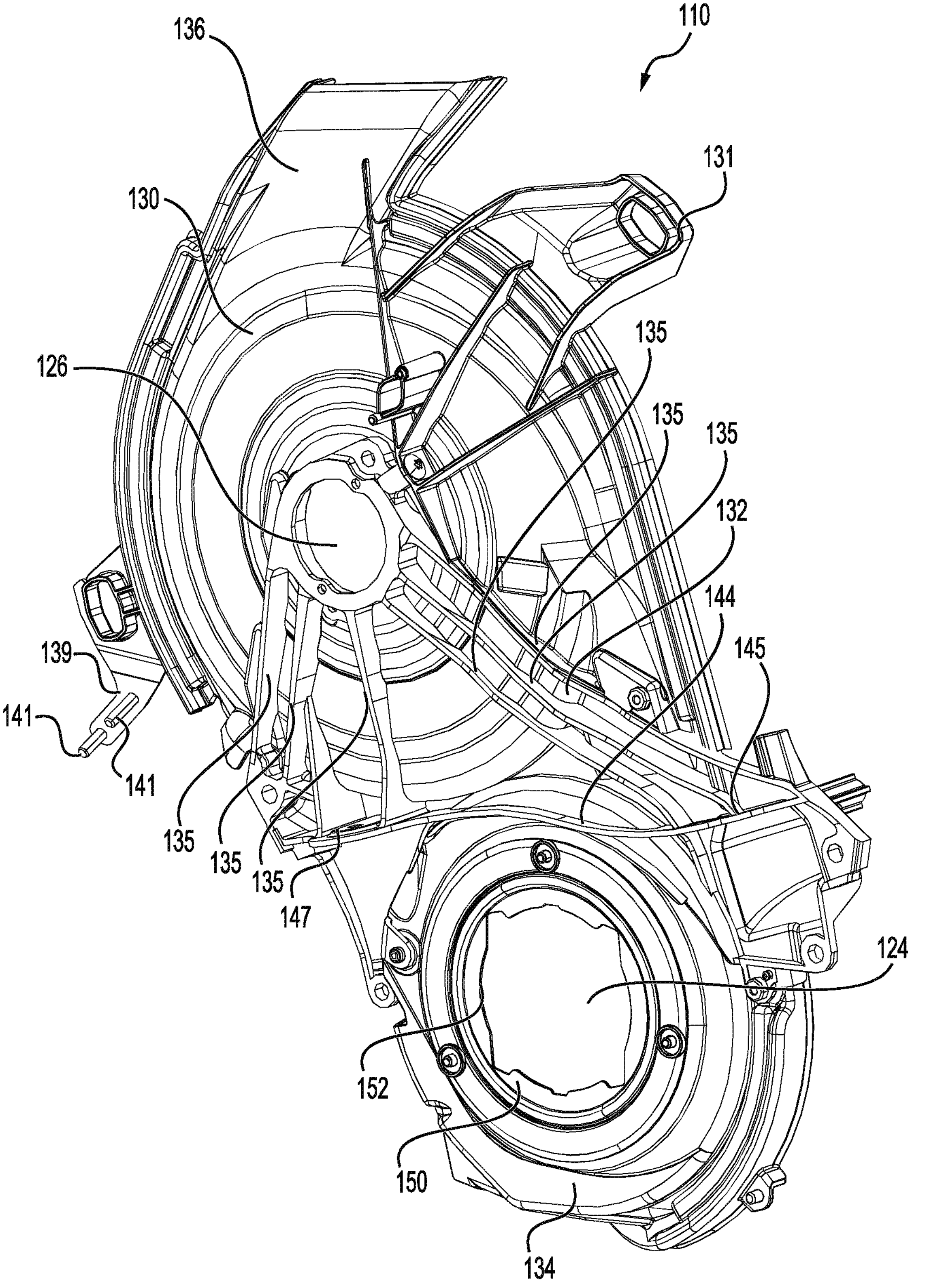
FIG. 13 is a perspective view, taken from a front, right side, of a back plate assembly of the CVT housing.

As shown in FIGS. 11 and 12, the back plate assembly 110 is a rightmost component of the CVT housing 70 and is thus disposed on the right side 83 of the CVT housing 70. With reference to FIG. 13, the back plate assembly 110 is configured to receive the output shaft 62 of the engine 42 therethrough. Notably, the back plate assembly 110 defines a drive opening 124 through which the output shaft 62 extends into the CVT housing 70 to connect to the drive pulley 52. The back plate assembly 110 also defines a driven shaft opening 126 through which the driven shaft 56 extends into the CVT housing 70 to connect to the driven pulley 56. The back plate assembly 110 is fixed to the frame 16 and therefore may also be referred to as a "fixed assembly" of the CVT housing 70. In other words, during operation of the snowmobile 10, the back plate assembly 110 (and thus the CVT housing 70) is movable relative to the engine 42 but fixed relative to the frame 16. As will be explained below, the back plate assembly 110 is also connected to the engine 42 via a resilient connection to allow relative movement between the CVT housing 70 and the engine 42. In other words, the back plate assembly 110 is resiliently connected to the engine 42.

Figure 15:
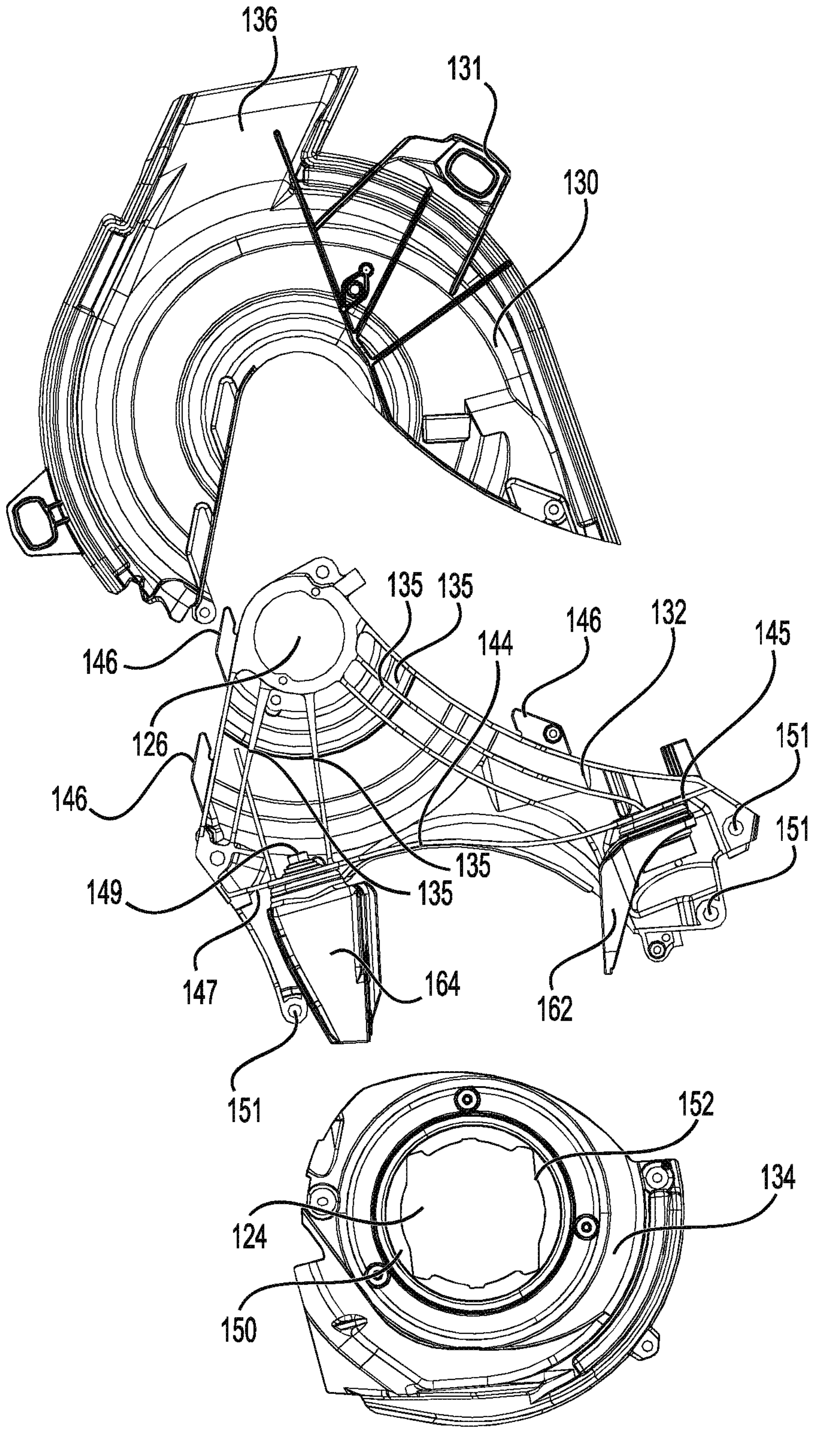
FIG. 15 is an exploded view of the back plate assembly of FIG. 13.

As best shown in FIG. 15, in this embodiment, the back plate assembly 110 includes three separate plate members 130, 132, 134 that are connected to one another to form the back plate assembly 110. Notably, the back plate assembly 110 includes an upper plate member 130, a middle plate member 132 and a lower plate member 134. The upper and lower plate members 130, 134 define the upper and lower ends of the back plate assembly 110 respectively, and the middle plate member 132 is disposed between the upper and lower plate members 130, 134.

Figure 14:
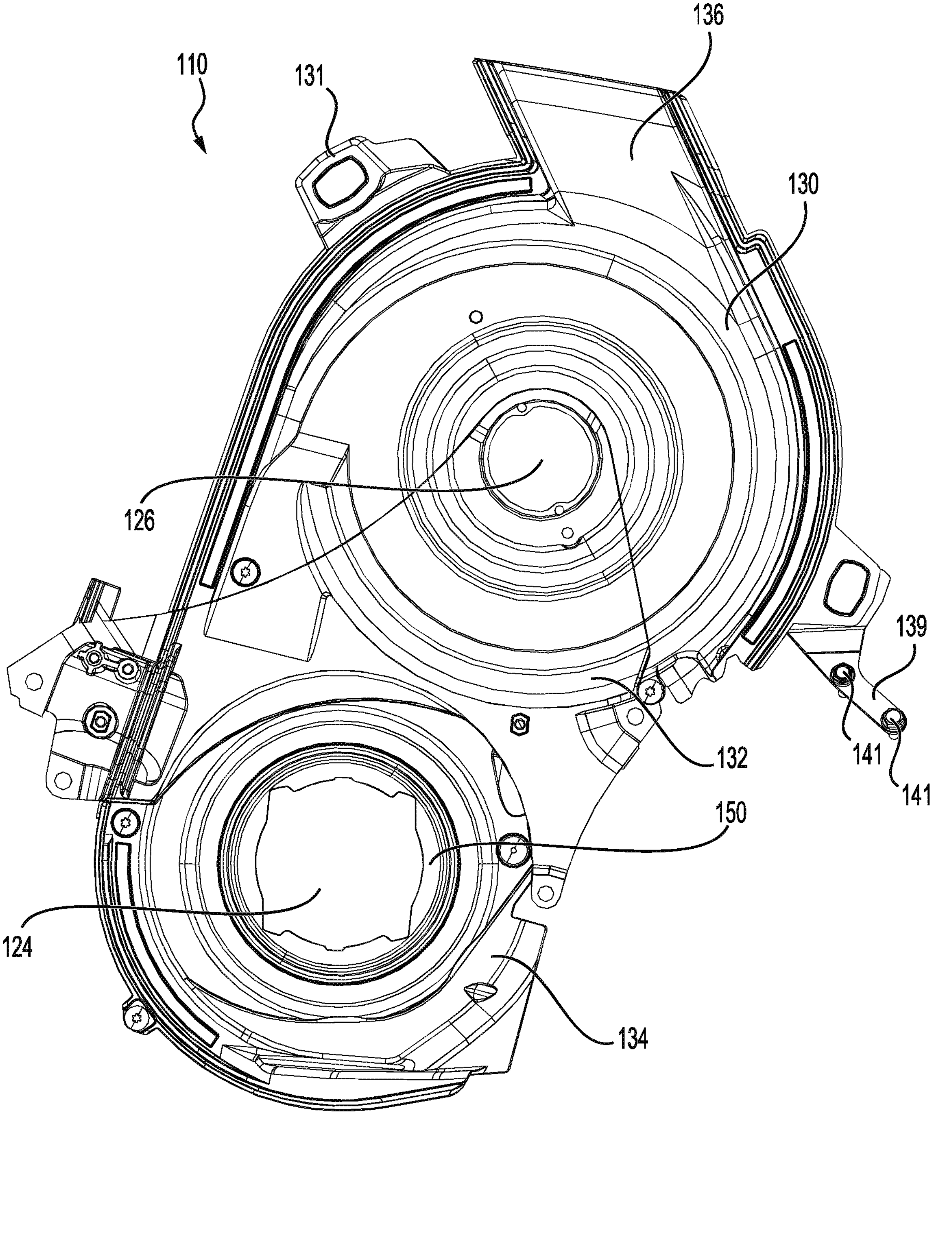
FIG. 14 is a left side elevation view of the back plate assembly of FIG. 13.

The upper plate member 130 has an upper outlet portion 136, at an upper end thereof, that defines in part the upper air outlet 76 of the CVT housing 70. A lower end of the upper plate member 130 has a shape generally corresponding to a shape of an upper end of the middle plate member 132. With reference to FIGS. 1, 13 and 14, the upper plate member 130 also has a rear extending flange 139 that is connected, via two fasteners 141, to the left beveled surface 23 of the tunnel 20 to secure the CVT housing 70 to the tunnel 20. As shown in FIG. 13, a connector 131 is connected to the upper plate member 130 and extends laterally outwardly therefrom in order to connect to the removable outer cover 118.

The lower plate member 134 defines the drive opening 124 through which the output shaft 62 extends into the CVT housing 70. As will be discussed in greater detail below, a sealing member 150 is provided at the drive opening 124 to limit air flow through the drive opening 124.

In this embodiment, the back plate assembly 110 (and thus the CVT housing 70) is connected to the engine 42 and to the frame 16 via the middle plate member 132. In order to accommodate this connection to the engine 42 and to the frame 16, the middle plate member 132 is made of a different material, namely a more rigid material, than the upper and lower plate members 130, 134. Specifically, in this embodiment, the middle plate member 132 is made of a metallic material while the upper and lower plate members 130, 134 are made of a more flexible material, namely a non-metallic material. In particular, the upper and lower plate members 130, 134 are made of plastic material. The upper and lower plate members 130, 134 may be made of any other suitable material in other embodiments. The middle plate member 132 may thus also be referred to as a "rigid mounting portion" of the back plate assembly 110.

It is contemplated that, in other embodiments, the upper, middle and lower plate members 130, 132, 134 could be made of the same rigid material to support the connection to the engine 42 and to the frame 16.

As can be seen in FIGS. 13 to 15, at an upper end portion thereof, the middle plate member 132 defines the driven shaft opening 126 through which the driven shaft 56 extends into the housing 70. In this embodiment, the middle plate member 132 is connected to the upper plate member 130 via tabs 146 (FIG. 15) provided at the upper end portion of the middle plate member 132. The tabs 146 are received in respective recesses of the upper plate member 130. A lower end of the middle plate member 132 has a shape generally corresponding to the shape of an upper end of the lower plate member 134. In this embodiment, the rigid mounting portion 132 is fastened to the upper and lower plate members 130, 134 via respective fasteners (e.g., bolts).

Figure 16:
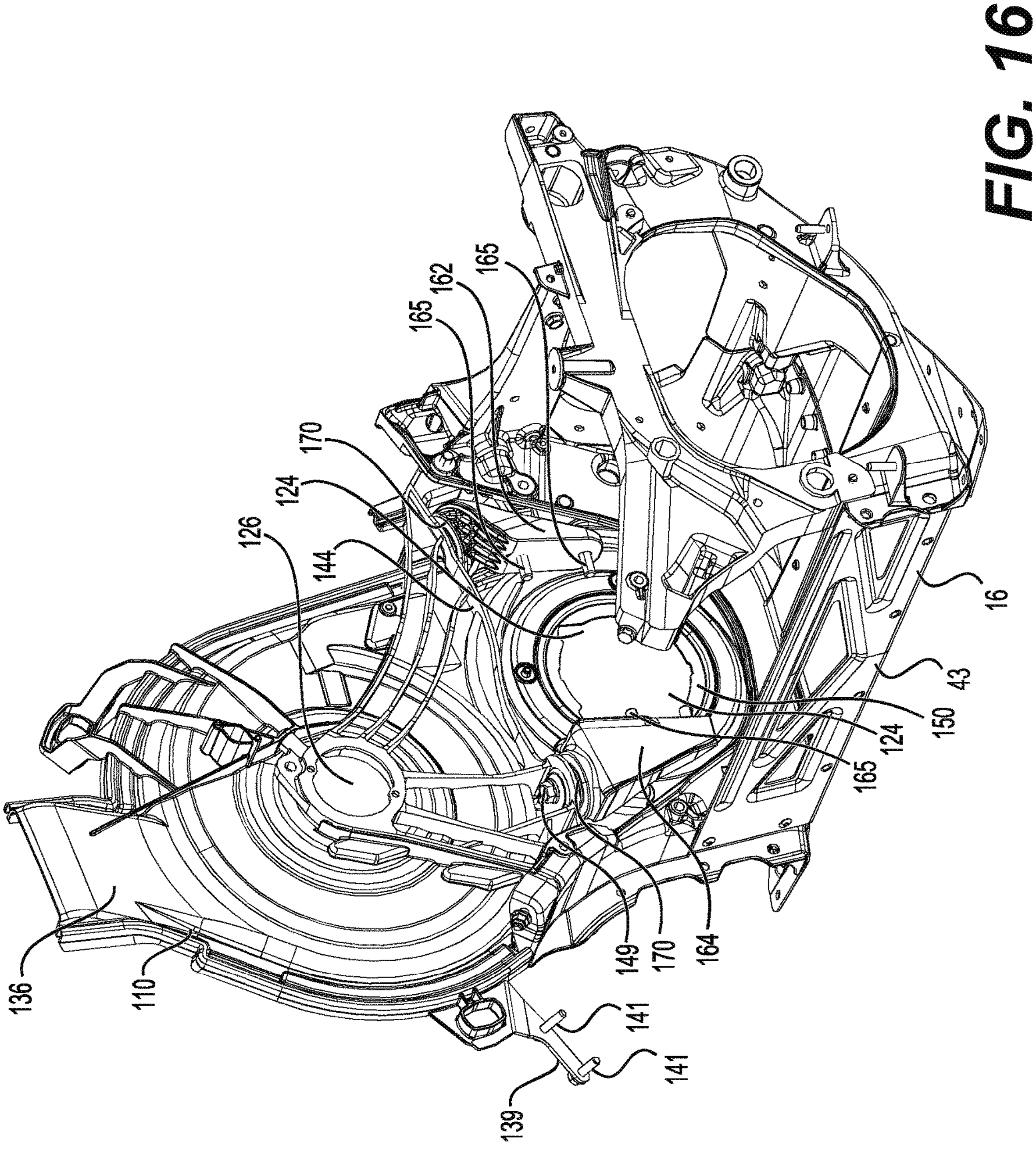
FIG. 16 is a perspective view, taken from top, rear, right side, of the back plate assembly of FIG. 13 and part of the frame of the snowmobile.

With reference to FIGS. 13, 15 and 16, the middle plate member 132 has an outer flange 144 on a right side thereof (i.e., an outer side of the back plate assembly 110 facing away from the internal volume of the CVT housing 70) for connecting the back plate assembly 110 to the engine 42. The outer flange 144 extends generally longitudinally from a front end to a rear end of the middle plate member 132. The middle plate member 132 also has a plurality of ribs 135 on the right side thereof, each rib 135 generally extending from the driven shaft opening 126 to the outer flange 144. The ribs 135 may provide further rigidity to the middle plate member 132 and thus to the CVT housing 70.

Figure 21:
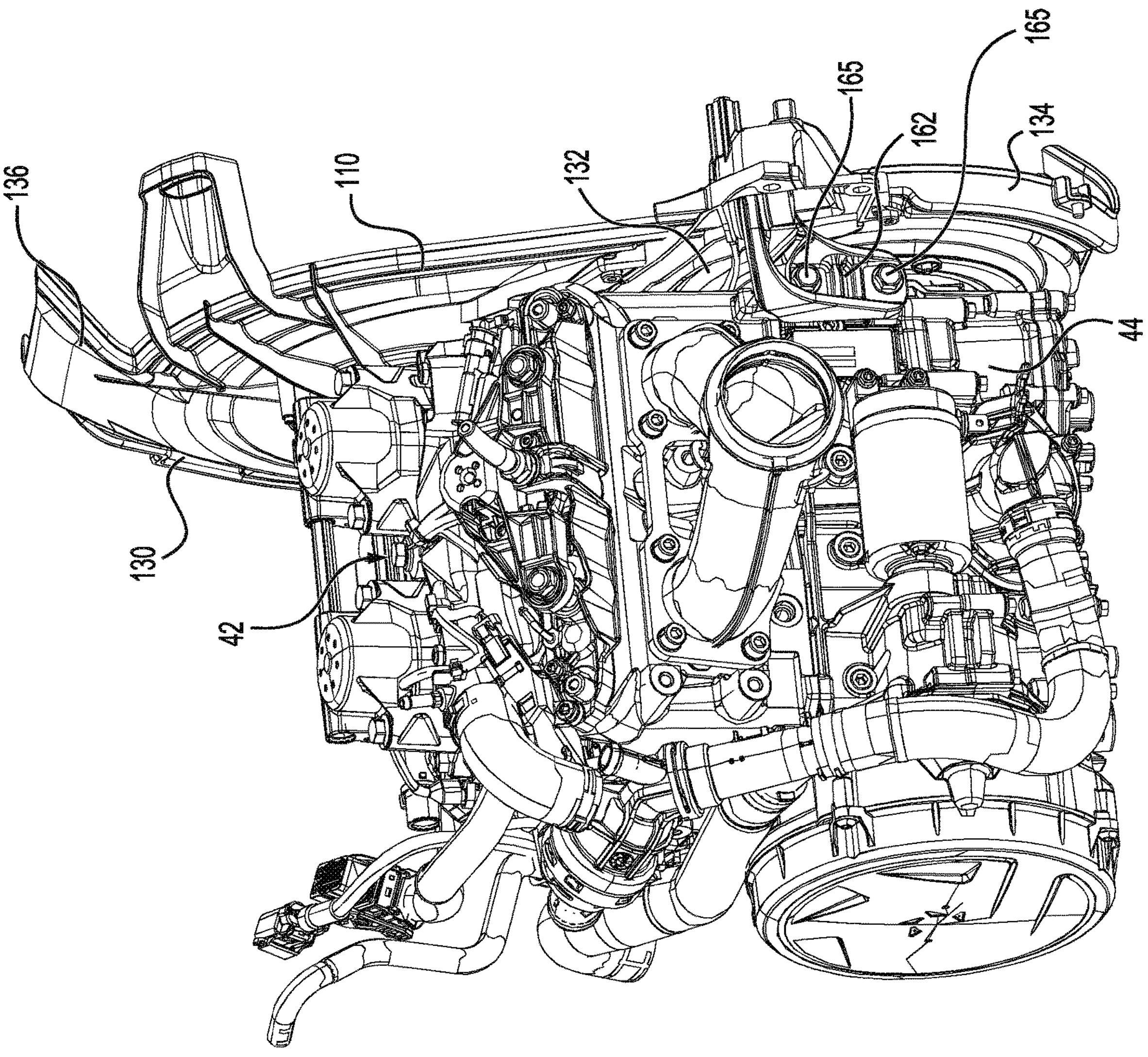
FIG. 21 is a perspective view, taken from a top, front, right side, of the engine and the back plate assembly of FIG. 20.
Figure 22:
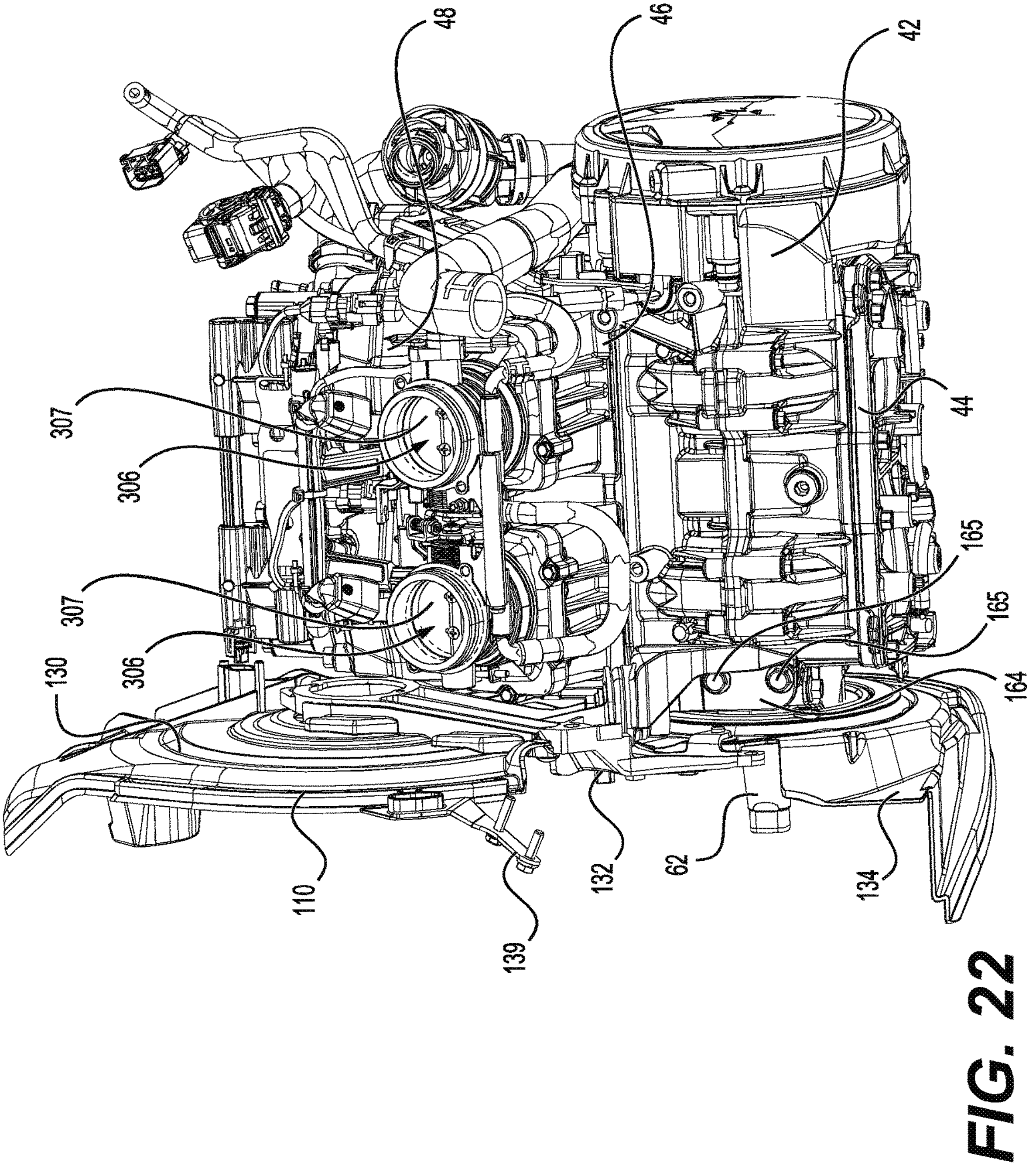
FIG. 22 is a perspective view, taken from a top, rear, right side, of the engine and the back plate assembly of FIG. 20.

With reference to FIG. 15, the outer flange 144 defines an opening at a front portion 145 of the outer flange 144 and another opening at a rear portion 147 of the outer flange 144 for receiving respective fasteners 149 therein (FIGS. 15, 16, 19, 20). In particular, as shown in FIGS. 15 and 16, front and rear interconnecting members 162, 164 connect the front and rear portions 145, 147 of the outer flange 144 to front and rear transmission mounts 158, 160 provided on a left end portion of the crankcase 44. Each of the front and rear transmission mounts 158, 160 defines two threaded openings (not shown) for receiving respective fasteners 165 therein (FIGS. 21, 22). The fasteners 165 extend through the corresponding interconnecting members 162, 164 and are received by the openings of the transmission mounts 158, 160.

Figure 19:
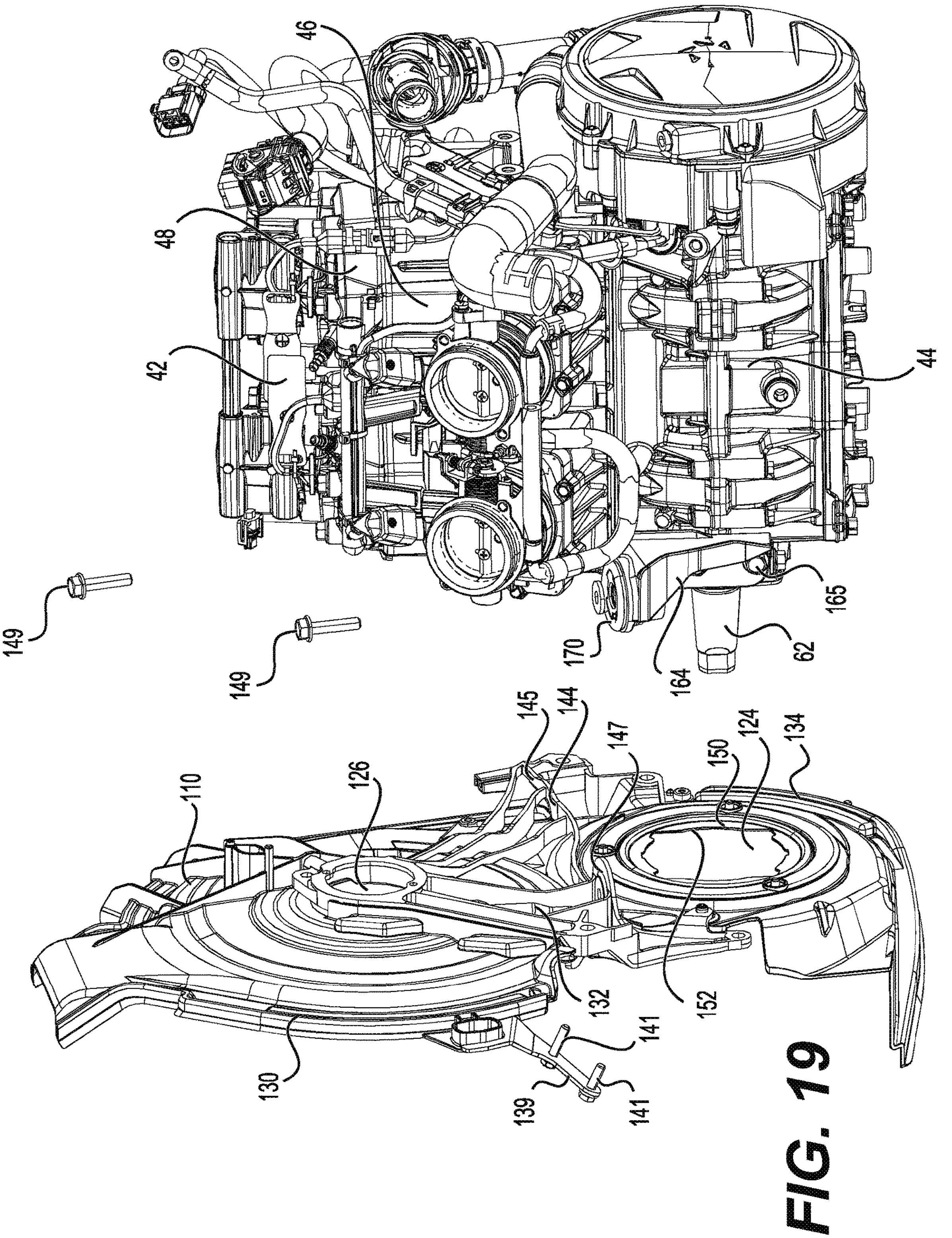
FIG. 19 is a perspective view, taken from a top, rear, right side, of the engine and the back plate assembly in the exploded configuration of FIG. 18.

Moreover, as best shown in FIGS. 18 and 19, for each connection between the outer flange 144 and the engine 42, a respective damping element 170 is provided for resiliently connecting the middle plate member 132 to the engine 42. Each damping element 170 is disposed between a corresponding one of the front and rear transmission mounts 158, 160 and the outer flange 144, and more particularly between the a corresponding one of the interconnecting members 162, 164 and the outer flange 144. In this embodiment, the damping elements 170 are made of elastomeric material (e.g., rubber). As such, the engine 42 is resiliently connected to the middle plate member 132 to allow movement of the engine 42 relative to the CVT housing 70.

Figure 17:
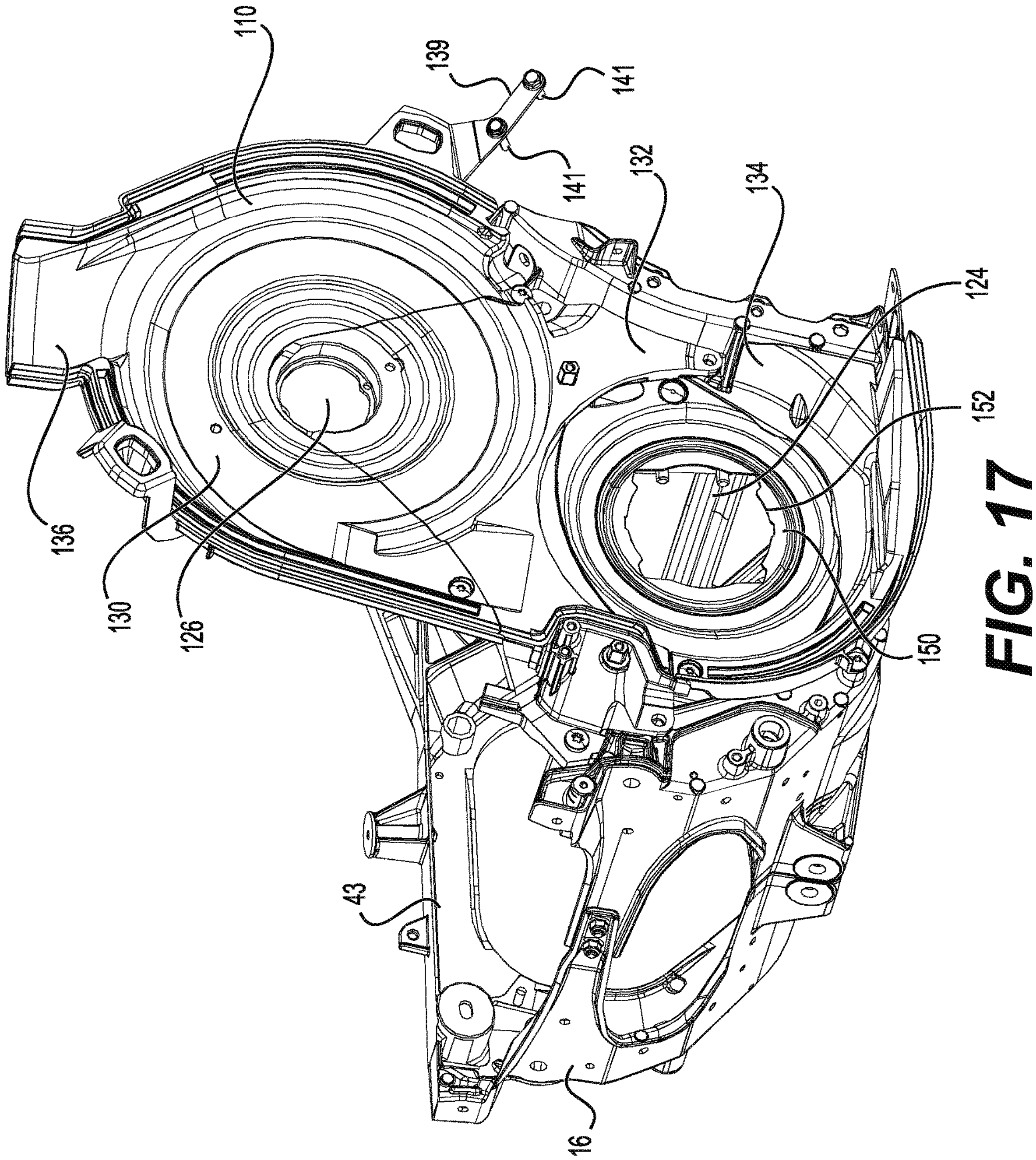
FIG. 17 is a perspective view, taken from a front, left side, of the back plate assembly and the part of the frame of the snowmobile of FIG. 16.

As mentioned above, the middle plate member 132 is also connected to the frame 16. In particular, as shown in FIG. 15, the middle plate member 132 defines a plurality of openings 151 disposed along front and rear edges of the middle plate member 132. The openings 151 receive fasteners therein that connect the middle plate member 132 to the engine bay portion 43 of the frame 16, as shown in FIGS. 16 and 17.

Figure 20:
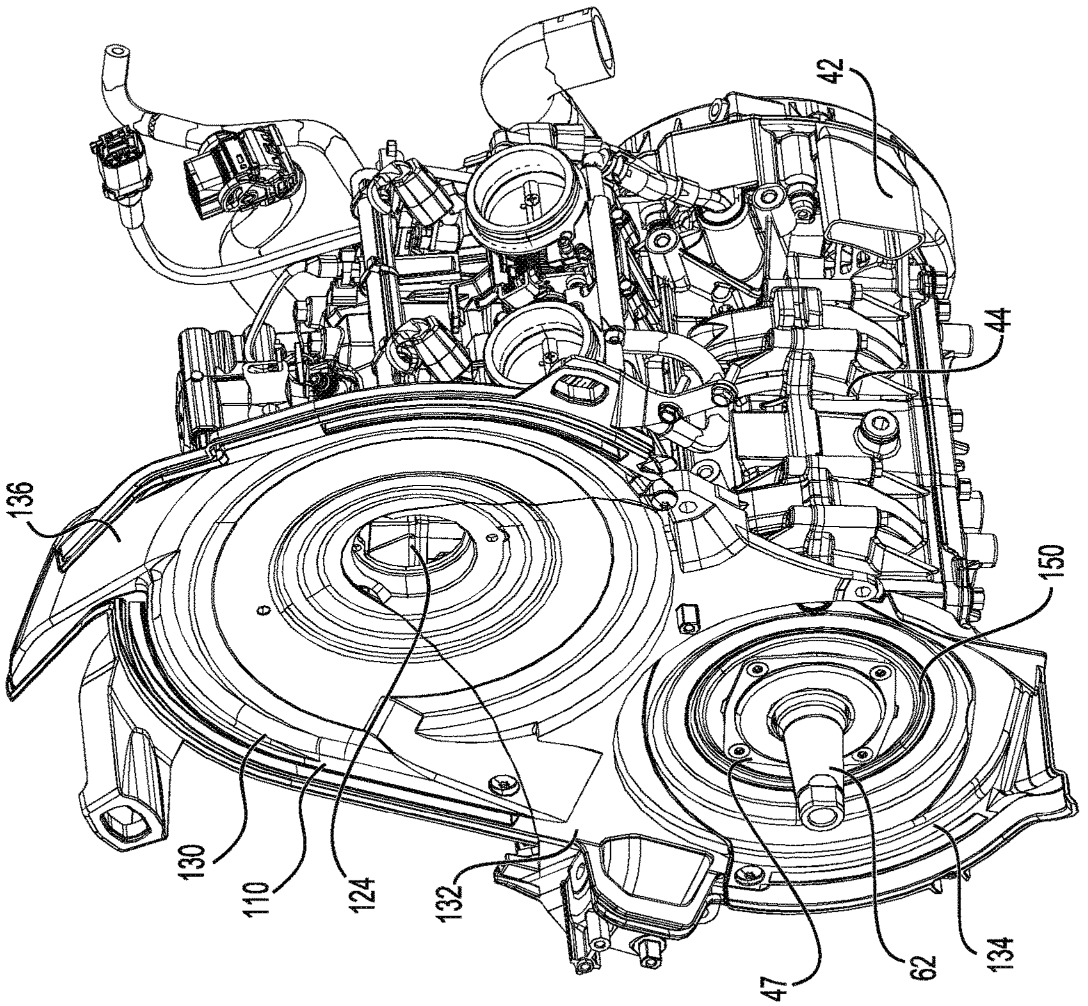
FIG. 20 is a perspective view, taken from a top, rear, left side, of the engine and the back plate assembly shown connected to one another.

With reference now to FIGS. 18 to 20, as mentioned above, the sealing member 150 is connected to the lower plate member 134 of the back plate assembly 110. In particular, the sealing member 150 covers part of the drive opening 124, and more specifically is disposed in the drive opening 124 of the back plate assembly 110. The sealing member 150 is provided to form a seal between the CVT housing 70 and part of the engine 42 extending through the drive opening 124 so as to limit air flow through the drive opening 124 and thereby optimize air flow within the CVT housing 70 through the dedicated air inlets 72, 74 and air outlets 76, 78. Moreover, the sealing member 150 is configured to allow relative movement between the CVT housing 70 and the engine 42. Notably, because the CVT housing 70 is fixedly connected to the frame 16, whereas the engine 42 can move relative to the frame 16, the CVT housing 70 is movable relative to the engine 42. Therefore the sealing member 150 limits air flow through the drive opening 124 despite the relative movement between the CVT housing 70 and the engine 42.

In this embodiment, the sealing member 150 is configured to surround and form a seal with the output portion 69 of the crankcase 44 (on the left side of the crankcase 44) through which the output shaft 62 extends outwardly therefrom. Therefore, an inner edge 152 of the sealing member 150 has a shape corresponding to the shape of a periphery of the output portion 69. More specifically, in this embodiment, the inner edge 152 has a curved shape with four corners that matches the shape of the periphery of the output portion 69 of the crankcase 44. Other shapes are contemplated in other embodiments.

In this embodiment, the sealing member 150 has a circular outer periphery (i.e., an outer circumference) that is sized to fit the circular drive opening 124. Notably, the outer periphery of the sealing member 150 may be interlocked with an inner edge of the lower plate member 134 that defines the drive opening 124. The sealing member 150 may be connected to the lower plate member 134 in any suitable way. For instance, the sealing member 150 may be glued to the lower plate member 134.

Furthermore, in this embodiment, the sealing member 150 is a flexible sealing member made of a flexible material. Notably, the sealing member 150 is made of an elastomeric material (e.g., rubber). The flexibility of the sealing member 150 allows for movement of the engine 42 relative to the CVT housing 70 while generally maintaining the seal with the output portion 69 of the crankcase 44 to limit air flow through the drive opening 124.

Figure 23:
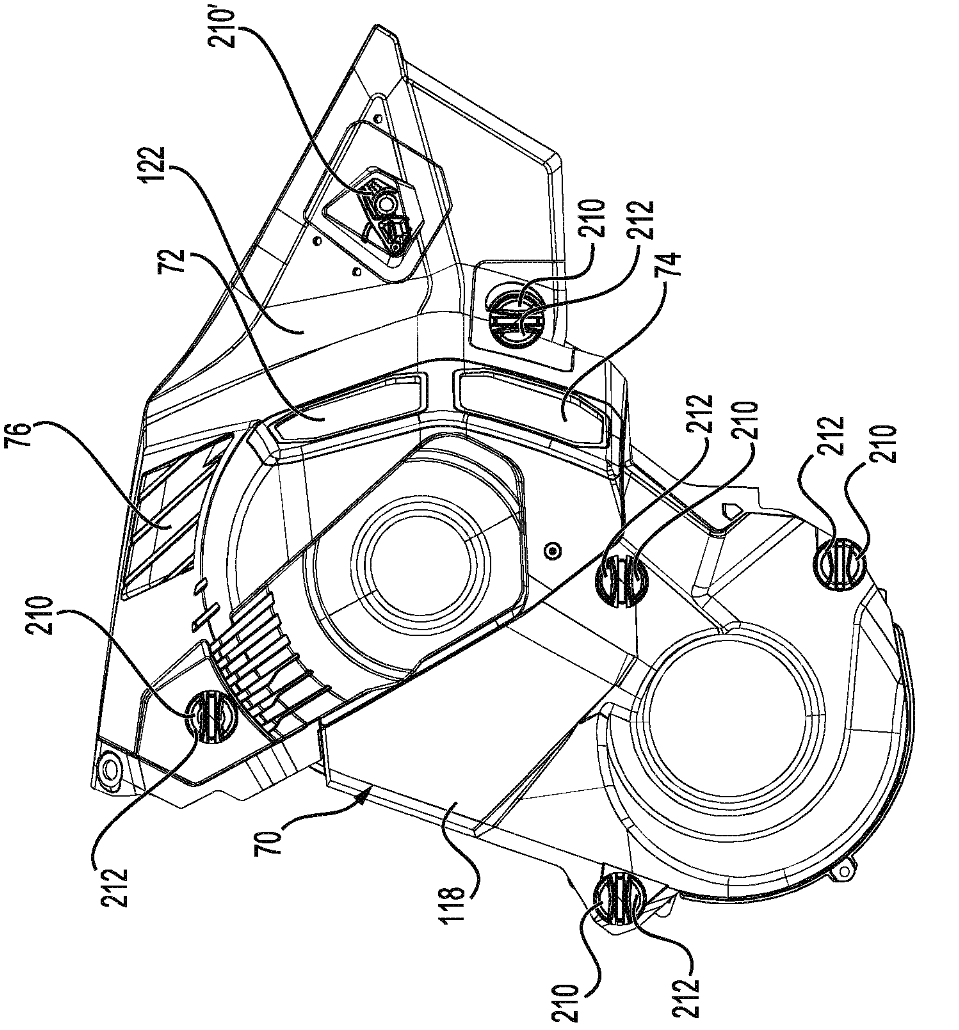
FIG. 23 is a left side elevation view of part of the CVT of FIG. 5, showing a removable outer cover and an aesthetic outer cover portion of the CVT housing secured to the back plate assembly via quick-release fasteners.

Turning now to FIG. 23, in this embodiment, the removable outer cover 118 and the aesthetic outer cover portion 122 of the CVT housing 70 are toollessly connected to the back plate assembly 110 in order to facilitate access to the internal components of the CVT 50. That is, the removable outer cover 118 and the aesthetic outer cover portion 122 are selectively connected and disconnected from the back plate assembly 110 without requiring any tools (e.g., a screwdriver, a hex key or other key to fasten a fastener). Notably, with reference to FIG. 23, the removable outer cover 118 and the outer cover portion 122 are selectively connected to the back plate assembly 110 by a plurality of quick-release fasteners 210. Another type of quick-release fastener 210' also selectively connects the aesthetic outer cover portion 122 to the back plate assembly 110. The quick-release fastener 210' will described in more detail further below.

Figure 24:
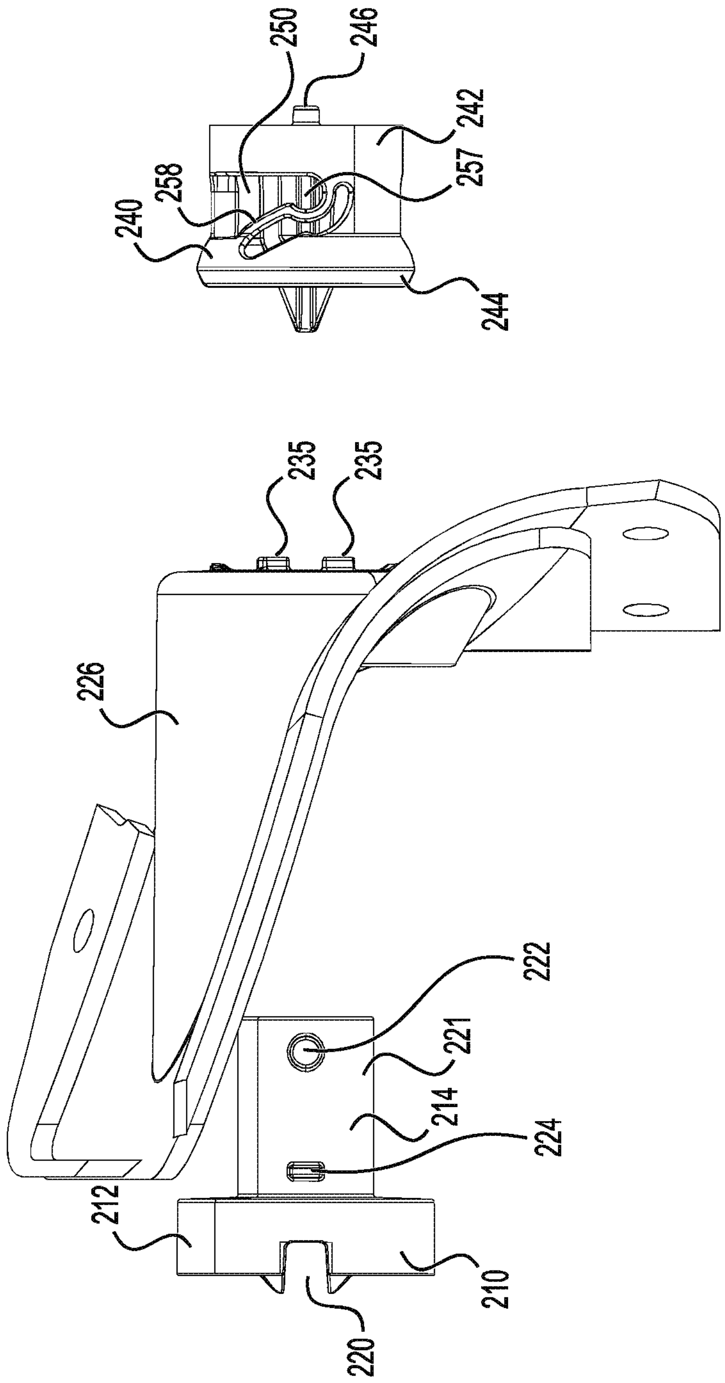
FIG. 24 is an exploded view of a locking assembly including one of the quick-release fasteners of FIG. 23 and a corresponding socket member and fastener receiver.
Figure 25:
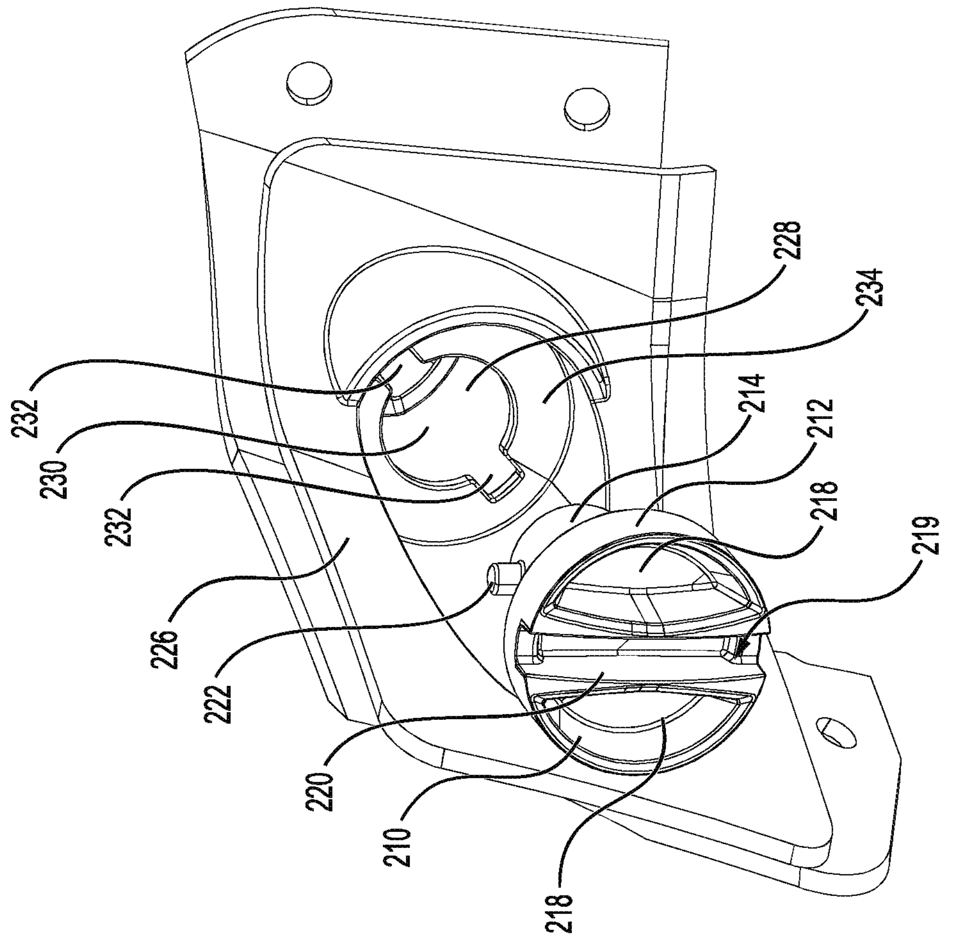
FIG. 25 is a perspective view, taken from a top, rear, left side, of the quick-release fastener of FIG. 24 and a corresponding socket member.

In this embodiment, as shown in FIGS. 24 and 25, each quick-release fastener 210 has a knob 212 and a stem 214 extending from the knob 212. Each quick-release fastener 210 is movable by hand by a user between a locked position (FIG. 26) and an unlocked position (FIG. 27) by turning the knob 212 of the quick-release fastener 210. In particular, with reference to FIG. 25, the circular knob 212 defines two finger recesses 218 disposed on opposite sides of a central portion 219 of the knob 212 extending diametrically across the knob 212. The finger recesses 218 are disposed on a side of the knob 212 opposite the stem 214. The finger recesses 218 are configured to receive respective fingers of the user's hand, namely a thumb and forefinger, to grasp the knob 212 and turn it between the locked and unlocked positions. In this embodiment, the central portion 219 defines a slot 220 provided in case the finger recesses 218 are obstructed and cannot be accessed by the user's fingers (e.g., ice built up within the recesses 218). In particular, the slot 220 is adapted to receive a tool such as a Phillips head screwdriver or other implement to turn the knob 212.

As shown in FIGS. 24 and 25, the stem 214 has a locking protrusion 222 disposed near an end of the stem 214 opposite the knob 212. Moreover, as shown in FIG. 24, the stem 214 also has a rotation limiting protrusion 224 near the knob 212. The protrusions 222, 224 extend radially from a cylindrical body 221 of the stem 214 and are circumferentially aligned with one another.

As shown in FIGS. 24 and 25, the quick-release fastener 210 is partly inserted into a socket member 226 which is connected to the component of the CVT housing 70 that is removably connected via the quick-release fastener 210. Notably, the socket member 226 is connected to the removable cover portion 118 or the aesthetic outer cover portion 122 of the CVT housing 70. It is contemplated that the socket member 226 could be integrally made with the removable cover portion 118 or the aesthetic outer cover portion 122 in other embodiments. As shown in FIG. 25, the socket member 226 defines a socket 228 that receives the stem 214 of the quick-release fastener 210 therein. The socket 228 includes a cylindrical recess 230 and two rectangular recesses 232 diametrically opposed relative to the cylindrical recess 230. The socket member 226 also has a shoulder 234 surrounding the socket 228 to prevent the knob 212 from entering into the socket 228.

Figure 26:
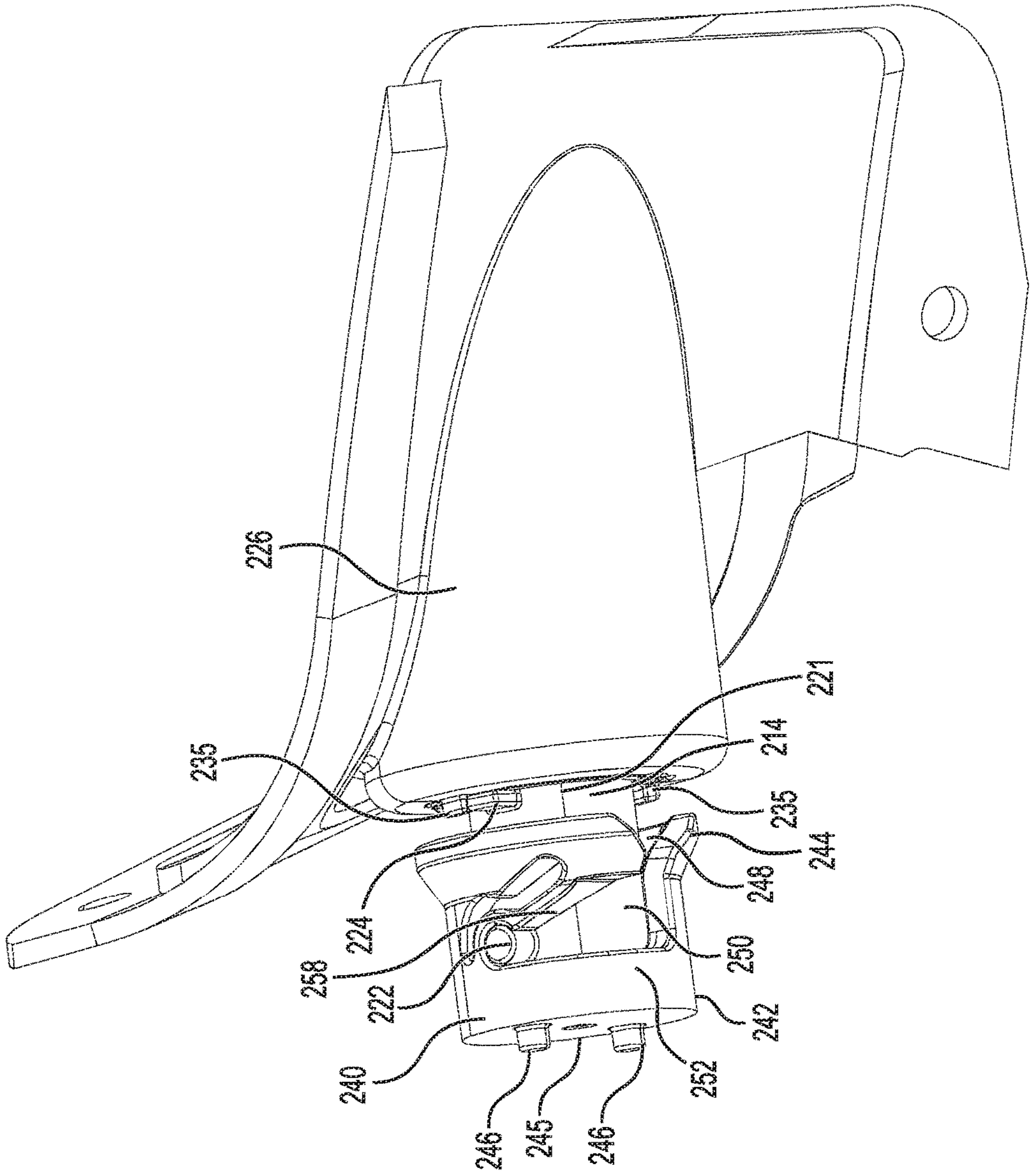
FIG. 26 is a perspective view of the quick-release fastener, the fastener receiver and the socket member of FIG. 24 shown with the quick-release fastener in a locked position.
Figure 27:
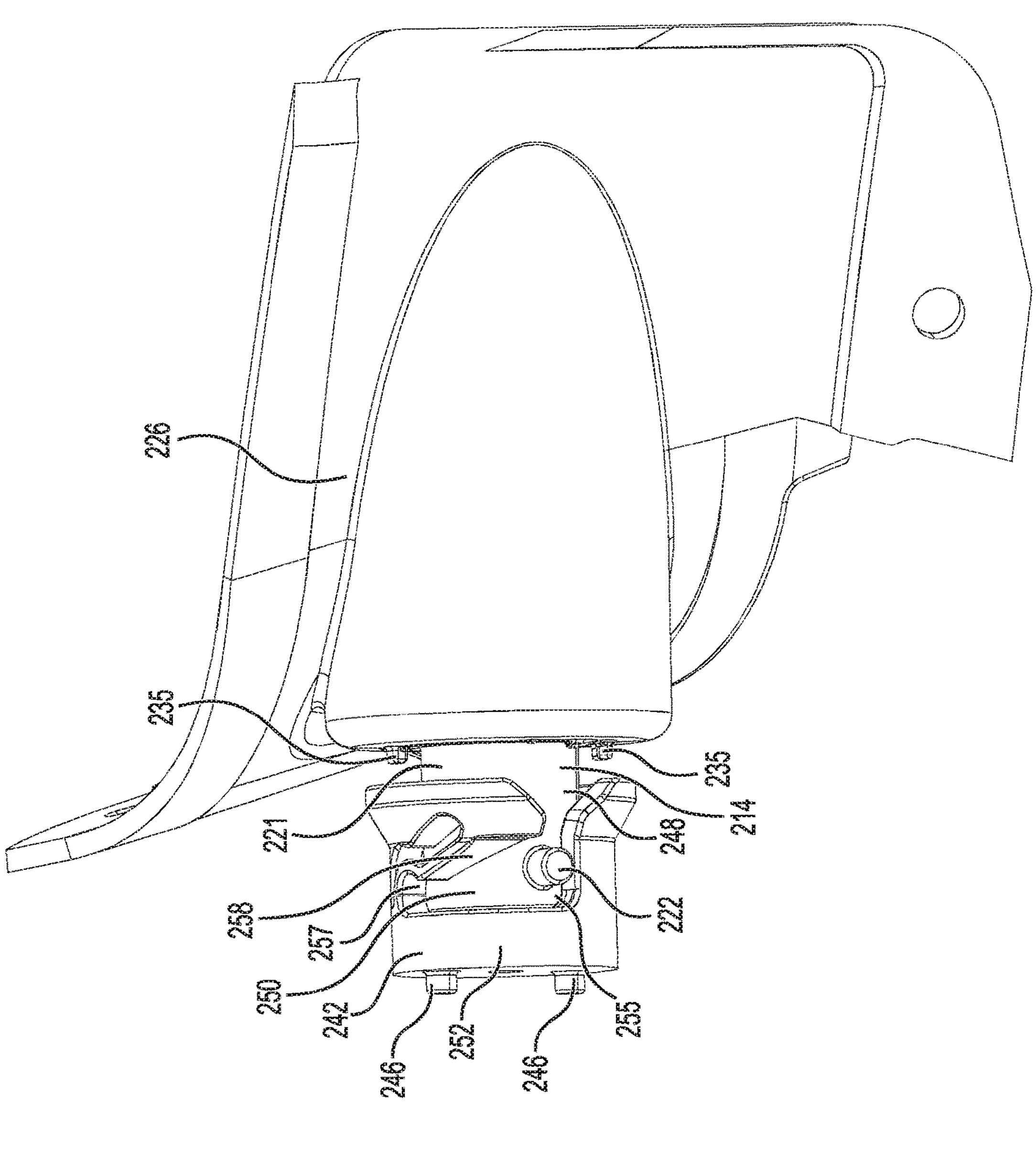
FIG. 27 is a perspective view of the quick-release fastener, the fastener receiver and the socket member of FIG. 24 shown with the quick-release fastener in an unlocked position.

With reference to FIG. 24, each quick-release fastener 210 engages a corresponding fastener receiver 240 that is configured to selectively retain the quick-release fastener 210. In this embodiment, the fastener receivers 240 are connected to the back plate assembly 210. As best shown in FIG. 26, each fastener receiver 240 has a cylindrical body portion 242 and a flared lip portion 244 extending from the cylindrical body portion 242. The cylindrical body portion 242 has a closed end 245 and two fixing protrusions 246 extending therefrom. The fixing protrusions 246 are configured to be received in corresponding recesses (not shown) defined by the back plate assembly 110. A central recess is defined by the flared lip portion 244 and the cylindrical body portion 242 within which part of the cylindrical body 221 of the stem 214 of the corresponding quick-release fastener 210 is inserted. The flared lip portion 244 also defines a slit 248 for insertion of the locking protrusion 222 of the stem 214. The slit 248 opens into a locking recess 250 defined by a sidewall 252 of the cylindrical body portion 242. The locking recess 250 extends circumferentially along the sidewall 252 between first and second opposite circumferential ends 255, 257. The locking recess 250 is defined in part by an angled surface 258 extending generally from the second end 257 of the locking recess 250.

In use, in order to secure the quick-release fastener 210 to the fastener receiver 240 (and thereby secure the removable outer cover 118 or the aesthetic outer cover portion 122 to the back plate assembly 110), the quick-release fastener 210 is inserted into the socket 228, aligning the protrusions 222, 224 with one of the rectangular recesses 232. The quick-release fastener 210 is inserted into the socket 228 until the knob 212 abuts the shoulder 234 of the socket member 226. The rotation of the stem 214 is limited by the interaction between the rotation limiting protrusion 224 and two limiters 235 (FIGS. 24, 26, 27) of the socket member 226. The stem 214 extending from the opposite side of the socket member 226 is then inserted into the corresponding central recess of the fastener receiver 240 by aligning the locking protrusion 222 with the slit 248 such that the locking protrusion 222 is received at the first end 255 of the locking recess 250. At this point, the quick-release fastener 210 is in the unlocked position, illustrated in FIG. 27. In the unlocked position, the quick-release fastener 210 can disengage the back plate assembly 210. The user then turns the quick-release fastener 210 by a quarter-turn (i.e., 90°) to rotate the locking protrusion 222 to the second end 257 of the locking recess 250. The quick-release fastener 210 is thus in the locked position, illustrated in FIG. 26, whereby the fastener receiver 240 retains the quick-release fastener 210. In the locked position, the quick-release fastener 210 engages the back plate assembly 210 via the fastener receiver 240. To remove the quick-release fastener 210, the quick-release 210 is rotated back to the unlocked position and may be guided out of the locking recess 250 by the angled surface 258.

As will be appreciated from the above, the quick-release fastener 210 and the corresponding fastener receives 240 provide a quick and efficient manner for the user to secure removable outer cover 118 or the aesthetic outer cover portion 122 to the back plate assembly 110.

Figure 57:
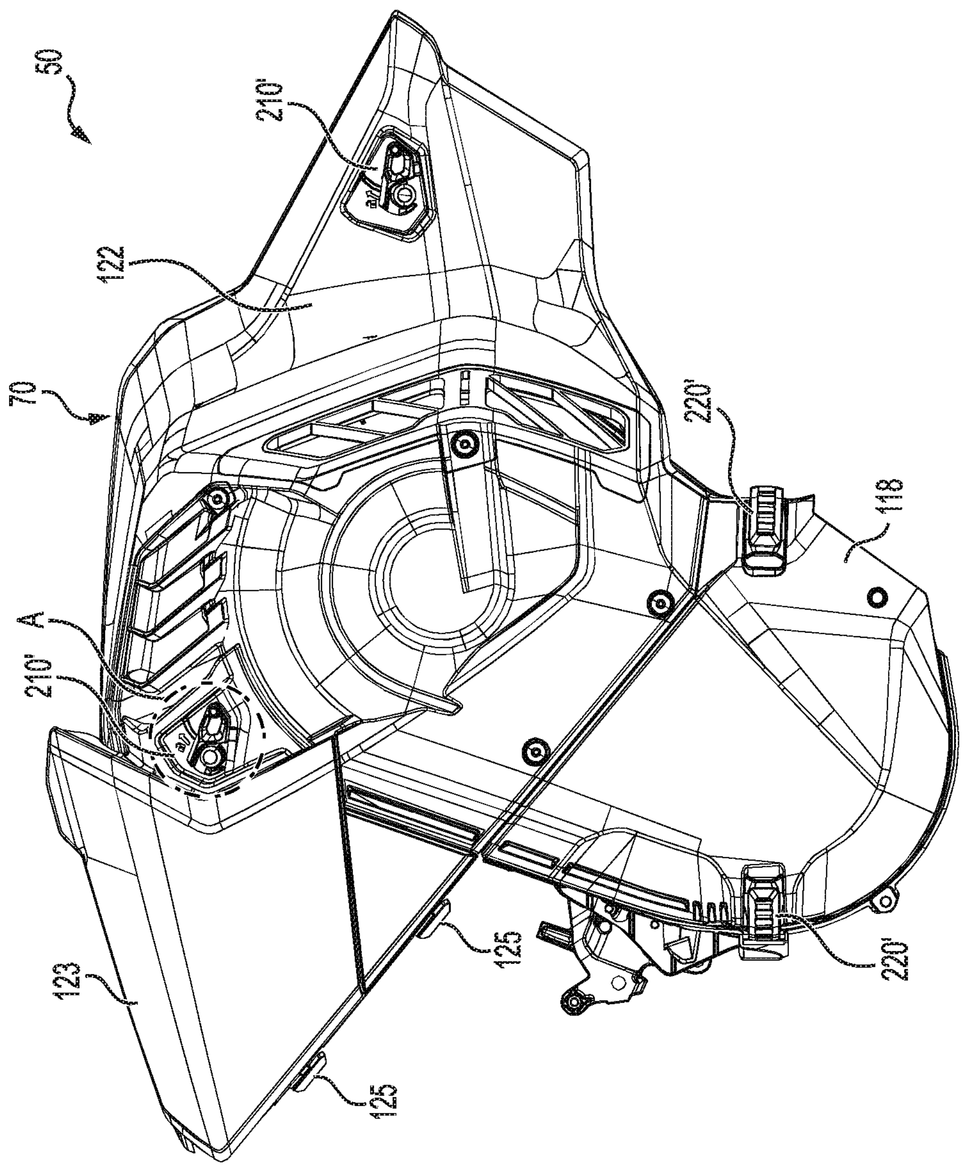
FIG. 57 is a left side elevation view of the CVT according to an alternative embodiment of the present technology.
Figure 58:
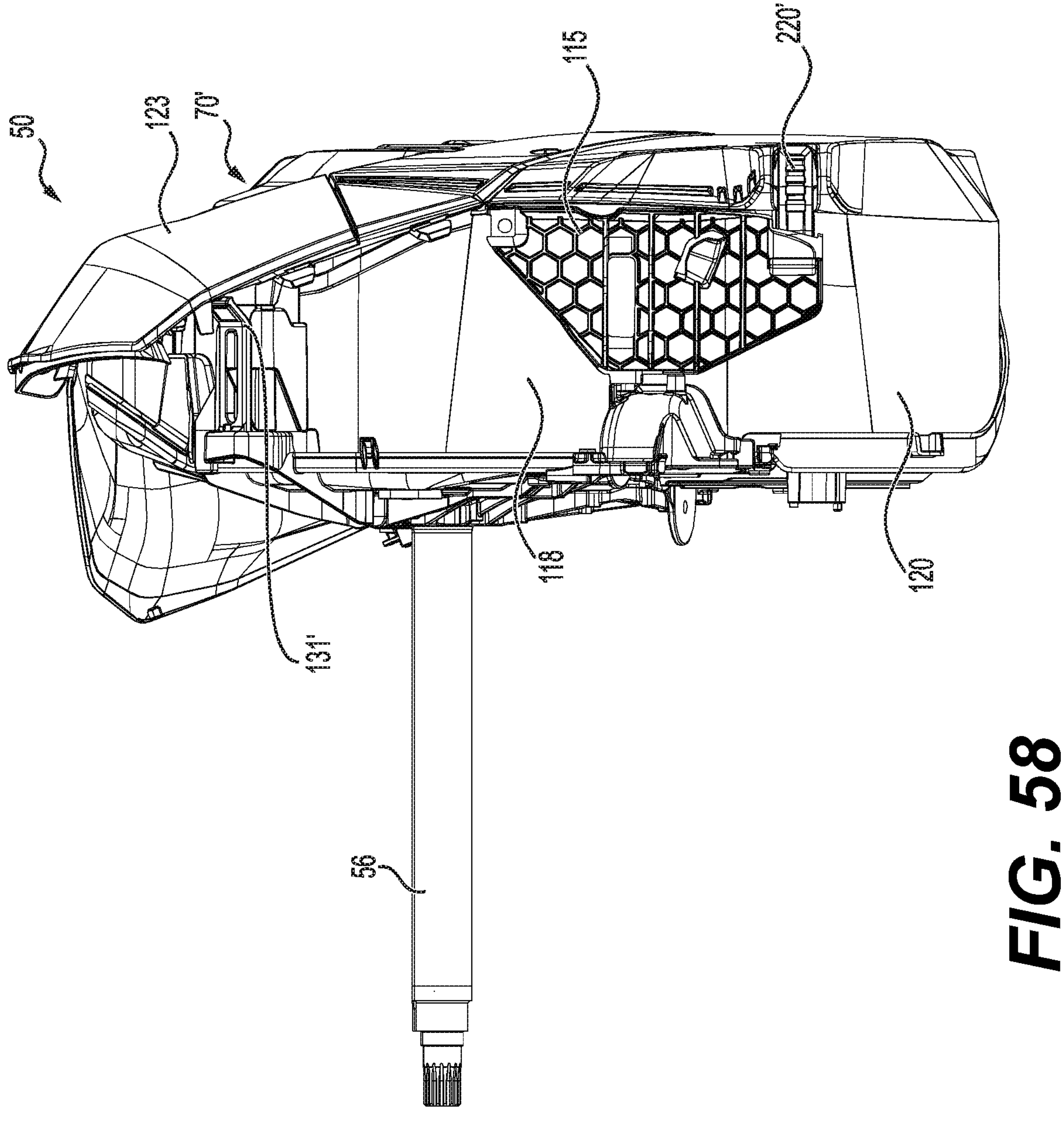
FIG. 58 is a front elevation view of the CVT of FIG. 57 and a driven shaft operatively connected thereto.
Figure 59:
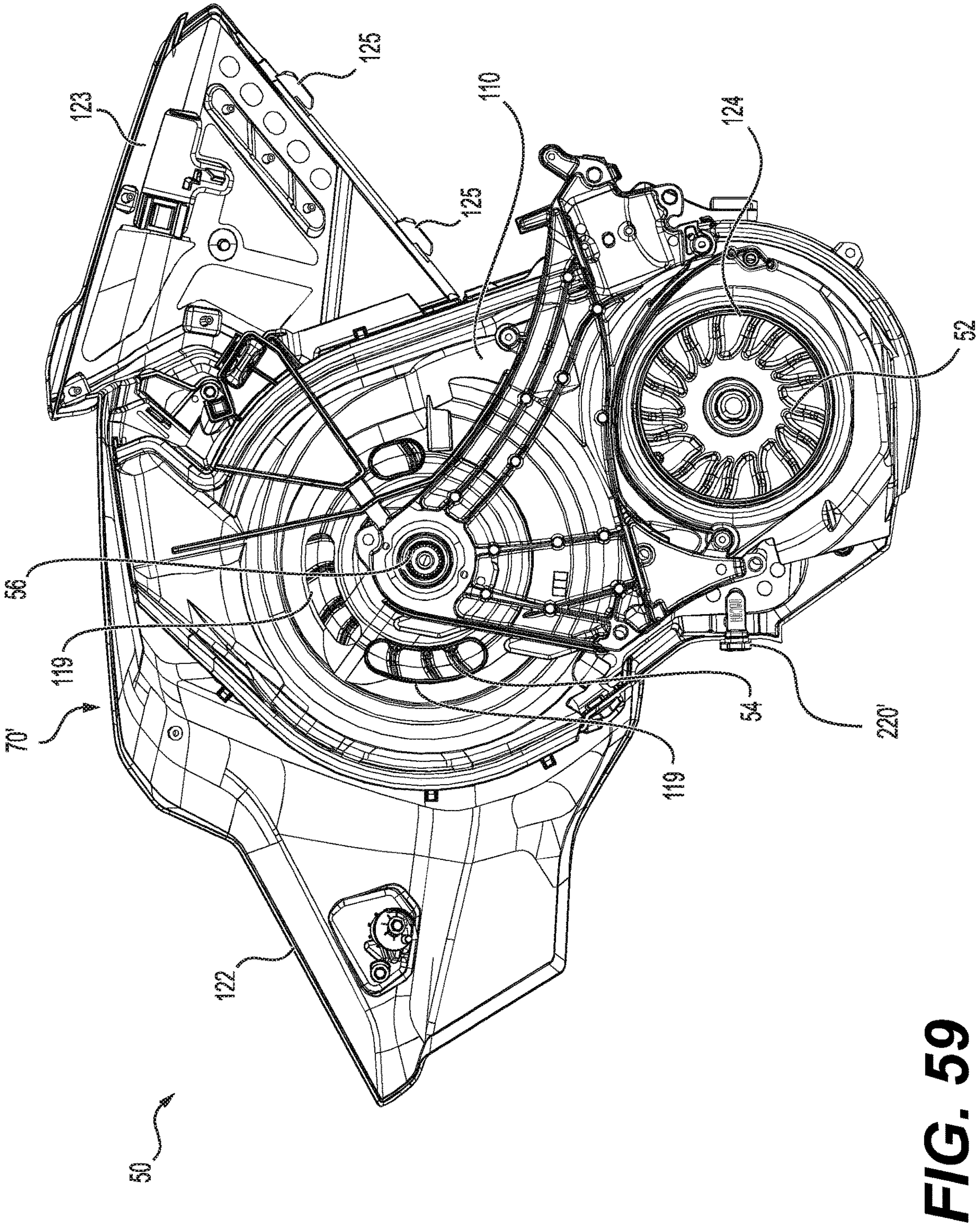
FIG. 59 is a right side elevation view of the CVT and the driven shaft of FIG. 58.
Figure 60:
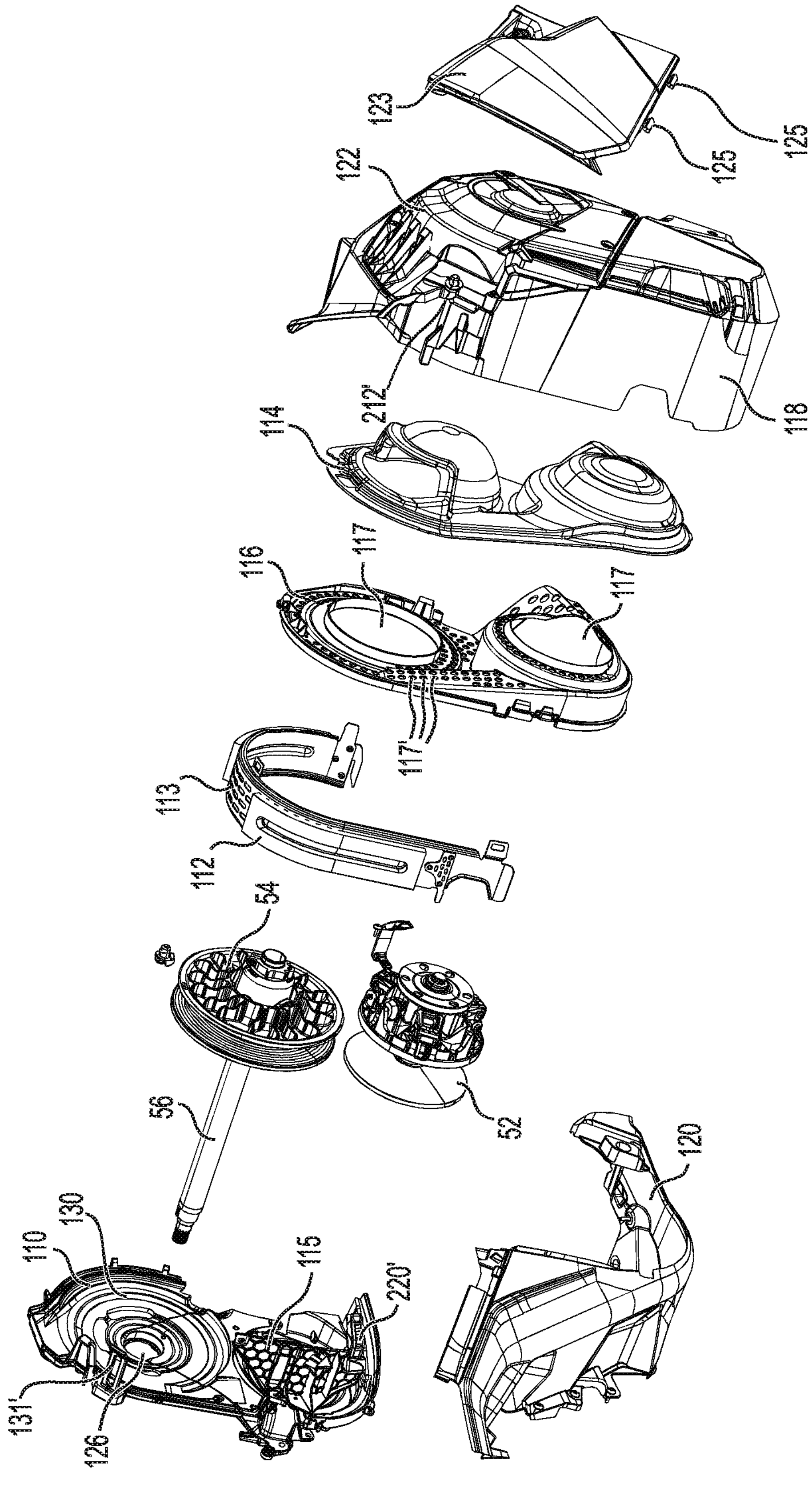
FIG. 60 is an exploded view of the CVT of FIG. 57.
Figure 61:
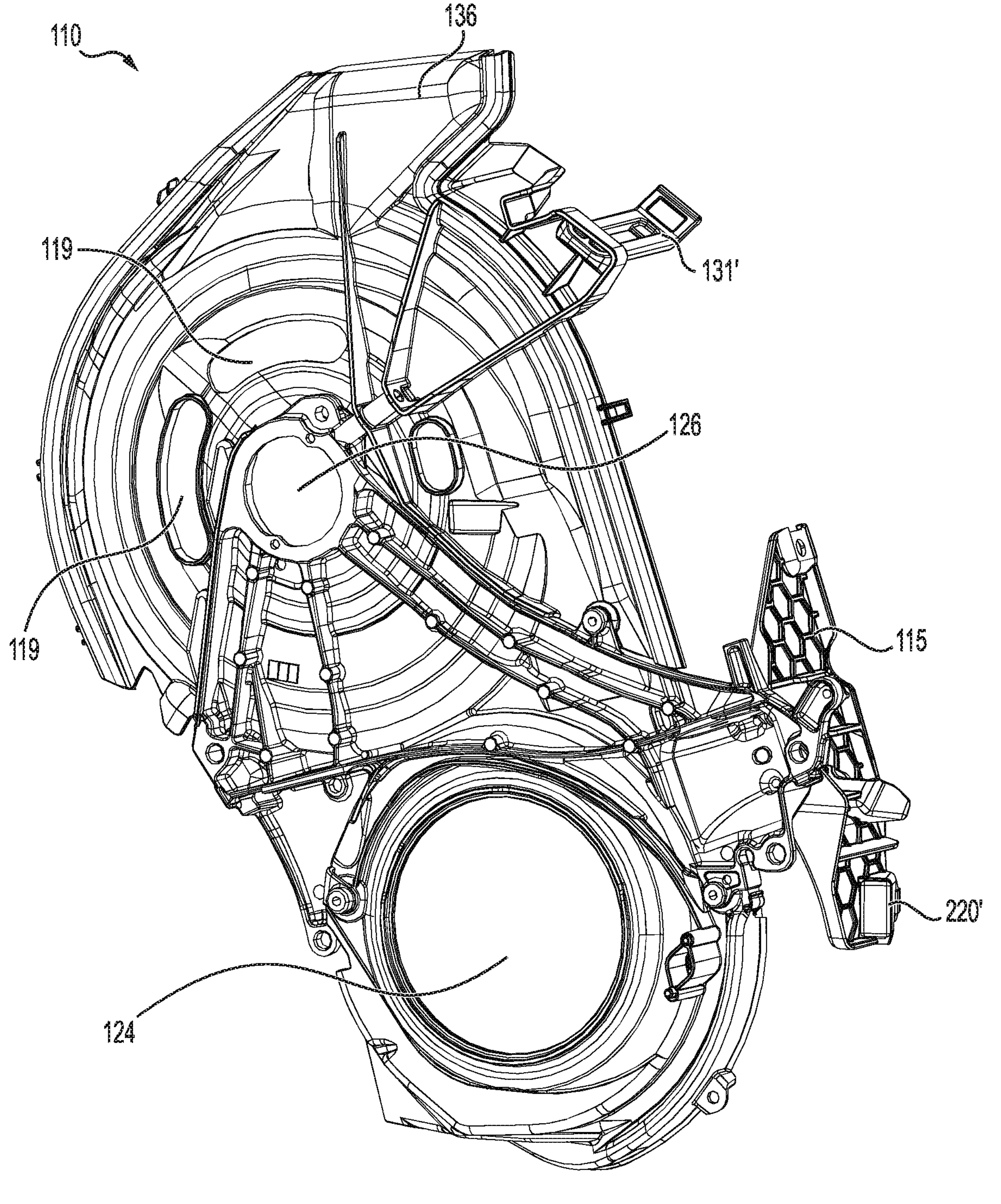
FIG. 61 is a perspective view, taken from a top, front, right side, of the back plate assembly of the CVT of FIG. 57.
Figure 62:
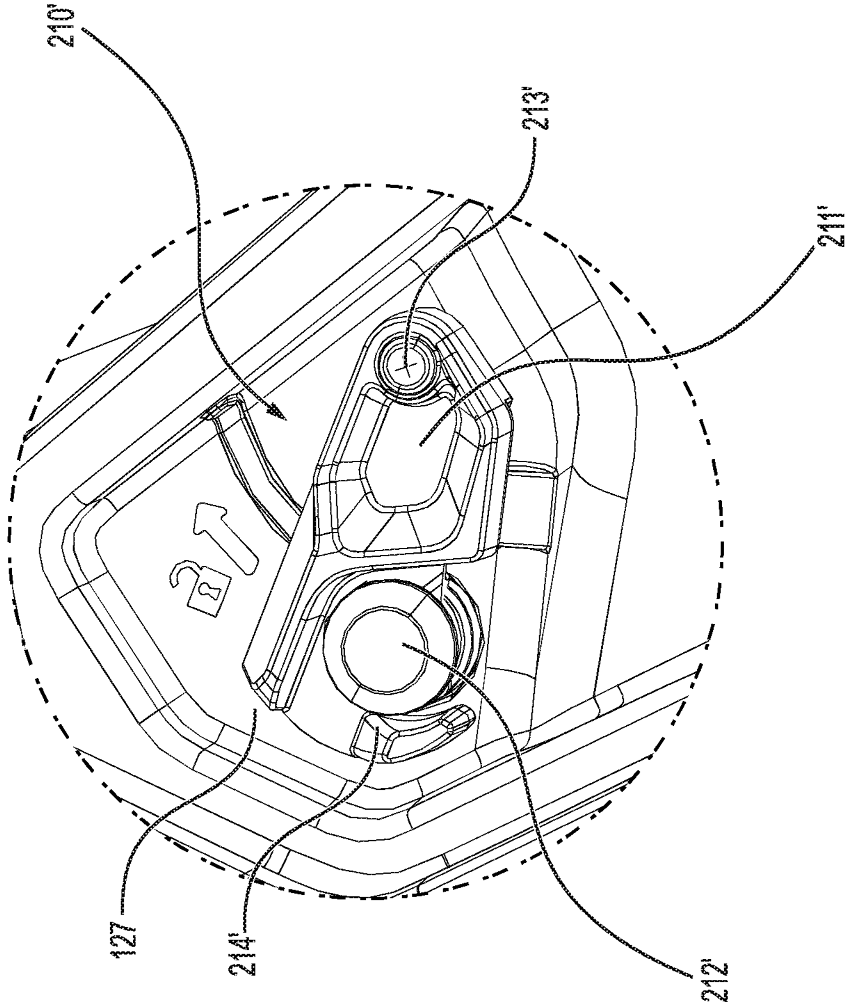
FIG. 62 is a detailed view of a section A in FIG. 57.

With reference to FIGS. 57 to 62, an alternative embodiment of the CVT housing 70, identified as the CVT housing 70', will now be described. Components of the CVT housing 70' corresponding to those of the CVT housing 70 described above have been identified with the same reference numerals. Only significant differences between the components of the CVT housing 70' and those of the CVT housing 70 will be described herein. As shown in FIG. 60, in this alternative embodiment, the CVT housing 70' includes an additional outer cover portion 123 which is hingedly connected to the removable outer cover 118. Notably, the outer cover portion 123 includes hinging tabs 125 at a front edge thereof which engage the removable outer cover 118. The outer cover portion 123 could instead be hingedly connected to an adjacent fairing of the snowmobile 10. The outer cover portion 123 is pivotable about a hinge axis defined by the hinging tabs 125 between an open position and a closed position. In its closed position, the outer cover portion 123 is secured in place by a quick-release fastener 210' (see FIGS. 57 and 62). The quick-release fastener 210' is configured differently from the quick-release fastener 210 described above. Notably, as shown in FIG. 62, the quick-release fastener 210' includes a lever 211' that is pivotable about a lever axis 213' in order to selectively lock and unlock the quick-release fastener 210'. The lever 211' has a generally hook-shaped free end 214' which interacts with a knob 212'. The knob 212' is fixed to the outer cover portion 122 and, in the closed position of the outer cover portion 123, extends through an opening defined by the outer cover portion 123. The lever 211' is then pivoted downward such that the free end 214' wraps about part of the knob 212'. In this position, part of the lever 211' is disposed between a rear surface of a head of the knob 212' and an outer surface 127 of the outer cover portion 123 in order to secure the outer cover portion 123 in its closed position as the knob 212' is prevented from disengaging the outer cover portion 123. As can be seen in FIG. 57, the outer cover portion 122 is also secured in place by another quick-release fastener 210'.

Furthermore, in this alternative embodiment, the removable outer cover 118 is held in place by two straps 220' instead of the quick-release fasteners 210. Notably, the straps 220', which are connected to the back plate assembly 110 (or any other suitable part of the CVT housing 70'), engage respective protrusions (not shown) of the removable outer cover 118 to hold the removable outer cover 118 in place. The straps 220' are lockable onto the removable outer cover 118 on opposite sides, namely front and rear sides, of the removable outer cover 118. In this example, the straps 220' are made of rubber.

Turning now to FIG. 61, in this alternative embodiment, the back plate assembly 110 does not have the sealing member 150. Rather, the drive opening 124 through which the output shaft 62 extends into the CVT housing 70 surrounds the output portion 69 of the crankcase 44 without the sealing member 150 and thus allows a greater amount of air flow from the engine compartment into the CVT housing 70'. Furthermore, in this alternative embodiment, a front protective shield 115 extends laterally outwardly from a front end of the back plate assembly 110 to protect other components of the snowmobile 10. Notably, in the occurrence that the drive pulley 52 projects a piece of debris, the front protective shield 115 prevents the debris from exiting the CVT housing 70' and damaging other components (e.g., an oil pump and/or reservoir). In this alternative embodiment, the front strap 220' is connected to the front protective shield 115. In addition, as shown in FIGS. 60 and 61, in this alternative embodiment, an elastomeric connector 131' is connected to the upper plate member 130 and extends laterally outwardly therefrom in order to connect to the removable outer cover 118. The elastomeric connector 131' is made of an elastomeric material (e.g., rubber).

In addition, as shown in FIG. 59, the back plate assembly 110 also defines air flow apertures 119 through which heated air can flow from the engine compartment into the CVT housing 70', where it is vented outwards. In this alternative embodiment, the air flow apertures 119 are vertically aligned with the driven pulley 54. Air flow through the air flow apertures 119 may help cool the engine compartment without significantly heating the components of the CVT 50.

Furthermore, in this alternative embodiment, as shown in FIG. 60, the intermediate cover 116 defines a plurality of small openings 117' which are considerably smaller in size than the large openings 117 to allow a greater proportion of the noise emitted by the CVT 50 to be absorbed by the acoustic member 114. The smaller openings 117' are distributed throughout a body of the intermediate cover 116. In this alternative embodiment, the intermediate cover 116, the acoustic member 114 and the removable outer cover 118 are held together such that removing the removable cover 118 also removes the acoustic member 114 and the intermediate cover 116 therewith.

Airbox

The airbox 302 of the air intake system 300 will now be described in detail with reference to FIGS. 28 to 31. In this embodiment, the airbox 302 has two air inlets 310 and an air outlet 312 for feeding air into and discharging air from the airbox 302 respectively. As shown in FIGS. 1 and 4, the air inlets 310 are exposed outside of the body of the snowmobile to allow ambient air to be aspirated therein. In particular, the air inlets 310 are positioned on opposite sides of the longitudinal centerplane 13 of the snowmobile 10. The air outlet 312 is fluidly connected to the air intake manifold 304.

The airbox 302 has an airbox body 314 defining an internal volume of the airbox 302. In this embodiment, the airbox body 314 has two separate body portions 316, 318, namely an upper body portion 316 and a lower body portion 318 disposed below the upper body portion 316. The upper and lower body portions 316, 318 are interconnected to one another and define respective portions of the internal volume of the airbox 302. More particularly, with reference to FIG. 30, the upper body portion 316 defines an upper expansion chamber 320 while the lower body portion 318 defines a lower expansion chamber 322. The upper and lower expansion chambers 320, 322 are provided to reduce a noise output of the airbox 302 caused by noise from the engine 42 travelling out through the air intake system 300, notably as a greater number of expansion chambers is helpful to further reduce the noise output. In this embodiment, the lower expansion chamber 322 has a greater volume than the upper expansion chamber 320. The lower expansion chamber 322 is in fluid communication with the air outlet 312. That is, the air outlet 312 opens into (i.e., leads into) the lower expansion chamber 322 such that, during use, air flows from the lower expansion chamber 322 to the air outlet 312. The upper expansion chamber 320 is in fluid communication with the air inlets 310. That is, the air inlets 310 open into the upper expansion chamber 320 such that, during use, air flows through the air inlets 310 into the upper expansion chamber 320.

Figure 31:
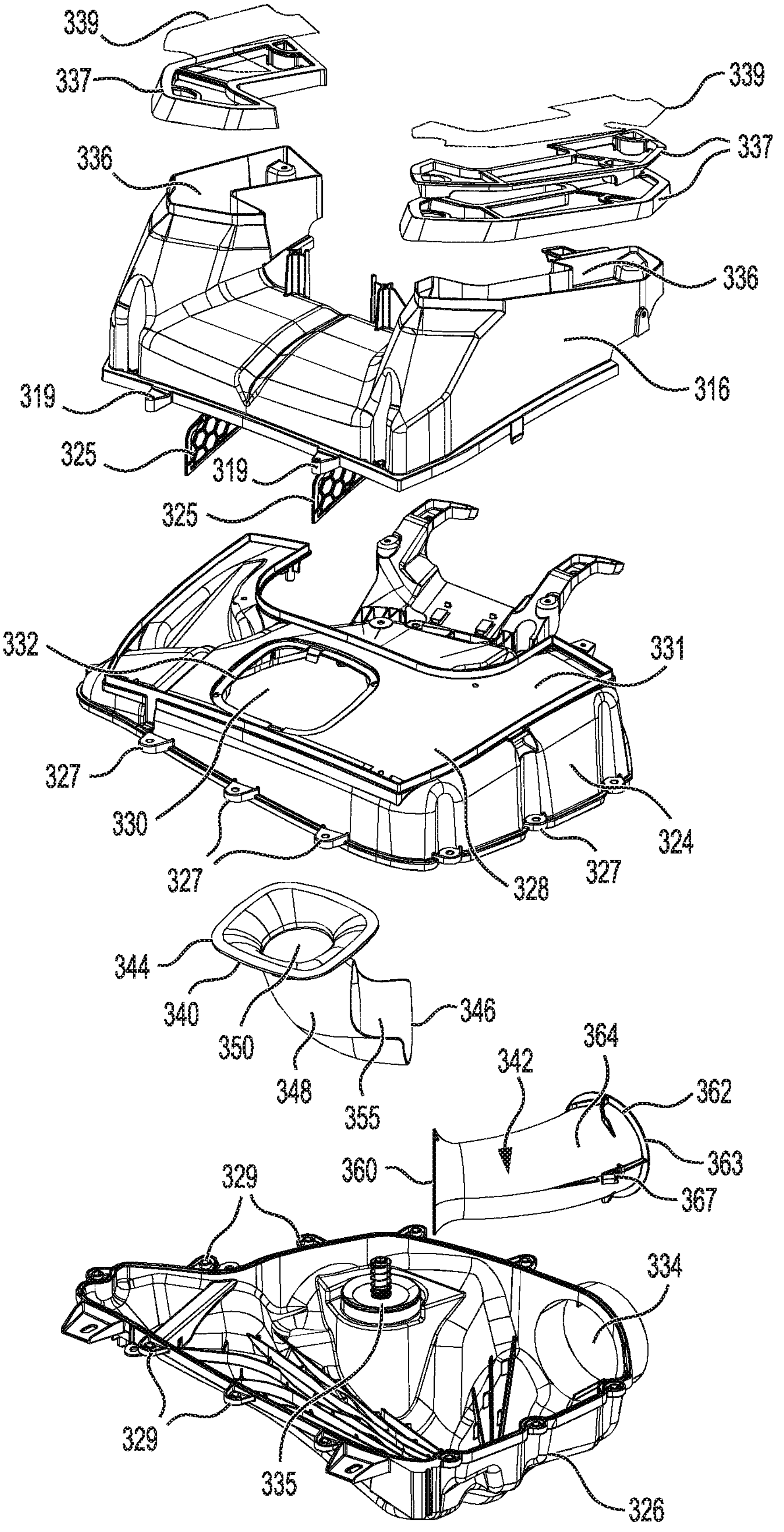
FIG. 31 is a perspective view, taken from a top, front, left side, of the airbox of FIG. 30, shown in an exploded configuration.

As best shown in FIG. 31, the lower body portion 318 includes two housing members 324, 326, namely an upper housing member 324 and a lower housing member 326, which are removably connected to one another. Notably, in this embodiment, a plurality of fasteners (e.g., bolts or rivets) are inserted into connecting flanges 327, 329 of the upper and lower housing members 324, 326, distributed along a lower and an upper edge thereof respectively, to secure the upper and lower housing members 324, 326. In other embodiments, the upper and lower housing members 324, 326 may be connected by welding (e.g., ultrasonic or vibration welding). The upper housing member 324 has an upper wall 328 which may be referred to as a "dividing wall" 328 as it separates the upper and lower expansion chambers 320, 322 from one another. As can be seen, the dividing wall 328 defines a wall opening 330 that fluidly connects the lower and upper expansion chambers 320, 322. An upper surface 331 of the dividing wall 328 also defines a peripheral recess 332 surrounding the wall opening 330. The lower housing member 326 defines a circular outlet opening 334 which, in this embodiment, as will be described below, receives a flute therein.

Figure 30:
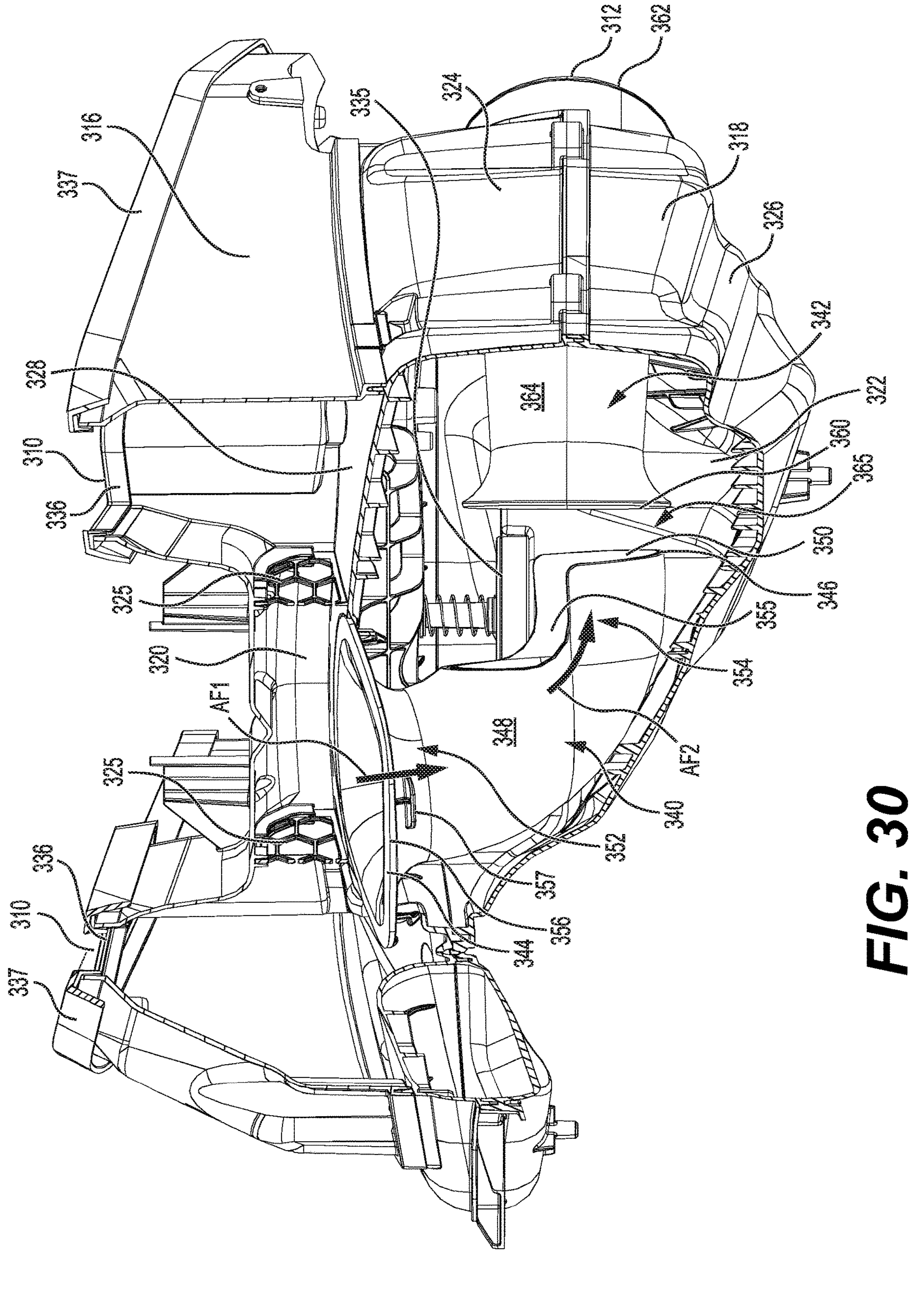
FIG. 30 is a cross-sectional view of an airbox body of an airbox of the air intake system of FIG. 28 taken along line 30-30 in FIG. 28 to expose two lower chamber flutes disposed therein.

In this embodiment, as shown in FIGS. 30 and 31, the airbox 302 has a spring-loaded valve 335 connected to the lower housing member 326. The valve 335 provides an alternative intake for air to flow into the airbox 302, for instance when the air inlets 310 are obstructed (e.g., by snow). The valve 335 is biased to be in a closed position in which the valve 335 covers a valve opening defined by the lower housing member 326. When the pressure within the airbox 302 exceeds a certain threshold pressure value, the pressure overcomes the spring force of the valve 335 and causes the valve 335 to move to an open position in which the valve 335 allows air through the valve opening and into the lower expansion chamber 322. Thus, in the open position, the valve 335 allows some air to be routed to the engine 42 through the valve opening.

The upper body portion 316 is superimposed on the lower body portion 318, and particularly on the upper housing member 324. The upper body portion 316 has connecting flanges 319 extending from a lower edge of the upper body portion 316 which are aligned with respective ones of the connecting flanges 327, 329 and receive fasteners therein to connect the upper body portion 316 to the lower body portion 318. The upper expansion chamber 320 is defined by the inner surfaces of the upper body portion 316 and the upper surface 331 of the dividing wall 328. The upper body portion 316 also defines two inlet openings 336 which, in this embodiment, correspond to the air inlets 310. Two inlet faceplates 337 are provided at respective ones of the inlet openings 336 such that air flows through the faceplates 337 as it enters the upper expansion chamber 320. As shown in FIGS. 1 and 4, in this embodiment, the inlet openings 336 are positioned such that the air inlets 310 face upwardly (i.e., an area of a projection of each of the inlet openings 336 onto a horizontal plane is greater than an area of a projection of the corresponding inlet openings 336 onto a vertical plane). As such, air flows into the air inlets 310 from above the air inlets 310. This may be useful for when the snowmobile 10 is used in a deep snow environment as air flows into the airbox 302 from a relatively high vertical point along the snowmobile 10 where deep snow would not likely obstruct air flow into the air inlets 310. As will be described below, in an alternative embodiment, the air inlets 310 may be positioned to face laterally.

Figure 32:
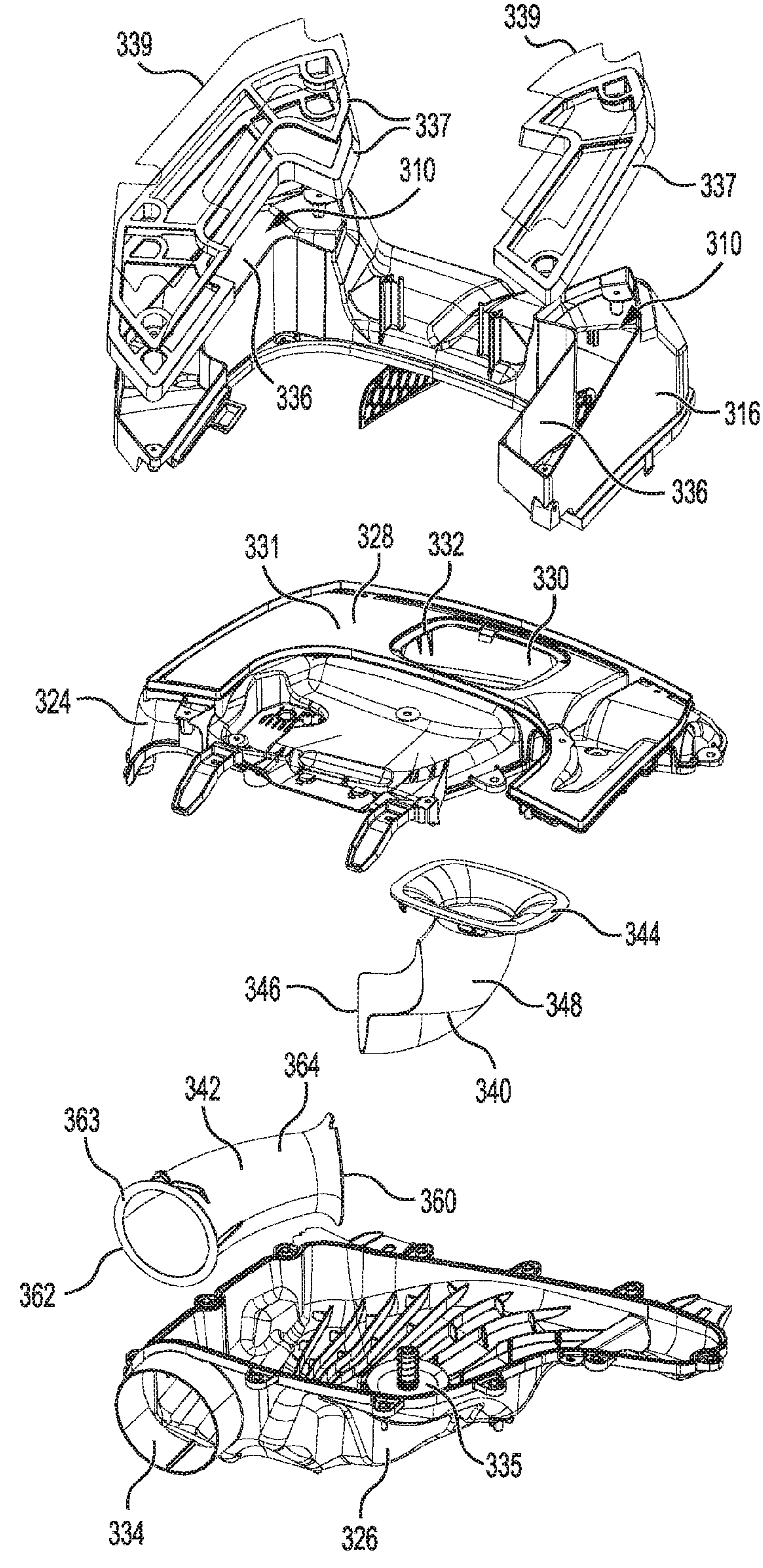
FIG. 32 is a perspective view, taken from a top, rear, right side, of the airbox of FIG. 30, shown in the exploded configuration.

In this embodiment, as shown in FIGS. 31 and 32, each of the air inlets 310 is covered by a corresponding hydrophobic mesh 339 to reduce ingress of airborne mist and other liquids into the airbox 302. The hydrophobic meshes 339 may be omitted in other embodiments.

As shown in FIGS. 30 and 31, in this embodiment, two grill members 325 are disposed within the upper expansion chamber 320 (i.e., enclosed by the upper body portion 316). The two grills members 325 are positioned such that air flowing into the upper expansion chamber 320 flows through a respective grill member 325 before flowing into the lower expansion chamber 322.

As shown in FIGS. 30 to 32, in this embodiment, the airbox 302 includes two lower chamber flutes 340, 342 that are at least partly disposed within the lower expansion chamber 322. The lower chamber flute 340 is disposed upstream of the other lower chamber flute 342. As such, the flutes 340, 342 will be referred to herein as the upstream lower chamber flute 340 and the downstream lower chamber flute 342. The upstream and downstream lower chamber flutes 340, 342 are provided to direct air flow within the lower expansion chamber 322 and out of the lower expansion chamber 322 while allowing noise travelling from the engine 42 back up the air intake system 300 to expand within the lower expansion chamber 322 in order to reduce the noise output.

The upstream lower chamber flute 340 has an inlet end 344, an outlet end 346 downstream from the inlet end 344 and a peripheral wall 348 extending from the inlet end 344 to the outlet end 346. The peripheral wall 348 defines a flute passage 350 for directing air flow within the lower expansion chamber 322. As can be seen, the peripheral wall 348 surrounds the flute passage 350 along an inlet end portion 352 of the flute 340 that extends from the inlet end 344. That is, along the inlet end portion 352, the peripheral wall 348 bounds the flute passage 350 from all peripheral sides thereof such that air flow through the inlet end portion 352 is bound on all sides by the peripheral wall 348. For instance, along the inlet end portion 352, a cross-sectional profile of the peripheral wall 348 along a plane normal to a direction of air flow within the flute 340 is generally circular. In contrast, the peripheral wall 348 defines a recess 355 extending along a peripherally open end portion 354 of the flute 340. The peripherally open end portion 354 extends from the outlet end 346. As such, the flute passage 350 is partially surrounded by the peripheral wall 348 along the peripherally open end portion 354. Notably, along the peripherally open end portion 354, a cross-sectional profile of the peripheral wall 348 along a plane normal to a direction of air flow within the flute 340 is generally U-shaped.

Moreover, as can be seen in FIG. 30, in this embodiment, the upstream lower chamber flute 340 is curved such that a direction of air flow (denoted by air flow arrows AF1, AF2) within the flute 340 changes from the inlet end portion 352 to the peripherally open end portion 354. In particular, in this embodiment, air flows generally downwardly along the inlet end portion 352 and generally laterally along the peripherally open end portion 354. The recess 355 is defined on a side of the peripherally open end portion 354 that faces the inlet end portion 352 such that, in a cross-section of the flute 340 taken along a plane extending through the peripherally open end portion 354 and normal to the direction of air flow therethrough, the recess 355 and inlet end portion 352 are on same side of a central axis of the flute passage 350. More specifically, in this embodiment, the inlet end portion 352 extends upwardly from the peripherally open end portion 354, and the recess 355 is defined on an upper side of the peripherally open end portion 354. The direction of air flow through the flute 340, as determined by the curving shape of the flute 340, and the position of the recess 355 can help minimize air flowing out through the recess 355.

In this embodiment, the upstream lower chamber flute 340 is connected to the dividing wall 328, namely by being received in the wall opening 330. More specifically, as shown in FIG. 30, the upstream lower chamber flute 340 is connected to the dividing wall 328 by inserting the flute 340 into the lower expansion chamber 322 such that an inlet end flange 356 of the flute 340, formed by the peripheral wall 348 widening along part of the inlet end portion 352, is received by the peripheral recess 332 surrounding the wall opening 330. Notably, the peripheral recess 332 has a shape corresponding to the shape of the periphery of the inlet end flange 356. The inlet end flange 356 is thus supported by the dividing wall 328. The upstream lower chamber flute 340 also has outer side connecting flanges 357 (one of which is shown in FIG. 30) extending outwardly from the peripheral wall 348. The dividing wall 328 is retained between the flanges 357 and the inlet end flange 356. The upstream lower chamber flute 340 may be connected to the dividing wall 328 otherwise in other embodiments. Connecting the flute 340 to the dividing wall 328 may facilitate connection of the flute 340 as additional supporting components are not required to retain the flute 340 in place. Moreover, this manner of connecting the flute 340 does not provide gaps between the inlet end 344 of the flute 340 and the wall opening 330 through which air can diverge rather than enter the flute passage 350. Nevertheless, it is contemplated that, in other embodiments, the inlet end 344 of the upstream lower chamber flute 340 could be spaced from the dividing wall 328, such as being disposed below the wall opening 330.

With continued reference to FIGS. 30 to 32, the downstream lower chamber flute 342 has an inlet end 360 and an outlet end 362 downstream from the inlet end 360. The flute 342 has a peripheral wall 364 defining a flute passage 366 for directing air flow to the air outlet 312. As shown in FIG. 30, the inlet end 360 is disposed within the lower expansion chamber 322 while the outlet end 362 is disposed at the air outlet 312. In particular, in this embodiment, the outlet end 362 defines the air outlet 312. In this embodiment, the downstream lower chamber flute 342 is inserted into the lower expansion chamber 322 through the outlet opening 334 of the lower housing member 326. In particular, as shown in FIGS. 31 and 32, the flute 342 has an outlet flange 363 at the outlet end 362 which is dimensioned larger than the outlet opening 334 such that the outlet flange 363 is abutted by a peripheral edge of the lower housing member 326 defining the outlet opening 334. Clips 367 (one of which is shown in FIG. 31) are disposed on the outer side of the peripheral wall 364 near the outlet end 362 and are configured to removably connect the flute 342 to the lower housing member 326.

As shown in FIG. 30, the inlet end 360 of the downstream lower chamber flute 342 is generally aligned with the outlet end 346 of the upstream lower chamber flute 340 and is spaced therefrom by an inter-flute gap 365 defined between the outlet end 346 and the inlet end 360. The inter-flute gap 365 is relatively small in order to prevent excessively disturbing the flow of air from the upstream lower chamber flute 340 to the downstream lower chamber flute 342. For instance, the inter-flute gap 365 may measure between 10 mm and 30 mm inclusively. In this embodiment, the inter-flute gap 365 measures approximately 20 mm.

As will be appreciated, keeping the size of the inter-flute gap 365 relatively small minimizes the disruption of air flow between the upstream lower chamber flute 340 and the downstream lower chamber flute 342. Notably, if the inter-flute gap 365 were too big, a significant proportion of air flowing out of the upstream lower chamber flute 340 would deviate from its intended path (toward the downstream lower chamber flute 342) and into the lower expansion chamber 322, generating greater air restriction which would reduce the air flow rate within the air intake system 300. As such, an increase in the size of the inter-flute gap 365 would require the engine 42 to work harder to aspirate air into the air intake system 300 which would negatively affect the output of the engine 42. However, at the same time, it is desirable to have sufficient clearance between the peripheral walls of the flutes 340, 342 to allow noise travelling from the engine 42 to expand within the lower expansion chamber 322 to thereby reduce the noise output of the airbox 302. Therefore, providing the recess 355 along the peripherally open end portion 354 of the upstream lower chamber flute 340 allows minimizing the size of the inter-flute gap 365 since the recess 355 provides an area through which noise from the engine 42 can exit the flute 340, while air flow from the upstream lower chamber flute 340 to the downstream lower chamber flute 342 remains largely unaffected by the recess 355. Notably, despite the presence of the recess 355 defined by the upstream lower chamber flute 340, during use, a majority of air flowing out of the flute passage 350 through the outlet end 346 of the upstream lower chamber flute 340 flows into the flute passage 366 through the inlet end 360 of the downstream lower chamber flute 342. In other words, the direction of the majority of air flowing out of the upstream lower chamber flute 340 is toward the inlet end 360 of the downstream lower chamber flute 342.

Figure 33:
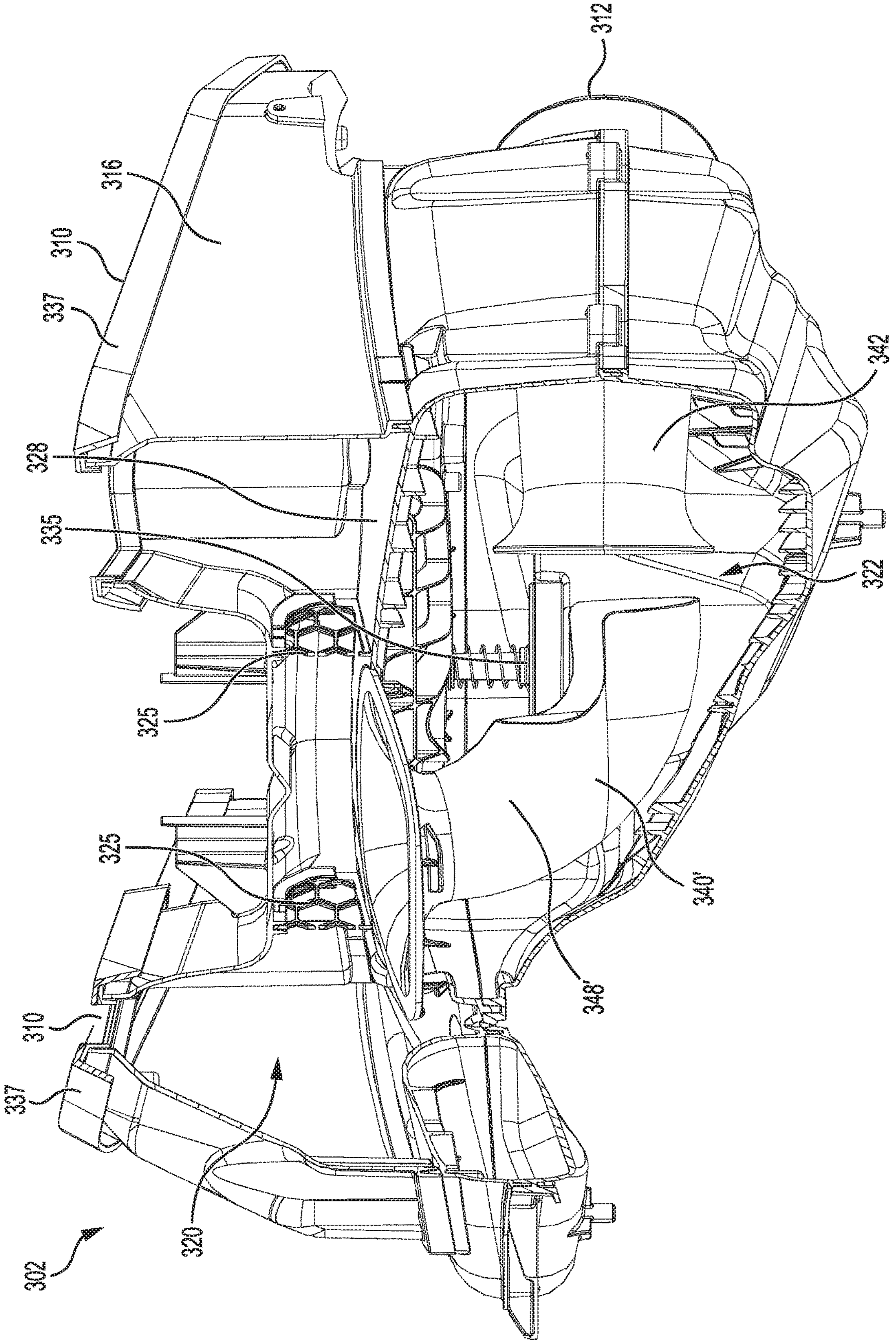
FIG. 33 is a cross-sectional view of the airbox of FIG. 30, shown with a replacement flute.
Figure 34:
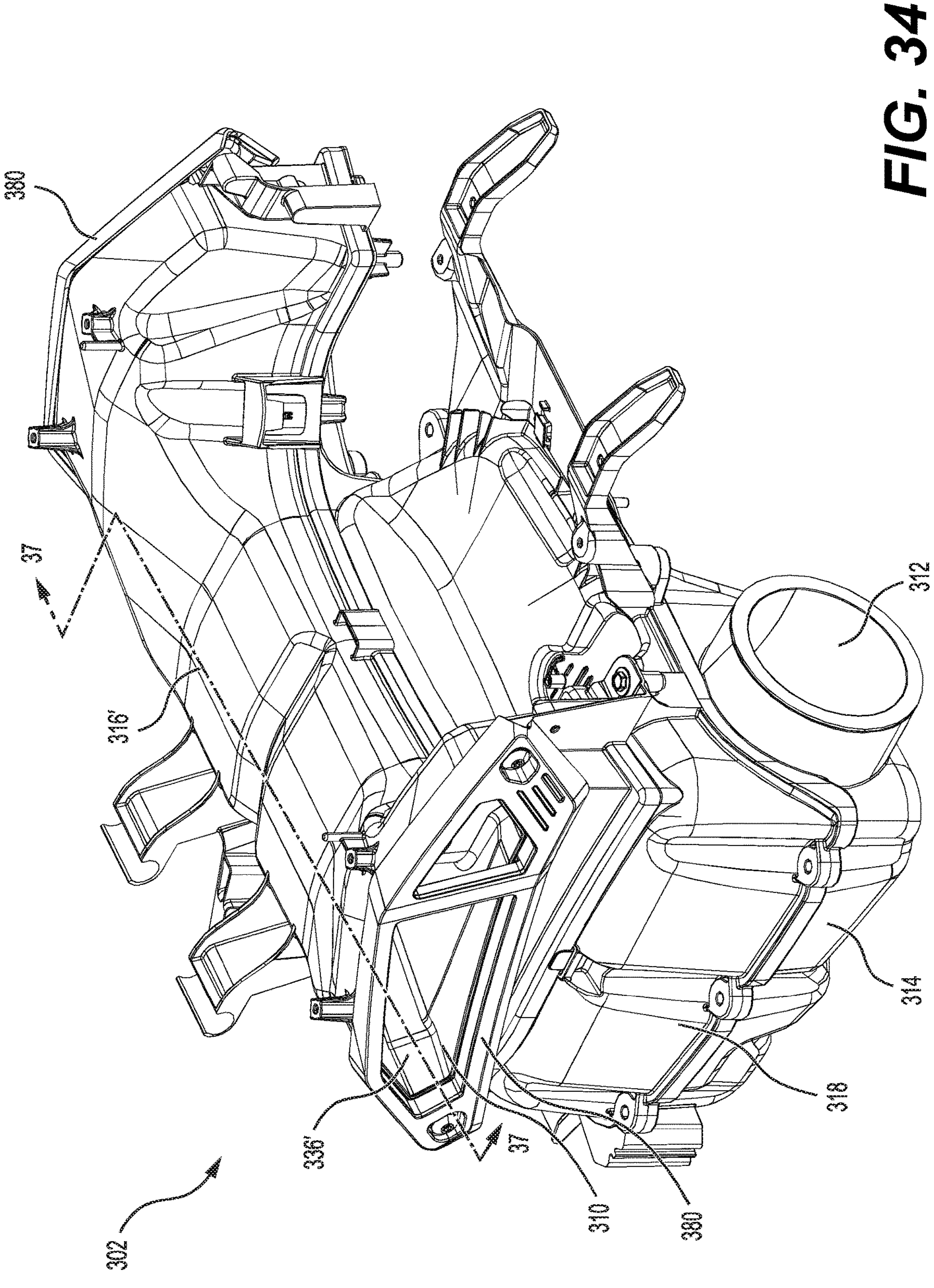
FIG. 34 is a perspective view, taken from top, rear, left side, of the airbox of the air intake system of the snowmobile in accordance with an alternative embodiment.
Figure 35:
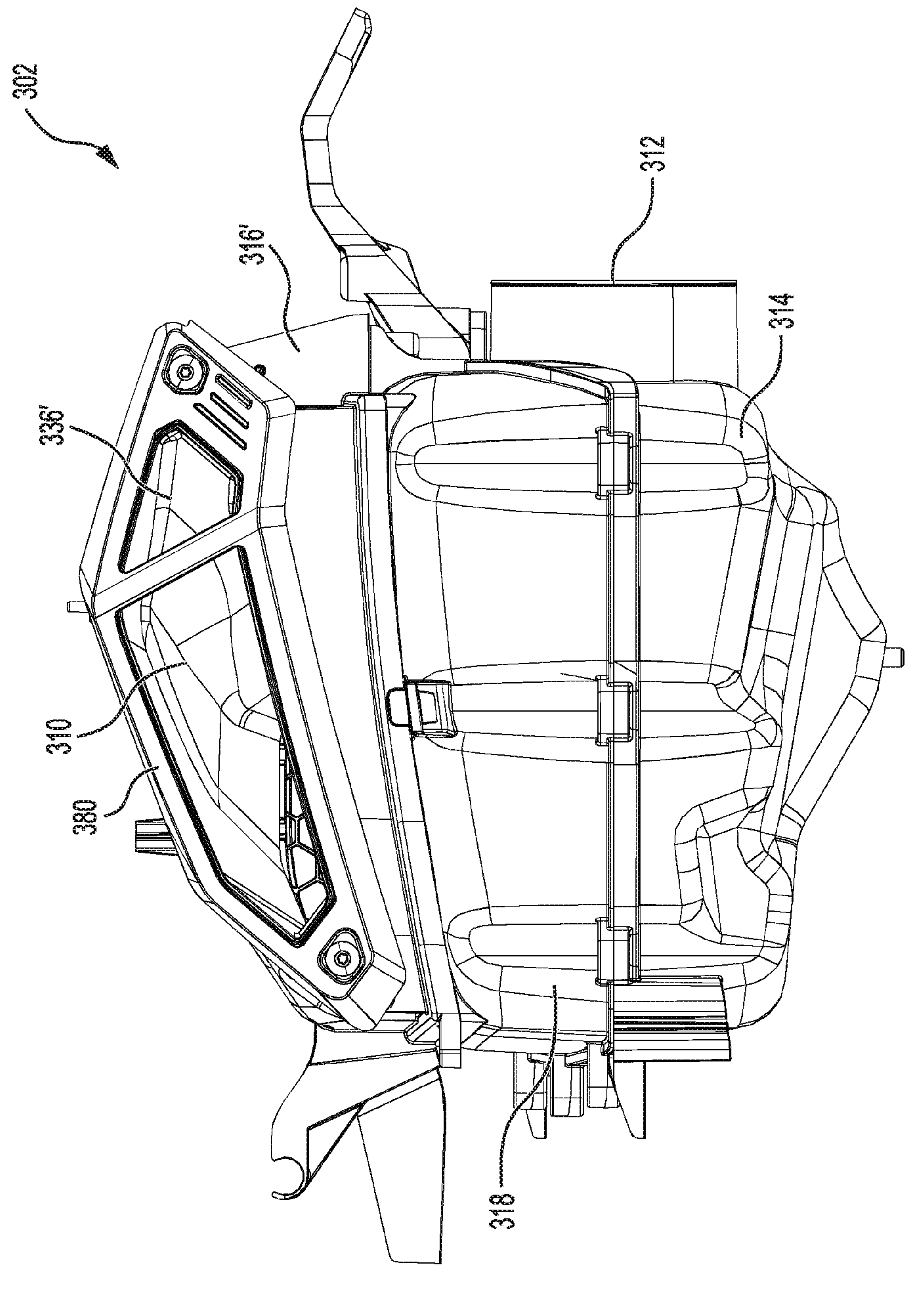
FIG. 35 is a left side elevation view of the airbox of FIG. 34.
Figure 36:
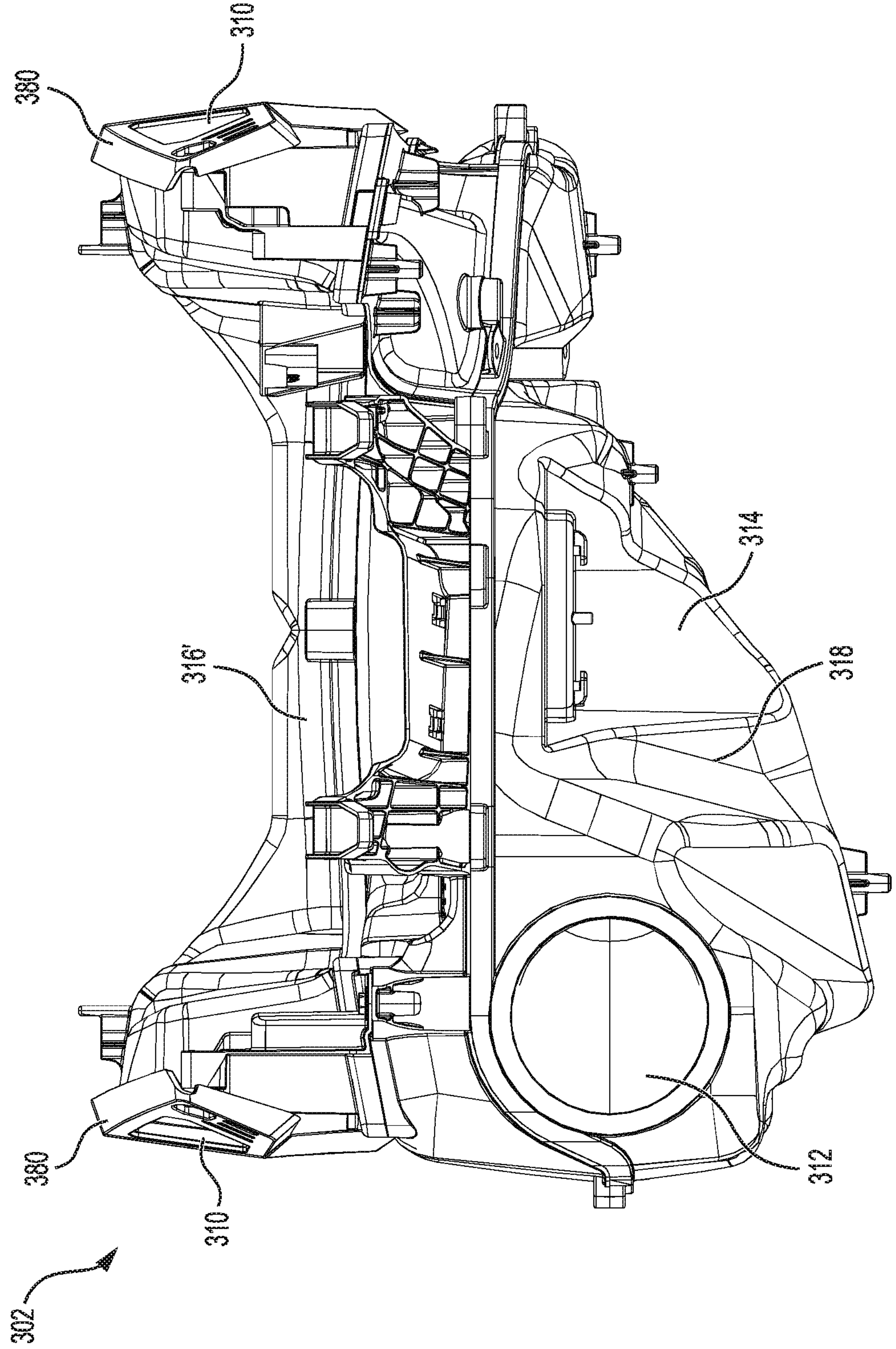
FIG. 36 is a rear elevation view of the airbox of FIG. 34.

In this embodiment, each of the upstream and downstream lower chamber flutes 340, 342 is interchangeable for a respective replacement flute. More specifically, the upstream and downstream lower chamber flutes 340, 342 are removably connected to the airbox body 314 so that each of the flutes 340, 342 can be removed and a differently shaped and/or dimensioned replacement flute can be installed in its place to selectively modify a noise output of the airbox 302. For instance, FIG. 33 illustrates a replacement upstream lower chamber flute 340' in place of the upstream lower chamber flute 340 described above. As can be appreciated, the replacement upstream lower chamber flute 340' is dimensioned differently, notably being narrower along a peripheral wall 348' thereof, but is otherwise identical to the upstream lower chamber flute 340 described above. The replacement upstream lower chamber flute 340' will therefore not be described in detail herein. It is contemplated that, in other embodiments, only one of the flutes 340, 342 could be interchangeable (e.g., the downstream lower chamber flute 342 could be fixed).

The interchangeability of the flutes 340, 342 for respective replacement flutes can allow modifying the noise output of the airbox 302 for a particular engine 42. In addition, it can also allow for the airbox 302 to be used with different engines, by allowing the flutes 340, 342 to be replaced with replacement flutes more suitable for a respective engine, namely providing a more adequate noise output for each engine. As such, the airbox 302 could be implemented to various vehicles, simply by replacing the flutes 340, 342 to tune the output noise of the airbox 302 to the engine of the selected vehicle.

It is contemplated that, in some embodiments, the downstream lower chamber flute 342 could be omitted. In such embodiments, the gap 365 (which would no longer be referred to as an "inter-flute" gap since there is a single flute) may be significantly larger.

In some embodiments, the upper body portion 316 of the airbox 302 may be configured differently. Notably, with reference to FIGS. 34 to 38, in an alternative embodiment, an upper body portion 316' is provided instead of the upper body portion 316 described above. Similarly, to the upper body portion 316, the upper body portion 316' defines the upper expansion chamber 320 between the internal walls of the upper body portion 316 and the dividing wall 328. The upper body portion 316' is connected in the same way to the lower body portion 318 as described above with respect to the upper body portion 316. As shown in FIG. 38, in this embodiment, the upper body portion 316' defines two inlet openings 336' for defining the two air inlets 310. As can be seen, the two inlet openings 336' face opposite lateral directions. As such, an area of a projection of each of the inlet openings 336' on a vertical plane extending longitudinally is greater than a projection of the corresponding inlet opening 336' on a horizontal plane. Therefore, in this embodiment, air flows into the air inlets 310 from a lateral side of the snowmobile 10. In contrast to the upper body portion 316 described above, the upper body portion 316' may thus be more appropriate for snowmobiles designed for use in trails (i.e., not deep snow). The airbox 302 may thus be adapted during assembly to be fitted with either of the upper body portions 316, 316' depending on the model of snowmobile being assembled. It is therefore contemplated that a family of snowmobiles, including at least a first snowmobile (a deep snow snowmobile for example) and a second snowmobile (a trail snowmobile for example), may be formed where the first snowmobile's airbox 302 includes the upper body portion 316, and the second snowmobile's airbox 302 includes the upper body portion 316'.

Figure 37:
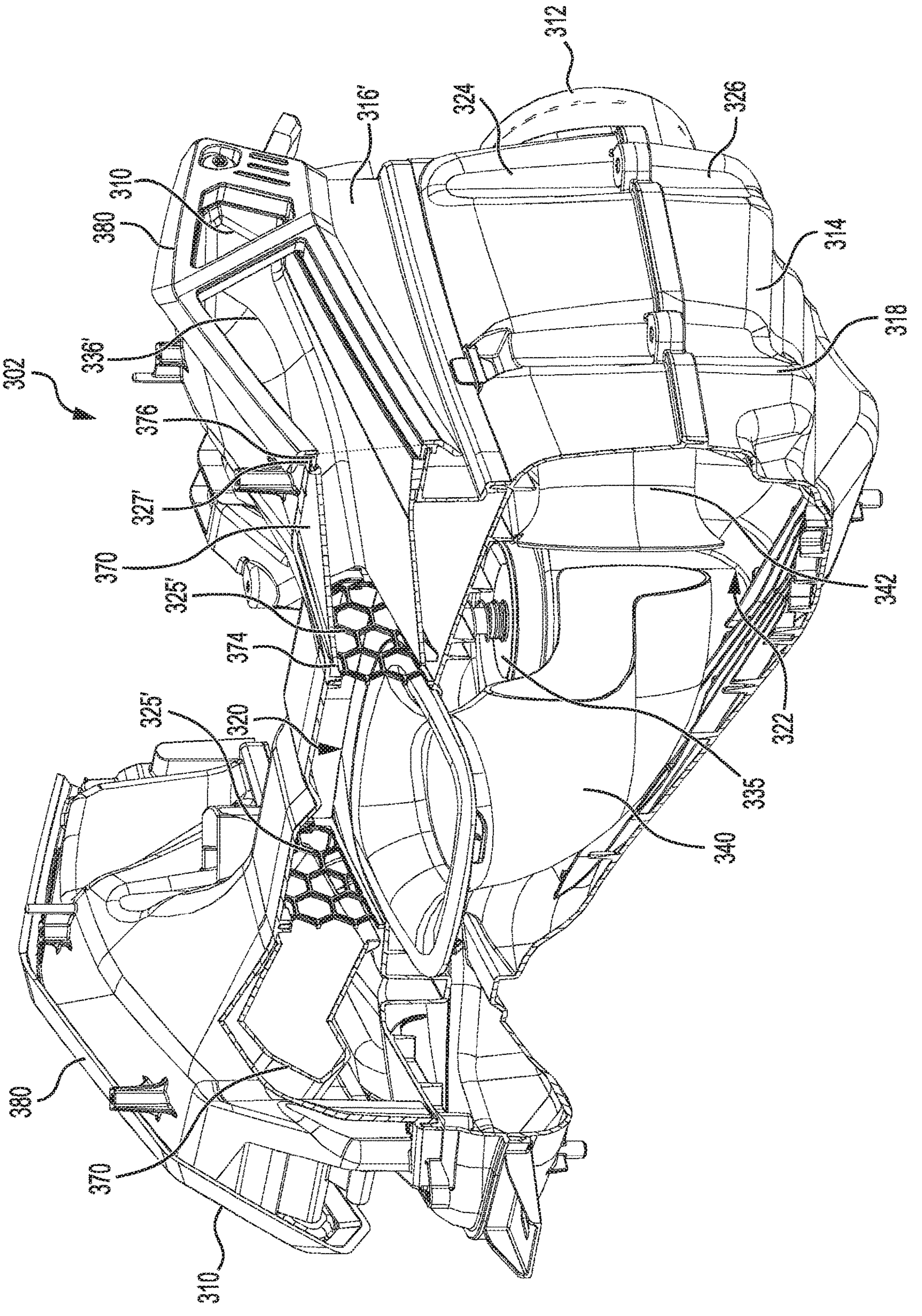
FIG. 37 is a cross-sectional view of an airbox body of the airbox of FIG. 34, taken along line 37-37 in FIG. 34.
Figure 38:
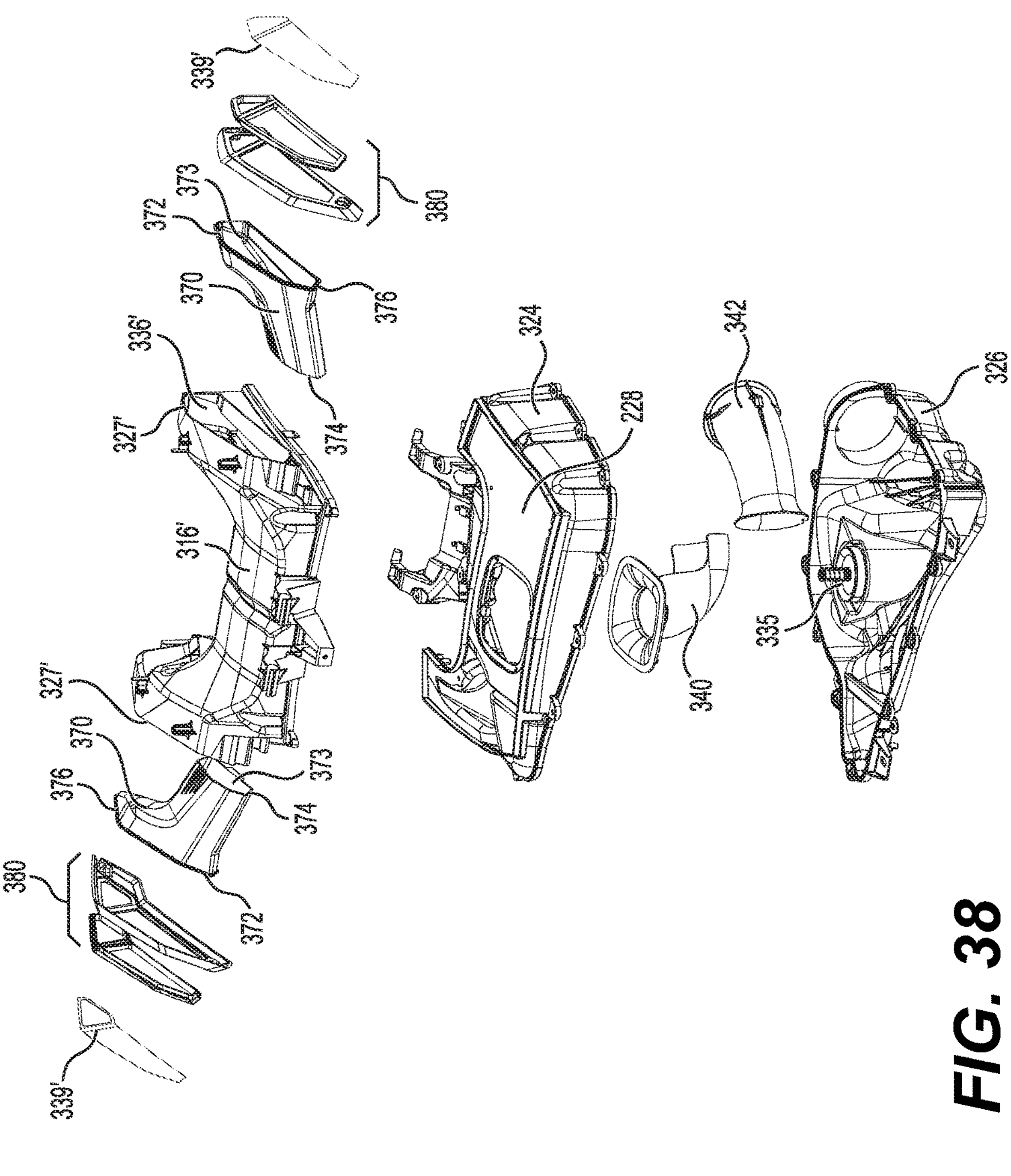
FIG. 38 is a perspective view of, taken from a top, front, left side, of the airbox of FIG. 34, shown in an exploded configuration.

Furthermore, with continued reference to FIGS. 37 and 38, in this embodiment, the airbox 302 also includes two upper chamber flutes 370, namely left and right upper chamber flutes 370, that are removably connected to the upper body portion 316' of the airbox body 314. The upper chamber flutes 370 are disposed at least in part in the upper expansion chamber 320. In particular, the upper chamber flutes 370 are positioned to guide air flowing into the air inlets 310 into the upper expansion chamber 320. The left and right upper chamber flutes 370 are removable such that a respective replacement flute (not shown) can be installed in place thereof to selectively modify the noise output of the airbox 302. Notably, the replacement flute would be shaped and/or dimensioned differently such as to cause a different noise output by the airbox 302.

The upper chamber flutes 370 will now be described in greater detail with reference to FIG. 38. As the left and right upper chamber flutes 370 are similar to one another, only one of the upper chamber flutes 370 will be described in detail herein. It is to be understood that a similar description applies to both upper chamber flutes 370. The upper chamber flute 370 has an inlet end 372 and an outlet end 374. A peripheral wall of the upper chamber flute 370 extends from the inlet end 372 to the outlet end 374 and defines a flute passage 373 of the upper chamber flute 370. The inlet end 372 is disposed at the corresponding air inlet 310 such that the inlet end 372 is closer to the air inlet 310 (compared to the outlet end 374). Moreover, as can be seen, an area of a cross-sectional profile of the upper chamber flute 370 is greater at the inlet end 372 than at the outlet end 374. In particular, the cross-sectional profile of the upper chamber flute 370, taken along a plane normal to a direction of air flow therethrough, is generally polygonal. The upper chamber flute 370 has an inlet flange 376 which is larger than a peripheral inlet edge 327' defining the corresponding inlet opening 336'. As such, the upper chamber flute 370 is inserted into the inlet opening 336', the inlet flange 376 being supported by the peripheral inlet edge 327' to limit the insertion of the upper chamber flute 370 into the upper expansion chamber 320.

Left and right fixing plates 380 are removably connected to the upper body portion 316' of the airbox body 314 at the air inlet 310 in order to fix the upper chamber flutes 370 in place within the upper expansion chamber 320. The fixing plates 380 defining respective opening to allow air flow therethrough and into the upper chamber flutes 370. The fixing plates 370 are removably fastened to the upper body portion 316' by mechanical fasteners (e.g., bolts). As shown in FIG. 37, the inlet flange 376 of each flute 370 is disposed between the corresponding fixing plate 380 and the peripheral inlet edge 327' of the corresponding inlet opening 336'. Moreover, as shown in FIG. 37, two grill members 325' are disposed within the upper expansion chamber 320 downstream from the outlet end 374 of the flute 370. As such, air flows out of the flute passage 373 of the flute 370 and through a corresponding one of the grill members 325' before flowing into the lower expansion chamber 322.

It is contemplated that similar upper chamber interchangeable flutes could be provided for the upper body portion 316 described above.

Figure 63:
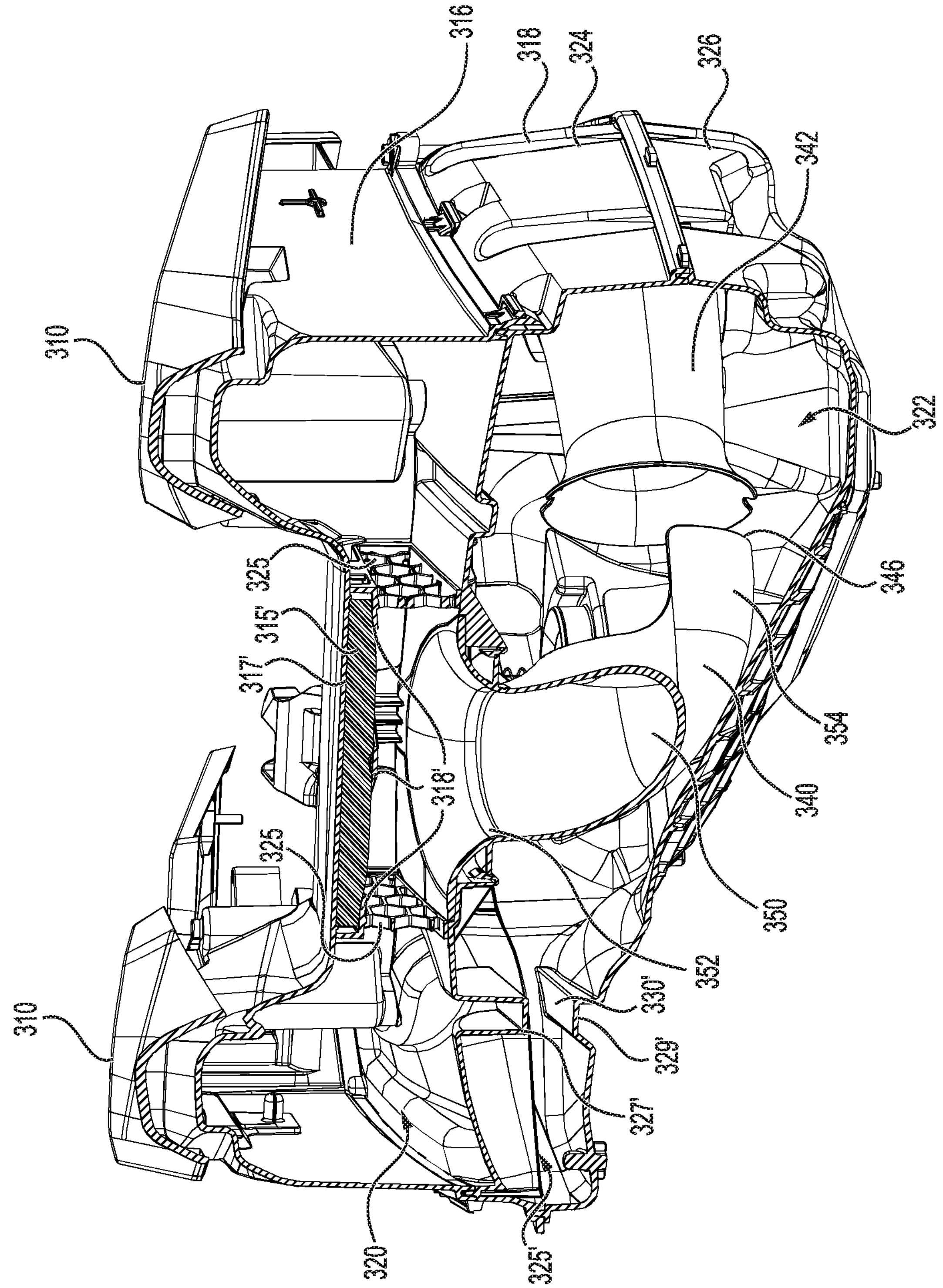
FIG. 63 is a cross-sectional view of the airbox of the snowmobile in accordance with an alternative embodiment.
Figure 64:
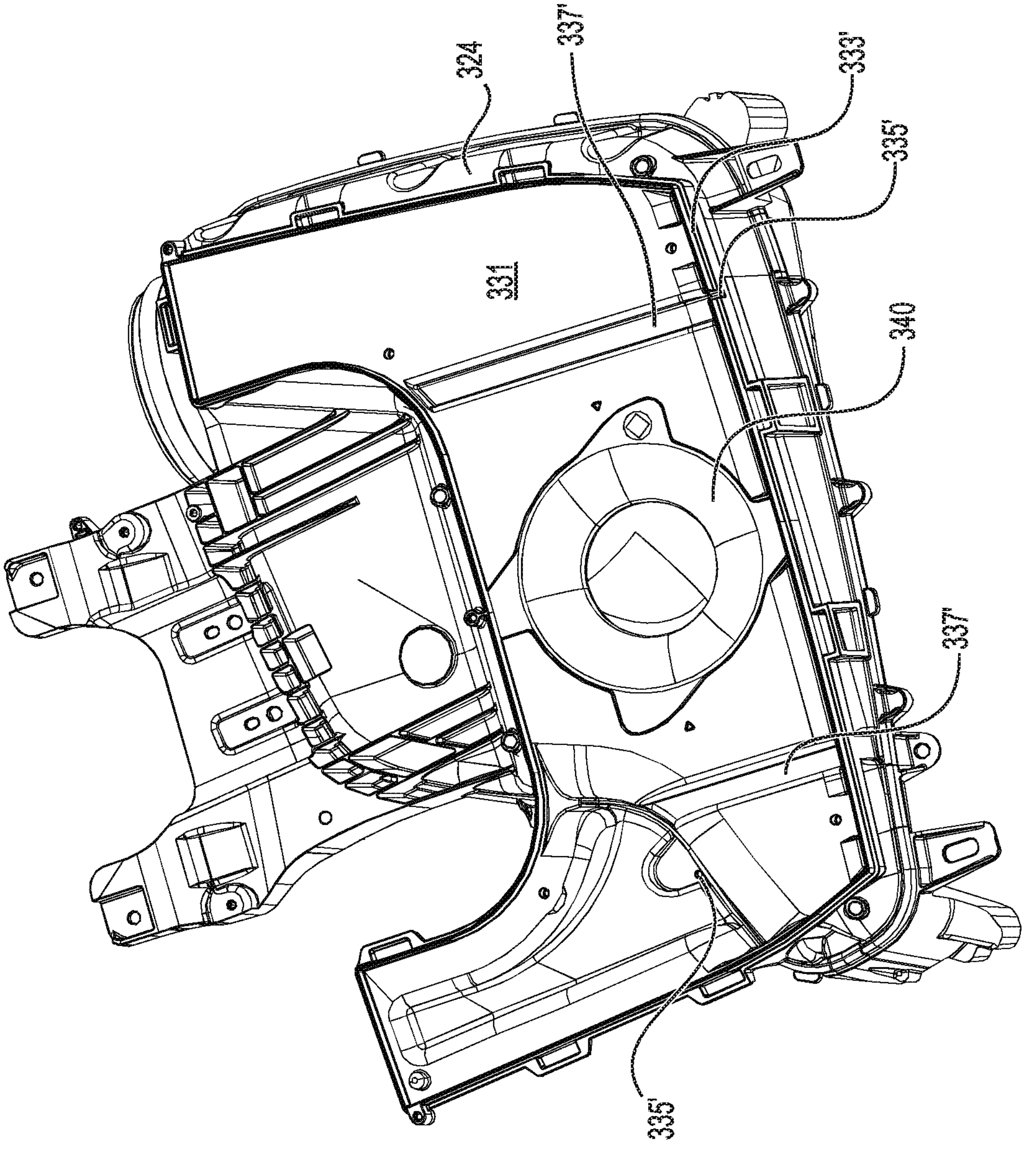
FIG. 64 is a perspective view, taken from a top, front, right side, of part of the airbox of FIG. 63.
Figure 65:
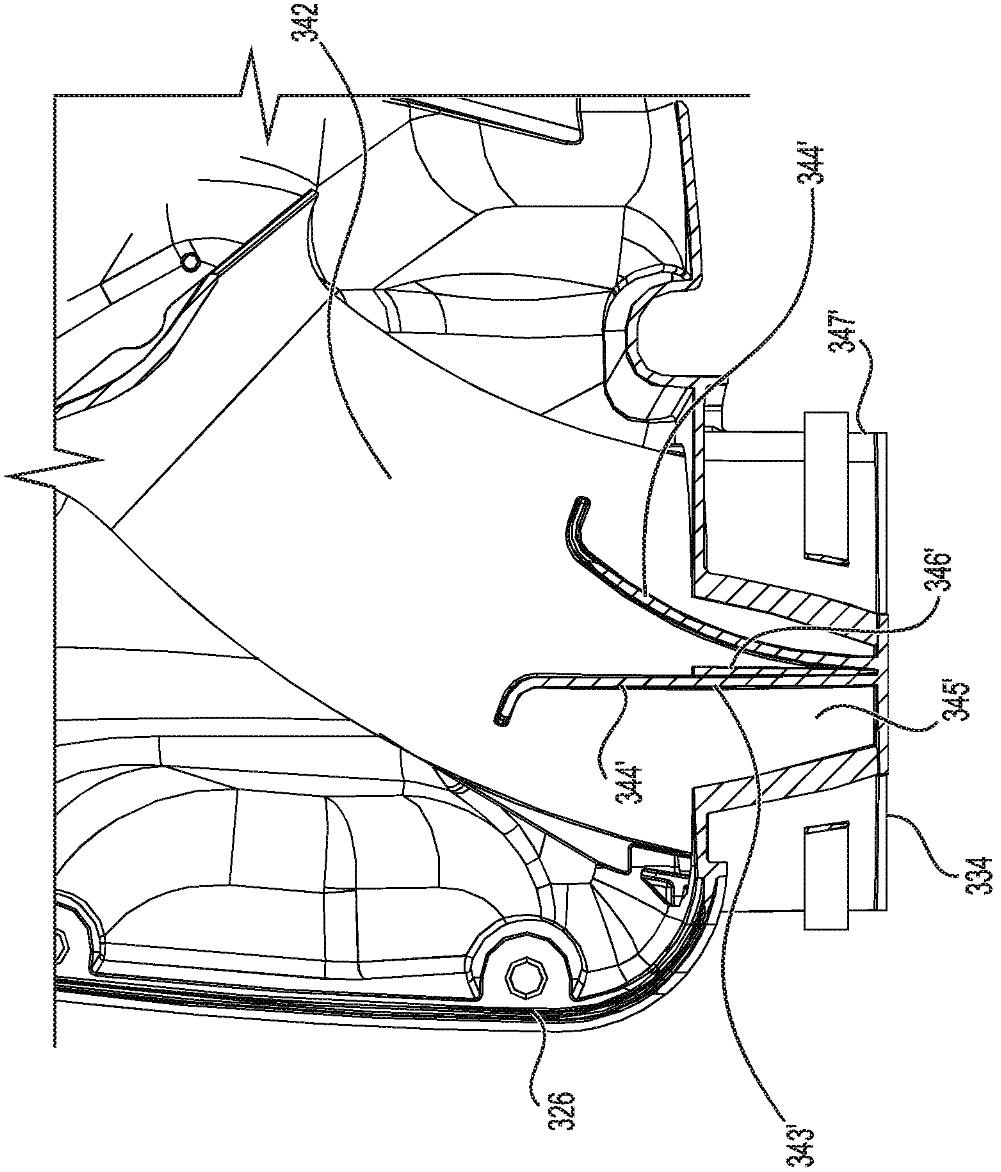
FIG. 65 is a cross-sectional view of part of the airbox of FIG. 63, including a downstream lower chamber flute thereof.

An alternative embodiment of the airbox 302 is shown in FIGS. 63 to 65. In this alternative embodiment, as shown in FIG. 63, the airbox 302 includes an acoustic member 315' disposed in the upper expansion chamber 320 for dampening noise. In particular, the acoustic member 315' is positioned such as to be generally aligned with the inlet end 344 of the upstream lower chamber flute 340, and is fixed against an upper wall surface 317' of the upper body portion 316. In this alternative embodiment, the acoustic member 315' is fixed against the upper wall surface 317' by a plurality of ribs 318' which hold a lower side of the acoustic member 315' against the upper wall surface 317'. The acoustic member 315' is made of an acoustic material (e.g., foam).

With continued reference to FIG. 63, in this alternative embodiment, the airbox 302 defines a resonance chamber 325' in communication with the lower expansion chamber 322 for dampening noise and/or improving performance of the engine 42 by managing pressure waves generated by air flow through the airbox 302. In this alternative embodiment, the resonance chamber 325' is defined by the lower body portion 318 and is thus disposed below the upper expansion chamber 320. The resonance chamber 325' is defined in part by converging parts of the walls of the airbox 302, namely parts of the walls of the lower body portion 318. Notably, in this implementation, a rib 327' of the upper housing member 324 and a rib 329' of the lower housing member 326 converge towards one another to form a narrowed passage 330' through which air flows from the lower expansion chamber 322 into the resonance chamber 325'. After passing through the narrowed passage 330' as air flows from the lower expansion chamber 322, the air expands into the resonance chamber 325'. It is contemplated that one of the ribs 327', 329' could be omitted in other embodiments such that a single one of the ribs 327', 329' defines the narrowed passage 330'. The provision of the resonance chamber 325' within the airbox 302 may simplify the design of the snowmobile 10 as it does not require an additional component to be connected to the airbox 302 to form a resonance chamber.

Turning to FIG. 64, in this alternative embodiment, the upper housing member 324 of the airbox body 314 defines a plurality of drainage apertures 335' that open into the upper expansion chamber 320. In particular, in this example of implementation, the upper surface 331 defines a first drainage aperture 335', while an upper peripheral lip portion 333' of the upper housing member 324 defines a second drainage aperture 335'. The drainage apertures 335' allow liquid that collects in the upper expansion chamber 320 to be discharged from the airbox 302 through the drainage apertures 335'. The upper surface 331 also defines two passages 337' which extend toward respective ones of the drainage apertures 335'. Notably, water that collects within the upper expansion chamber 320 flows into one of the passages 337' and is led thereby towards the respective drainage aperture 335' to discharge the water from the upper expansion chamber 320.

Turning now to FIG. 65, in this alternative embodiment, the downstream lower chamber flute 342 has an orientation feature 343' for correctly orienting the downstream lower chamber flute 342 when being inserted into the lower housing member 326. Notably, in this alternative embodiment, the orientation feature 343' comprises two aligning ribs 344' protruding from an outer surface 345' of the downstream lower chamber flute 342. The aligning ribs 344' are arranged in a V-shape. Thus, when inserting the downstream lower chamber flute 342 into the lower housing member 326 through the outlet opening 334, a guide rib 346' protruding from an inner surface of a conduit 347' of the lower housing member 326 forming the outlet opening 334 is aligned with the aligning ribs 344' such as to be inserted between the two aligning ribs 344'. If the user does not correctly align the guide rib 346' relative to the aligning ribs 344', the downstream lower chamber flute 342 cannot be inserted into the lower housing member 326. In this alternative embodiment, the downstream lower chamber flute 342 has another pair of aligning ribs 344' on an opposite side of the cylindrical outer surface 345' which interact with another guide rib 346' protruding from the inner surface of the conduit 347'. The pairs of aligning ribs 344' are mirror images of one another.

Footrests

Returning now to FIG. 3, the footrests 40 of the snowmobile 10 will now be described in greater detail. As the left and right footrests 40 are mirror images of one another, only the right footrest 40 will be described in detail herein. It is to be understood that the same description applies to the left footrest 40.

The footrest 40 has a front end 402 and a rear end 404 defining a length of the footrest 40 therebetween. Each footrest 40 has an inner body portion 406 and an outer rim portion 408 connected to the inner body portion 406. The inner body portion 406 is the part of the footrest 40 that is configured to support the driver's foot during use. The outer rim portion 408 is configured to prevent the driver's foot from inadvertently slipping laterally outwardly from the inner body portion 406. As such, the outer rim portion 408 extends laterally outwardly of the inner body portion 406, along a majority (e.g., an entirety) of a length thereof. The inner body portion 406 is therefore closer to the longitudinal centerplane 13 of the snowmobile 10 than the outer rim portion 408. The inner body portion 406 also has a greater width (measured laterally) than the outer rim portion 408.

Figure 40:
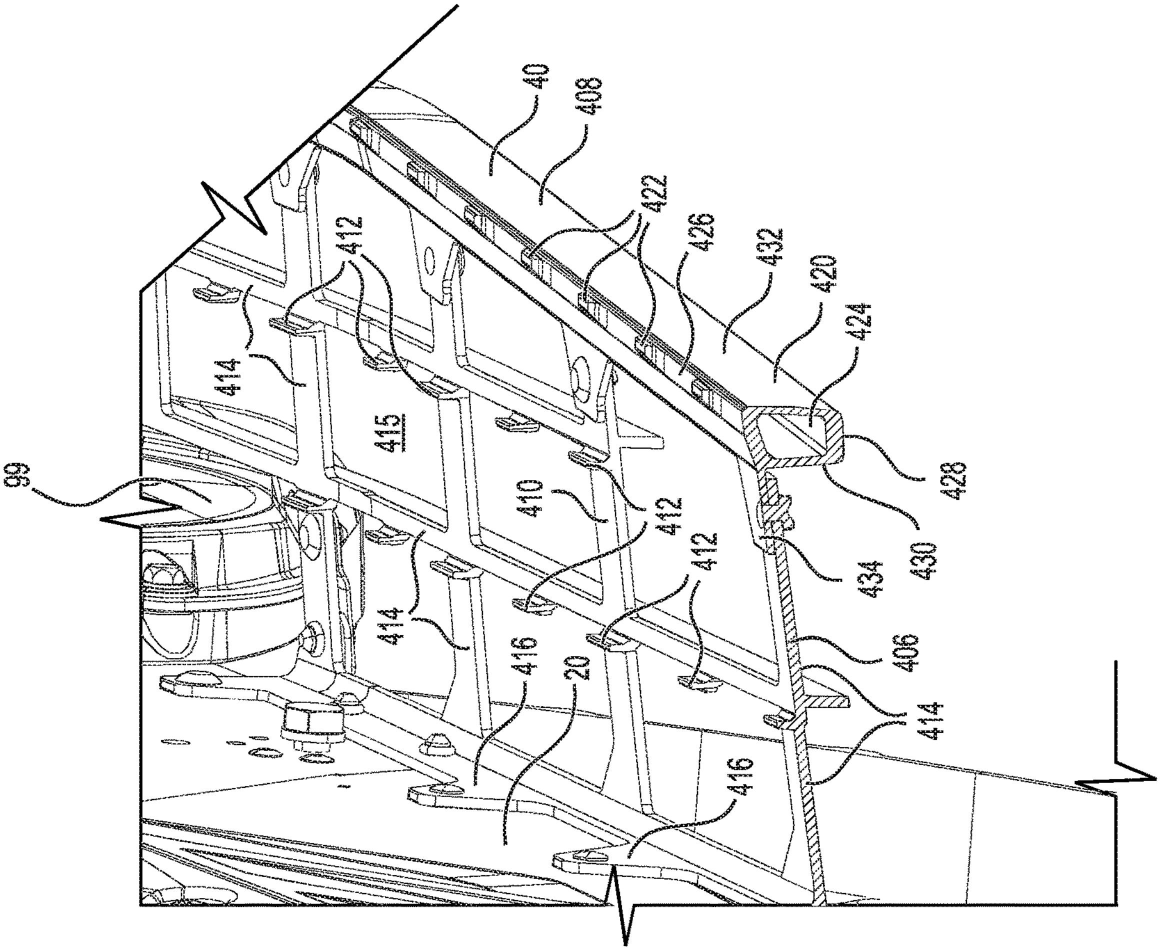
FIG. 40 is a perspective view, taken from a top, rear, right side, of a cross-section of a right footrest of the snowmobile of FIG. 1 taken along line 40-40 in FIG. 2B.

With reference to FIG. 40, in this embodiment, the inner body portion 406 has an upper surface 410 and a plurality of inner body gripping projections 412 extending from the upper surface 410. The inner body gripping projections 412 are provided to grip the underside of the driver's footwear so as to prevent slipping thereof. The gripping projections 412 could have any suitable shape. In this embodiment, the gripping projections 412 extend longitudinally. Furthermore, as can be seen, in this embodiment, the inner body portion 406 defines a grid 407. In particular, the inner body portion 406 includes plurality of interconnected grid members 414 which define grid openings 415 therebetween. The inner body portion 406 also has a plurality of frame connecting flanges 416 that extend upward from the upper surface 410 of the inner body portion 406, at an inner lateral end of the inner body portion 406. The frame connecting flanges 416 are connected (e.g., riveted) to the tunnel 20 of the frame 16.

Figure 41:
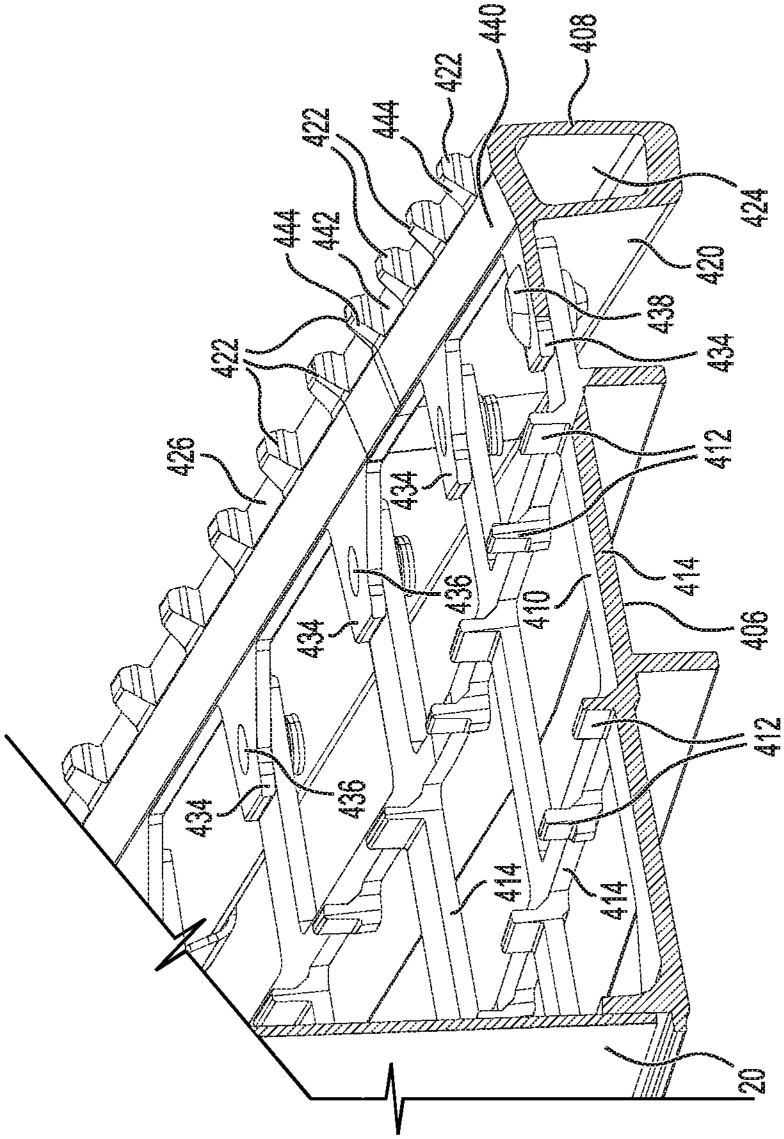
FIG. 41 is a perspective view, taken from a top, rear, left side, of a cross-section of the right footrest of the snowmobile of FIG. 1 taken along line 41-41 in FIG. 2B.

With continued reference to FIG. 40, in this embodiment, the outer rim portion 408 has a rim body 420 and a plurality of rim gripping projections 422 extending from the rim body 420. In this embodiment, the rim body 420 is hollow, namely defining an internal space 424 therein. The rim body 420 has a generally rectangular cross-sectional profile and has an upper rim surface 426, a lower rim surface 428 opposite the upper rim surface 426, and inner and outer lateral surfaces 430, 432. A height of the rim body 420 is measured between the upper and lower rim surfaces 426, 428. As best shown in FIG. 41, in this embodiment, the upper rim surface 426 has a slanted portion 440 and a straight portion 442 extending laterally outward from the slanted portion 440. The straight portion 442 is generally parallel to the lower rim surface 428 and to the upper surface 410 of the inner body portion 406, while the slanted portion 440 extends downwardly from the straight portion 442. In particular, the slanted portion 440 is angled downwardly toward the inner body portion 406. For instance, the slanted portion 440 of the upper rim surface 426 may be disposed at an angle between 30° and 50° inclusively relative to the upper surface 410 of the inner body portion 406. In this embodiment, the slanted portion 440 is disposed at angle of approximately 40° relative to the upper surface 410 of the inner body portion 406. This may facilitate sliding of the driver's foot off the footrest 40 while his/her foot is moving laterally outward along the footrest 40.

The rim body 420 may have a differently shaped cross-sectional profile in other embodiments.

The rim gripping projections 422 are configured to prevent the driver's foot from inadvertently slipping off the outer rim portion 408 when the driver's foot is moving laterally outward. The rim gripping projections 422 extend upwardly from the upper rim surface 426 and in particular from the straight portion 442 thereof. As can be seen, in this embodiment, the rim gripping projections 422 are aligned in a single row. The rim gripping projections 422 extend vertically higher than the inner body gripping projections 412. In this embodiment, each of the rim gripping projections 422 has an inner lateral surface 444 angled downwardly toward the inner body portion 406 to form a ramp in order to aid the driver's foot to slide laterally outwardly and upwardly from the inner body portion 406 when the driver forcefully moves his/her foot laterally outwardly to get off the footrest 40. The rim gripping projections 422 can therefore prevent inadvertent slipping of the driver's foot from the footrest 40 but are also shaped such that, if enough force is applied, the angled inner lateral surface 444 thereof can facilitate removal of the driver's foot from the footrest 40 by the driver sliding his/her foot upwardly along the angled inner lateral surface 444. In particular, the inner lateral surface 444 extends at an angle between 60° and 80° from the straight portion 442 of the upper rim surface 426 (i.e., relative to the upper surface 410 since the upper surface 410 is generally parallel to the straight portion 442). In this embodiment, the inner lateral surface 444 extends at an angle between 60° and 80° from the straight portion 442.

The outer rim portion 408 also has a plurality of connecting flanges 434 configured for connecting the outer rim portion 408 to the inner body portion 406. The connecting flanges 434 are longitudinally spaced apart from one another and extend laterally inward from the rim body 420. Each connecting flange 434 defines a fastener opening 436 that receives a fastener 438 therein (e.g., a rivet) to fasten the connecting flange 434 to a respective one of the grid members 414 of the inner body portion 406. As shown in FIG. 41, in this embodiment, the connecting flanges 434 extend from an upper end portion of the rim body 420 such that a majority of the hollow rim body 420 is disposed vertically lower than the connecting flanges 434. In particular, in this embodiment, the connecting flanges 434 are vertically aligned in part with the upper rim surface 426. Notably, the connecting flanges 434 are vertically aligned with an inner lateral end of the slanted portion 440 of the upper rim surface 426. As such, an upper surface of each connecting flange 434 is generally continuous with the slanted portion 440 of the upper rim surface 426.

Figure 42:
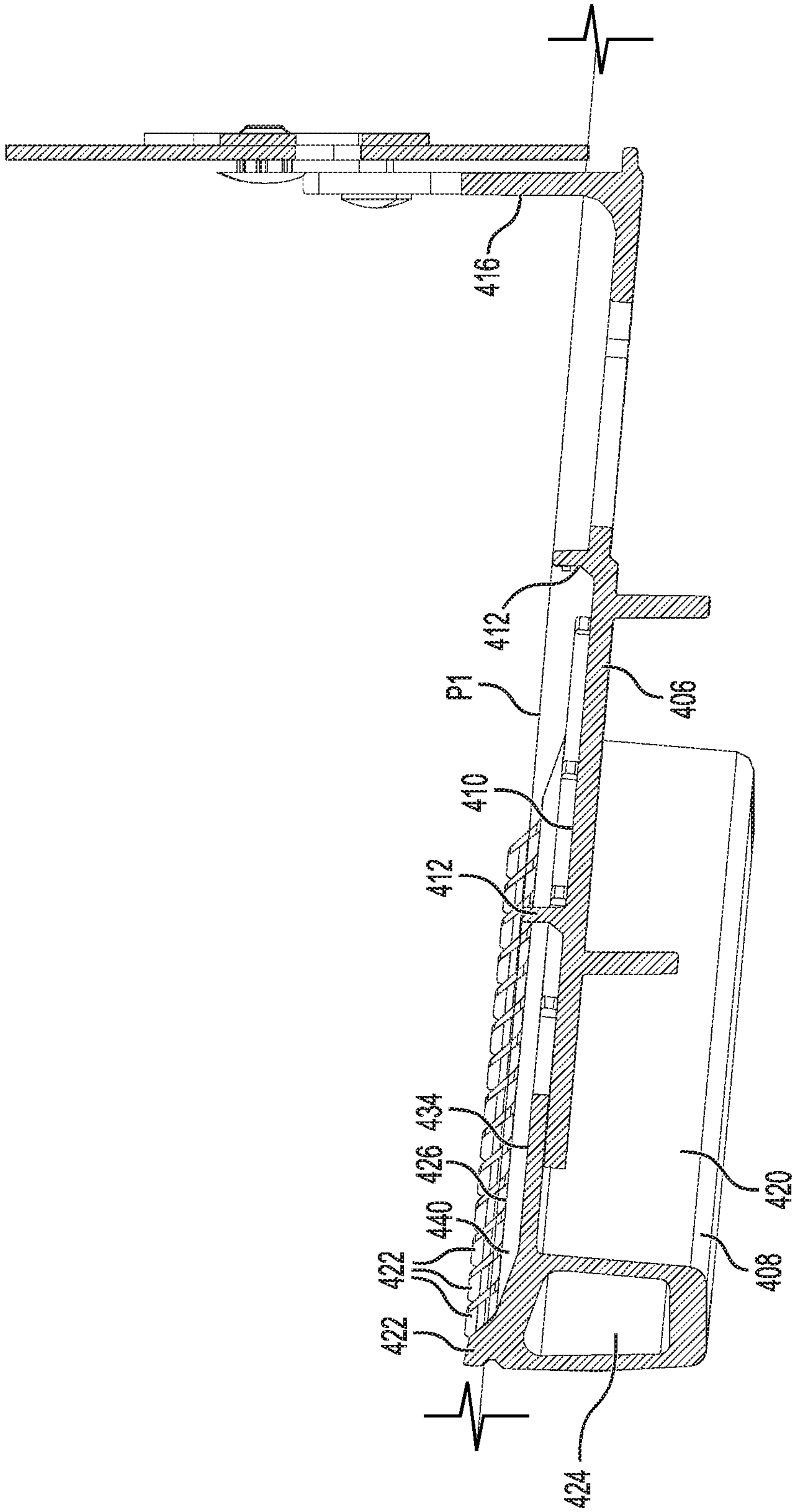
FIG. 42 is a cross-sectional view of the right footrest of the snowmobile of FIG. 1 taken along line 42-42 in FIG. 2B.

As shown in FIGS. 40 and 41, in this embodiment, a majority of the outer rim portion 408 extends vertically lower than the upper surface 410 of the inner body portion 406. Notably, a majority of the hollow rim body 420 is disposed vertically lower than the upper surface 410 of the inner body portion 406. For example, in a cross-section of the footrest 40 taken along a lateral plane, as shown in FIG. 42, less than 30% of the height of the rim body 420 extends vertically higher than the upper surface 410 of the inner body portion 406. In this embodiment, in the cross-section of the footrest 40 taken along the lateral plane, less than 20% of the height of the rim body 420 extends vertically higher than the upper surface 410 of the inner body portion 406. In other words, a vertical offset of the upper surface 410 relative to the upper rim surface 426 is relatively small. For instance, as shown in FIG. 42, the inner body gripping projections 412 extend vertically higher than the upper rim surface 426. Notably, as can be seen, a plane P1 extending parallel to the upper surface 410 and extending through the upper ends of the inner body gripping projections 412 is disposed above the upper rim surface 426 (but below the upper ends of the rim gripping projections 422).

Due to the above-described configuration of the footrests 40, the driver of the snowmobile 10 can more easily disengage his/her feet from the footrests 40 while the footrests 40 still provide adequate safety during use to prevent the driver's feet from accidentally disengaging the footrests 40. In particular, the outer rim portion 408 forms a relatively small obstacle compared to typical snowmobile footrests in which the inner body portion is aligned generally along mid-height of the outer rim portion such that the driver has to lift his/her feet above the outer rim portion to disengage the footrests. In contrast, according to this embodiment, the driver can disengage the footrests 40 by forcefully sliding his/her feet laterally outwardly and upwardly along the outer rim portion 408. At the same time, the configuration of the outer rim portion 408 can prevent inadvertent slipping of the driver's foot off the inner body portion 406 of the footrest 40.

Figure 68:
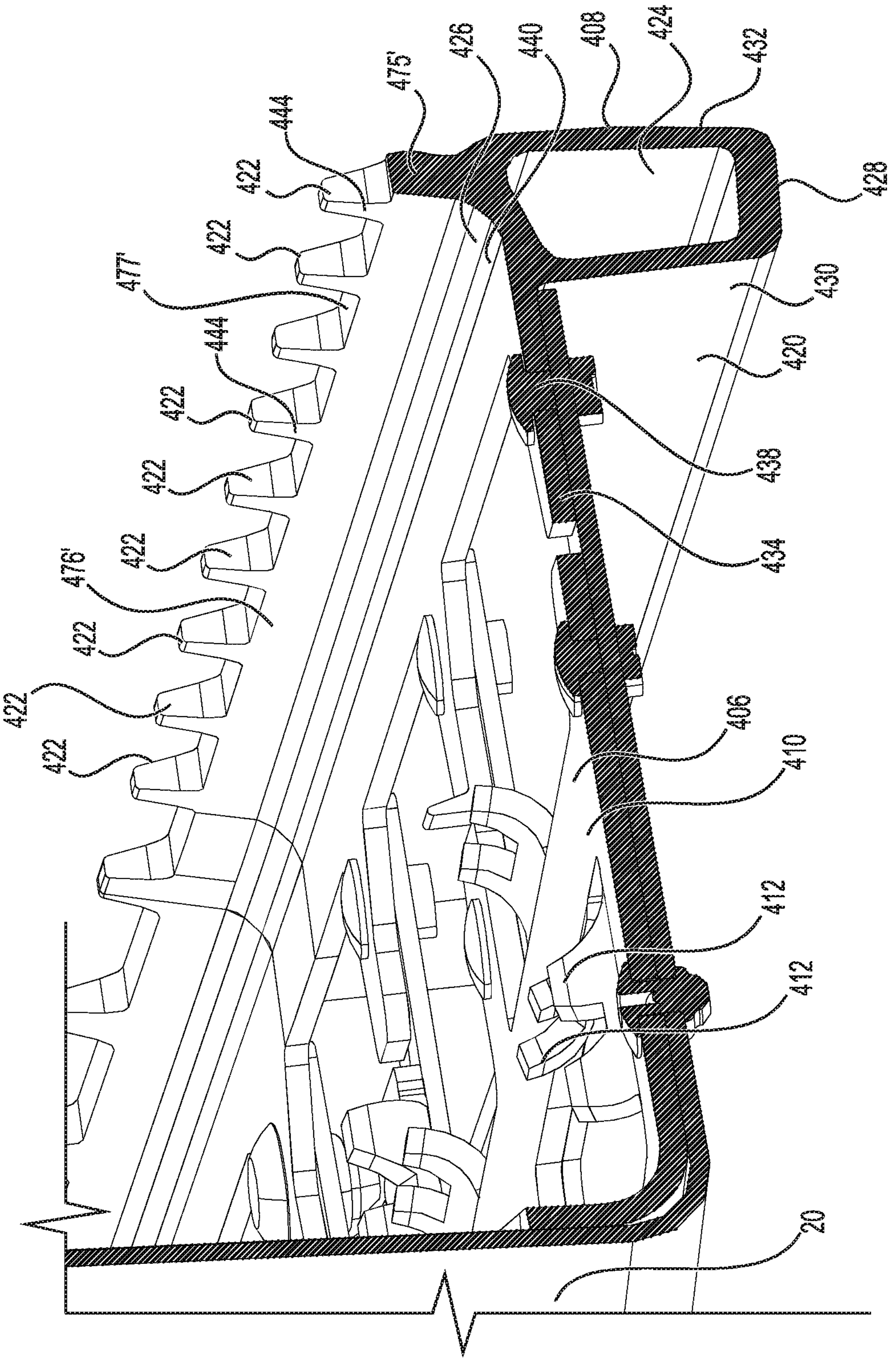
FIG. 68 is a perspective view, taken from a top, rear, left side, of a cross-section of the right footrest according to another embodiment.

The footrests 40 may be configured differently in other embodiments. For instance, in an alternative embodiment shown in FIG. 68, the footrests 40 are configured so as to help prevent sliding disengagement of the user's feet from the footrests 40. Notably, the inner lateral surfaces 444 of the rim gripping projections 422 are not so slanted as to form a ramp for the user to slide his/her feet laterally outwardly off the footrests 40. Moreover, the rim gripping projections 422 extend vertically higher than in the embodiment shown in FIGS. 41 and 42. In particular, in this alternative embodiment, the outer rim portion 408 has a retaining wall 475' that extends upwardly from the upper rim surface 426 along a length of the rim body 420, and the rim gripping projections 422 extend upwardly from the retaining wall 475'. An inner lateral surface 476' of the retaining wall 475' faces the tunnel 20. The rim gripping projections 422 extend upwardly from an upper wall surface 477' of the retaining wall 476'. The upper wall surface 477' and the inner lateral surface 476' are generally perpendicular to one another. As will be understood, in this embodiment, the connecting flanges 434 and the retaining wall 475' extend from the upper end portion of the rim body 420, namely from the upper rim surface 426 thereof. Indeed, in this alternative embodiment, the connecting flanges 434 and the retaining wall 475' are disposed vertically higher than a majority of the internal space 424 of the hollow rim body 420. For instance, the retaining wall 475' is disposed vertically higher than an entirety of the internal space 424 of the hollow rim body 420.

With reference to FIGS. 43 to 45, in this embodiment, the right footrest 40 is disposed on the same side (i.e., the right side) of the snowmobile 10 as the chaincase 99. The right footrest 40 may thus also alternatively be referred to as the chaincase-side footrest 40. In particular, the chaincase 99 is disposed, longitudinally, near the front end 402 of the right footrest 40 and, as shown in FIG. 44, the chaincase 99 extends partly vertically lower than the right footrest 40. As best shown in FIG. 45, the right footrest 40 is positioned relative to the chaincase 99 such that part of the right footrest 40 is disposed laterally outward of the chaincase 99 and is spaced from the chaincase 99 by a gap 450 that is defined laterally between an inner lateral edge 425 of the inner body portion 406 of the right footrest 40 and the chaincase 99. The inner lateral edge 425 thus defines a laterally outward edge of the gap 450 while the chaincase 99 defines a laterally inward edge of the gap 450. The gap 450 is configured to allow passage of snow therein between the chaincase 99 and the right footrest in order to avoid accumulation of snow on the right footrest 40 and the area surrounding it. In particular, the gap 450 is open from above and below such that snow passing through the gap 450 from above falls to the ground. In this context, the gap 450 being "open" refers to the absence of a barrier along at least part of a length and width of the gap 450 to allow the flow of snow through the gap 450 onto the ground.

As best shown in FIG. 45, in this embodiment, the protective cover 460 extending beneath the chaincase 99 is positioned such that an outer lateral edge 462 of a lateral wall 464 of the protective cover 460 is disposed laterally inward of the portion of the right footrest 40 that defines the laterally outward edge of the gap 450 (i.e., the inner lateral edge 425). The lateral wall 464, which extends upwardly from a bottom wall 466 of the protective cover 460 extending beneath the lower portion of the chaincase 99, is disposed laterally outwardly of the chaincase 99. As shown in FIG. 44, a majority of an upper end 468 of the lateral wall 464 extends vertically lower than the right footrest 40 along the portion of the right footrest 40 that is longitudinally aligned with the chaincase 99. Furthermore, a majority of the upper end 468 is disposed laterally inwardly of the portion of the right footrest that is longitudinally aligned with the chaincase 99. The gap 450 is thus generally clear of obstruction from the protective cover 460 such that snow does not become packed in the concave side 461 of the protective cover 460 (e.g., during operation of the snowmobile 10 in deep snow conditions), which can be hard to clear due to the limited access thereto. As shown in FIG. 43, in this embodiment, the protective cover 460 is connected, at a rear end thereof, to the inner body portion 406 of the right footrest 40. A front end of the protective cover 460 is connected to the frame 16.

Figure 66:
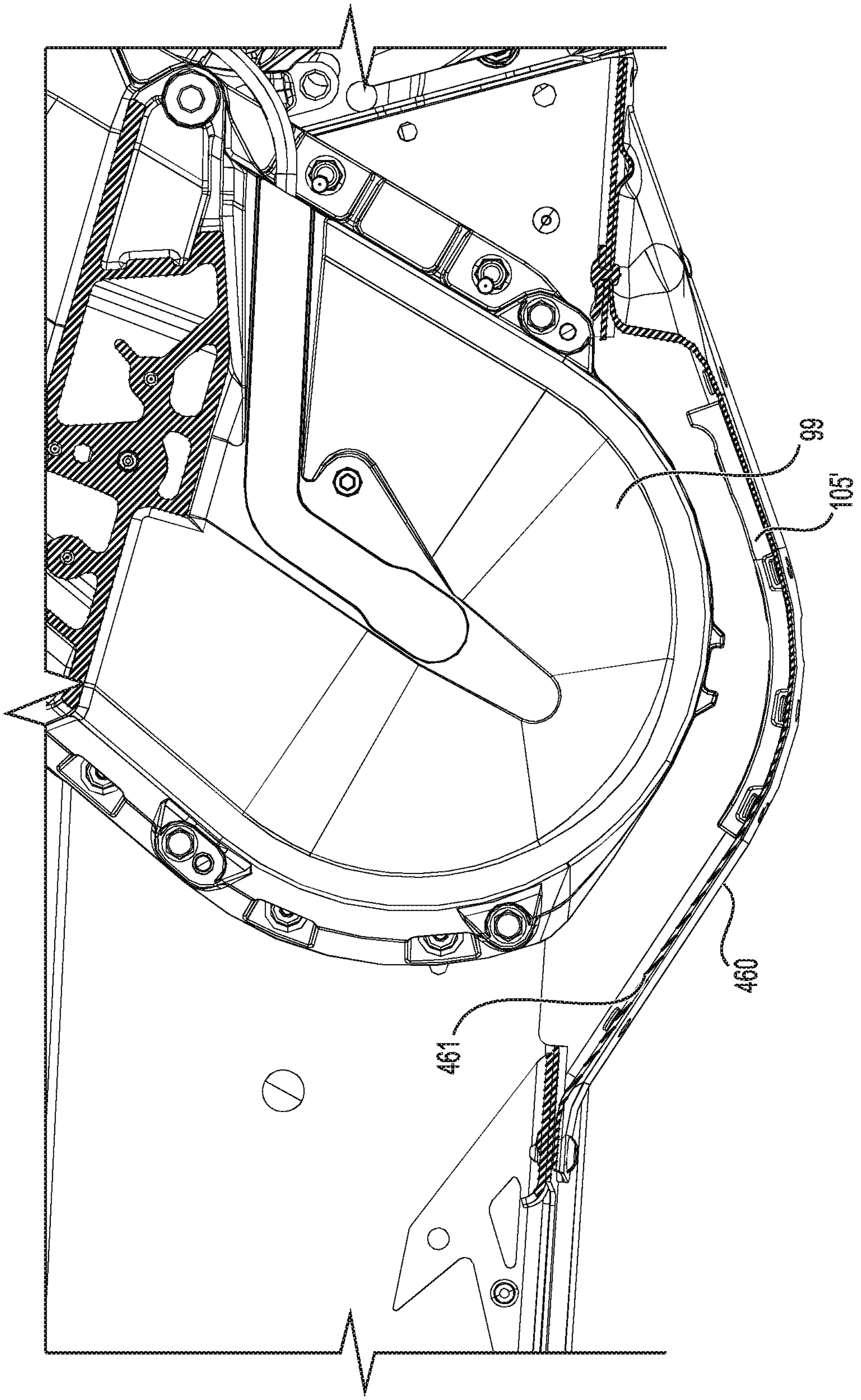
FIG. 66 is a cross-sectional view of part of the snowmobile in accordance with an alternative embodiment, showing the chaincase and part of a protective cover.
Figure 67:
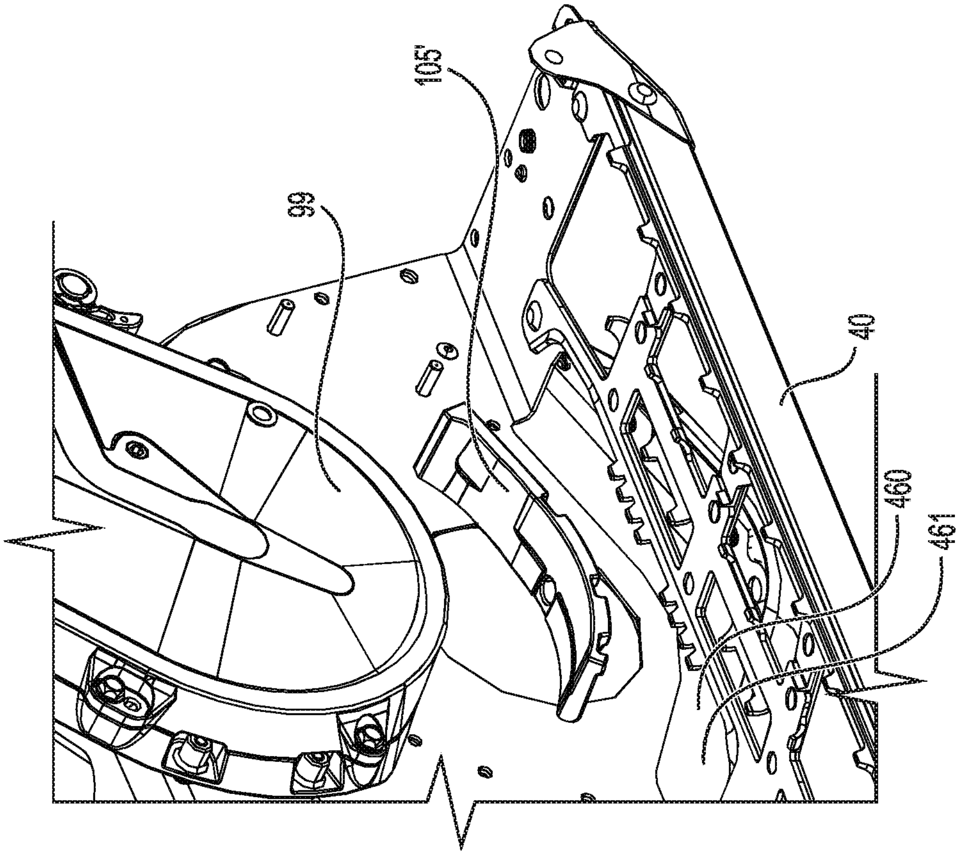
FIG. 67 is a perspective view, taken from a top, rear, left side, of the part of the snowmobile of FIG. 66, showing an elastomeric member of the snowmobile in an exploded configuration.

As shown in FIGS. 66 and 67, in some embodiments, an elastomeric member 105' is placed between the chaincase 99 and the protective cover 460. In one embodiment, the elastomeric member 105' is connected to the protective cover 460 on the concave side 461 thereof. The elastomeric member 105' which is made of elastomeric material (e.g., rubber) can help further protect the chaincase 99 in case a sufficiently strong impact deforms the protective cover 460 in such a manner that the protective cover 460 comes into contact with the chaincase 99.

Headlight System

Returning now to FIG. 4, the snowmobile 100 has a headlight system including a plurality of headlight units 500L, 500H configured to emit light in order to illuminate a path for the driver of the snowmobile 10. In particular, the headlight units 500L, 500H are positioned in a front of the snowmobile 10, notably being received in respective headlight cavities (not shown) defined by the body of the snowmobile 10. In this embodiment, two headlight units are provided, namely a low beam headlight unit 500L and a high beam headlight unit 500H. As shown in FIG. 4, in this embodiment, the low beam headlight unit 500L is disposed on a left side of the longitudinal centerplane 13 of the snowmobile 10 while the high beam headlight unit 500H is disposed on a right side of the longitudinal centerplane 13 of the snowmobile 10.

The low beam headlight unit 500L will now be described in greater detail with reference to FIGS. 46 to 52. The low beam headlight unit 500L has a front end 502 and a rear end 504 opposite the front end 502. In this embodiment, the low beam headlight unit 500L has a housing 506 and an outer lens 508 connected thereto. The housing 506 and the outer lens 508 together define an internal space in which the internal components of the low beam headlight unit 500L are enclosed. The outer lens 508 defines the front end 502 of the low beam headlight unit 500L. The outer lens 508 is generally cup-shaped and has a rear end flange 510 which surrounds a front end of the housing 506. The housing 506 has a plurality of connecting mounts 512 distributed along an outer side of the housing 506 for securing the headlight unit 500L to the body of the snowmobile 10.

Figure 49:
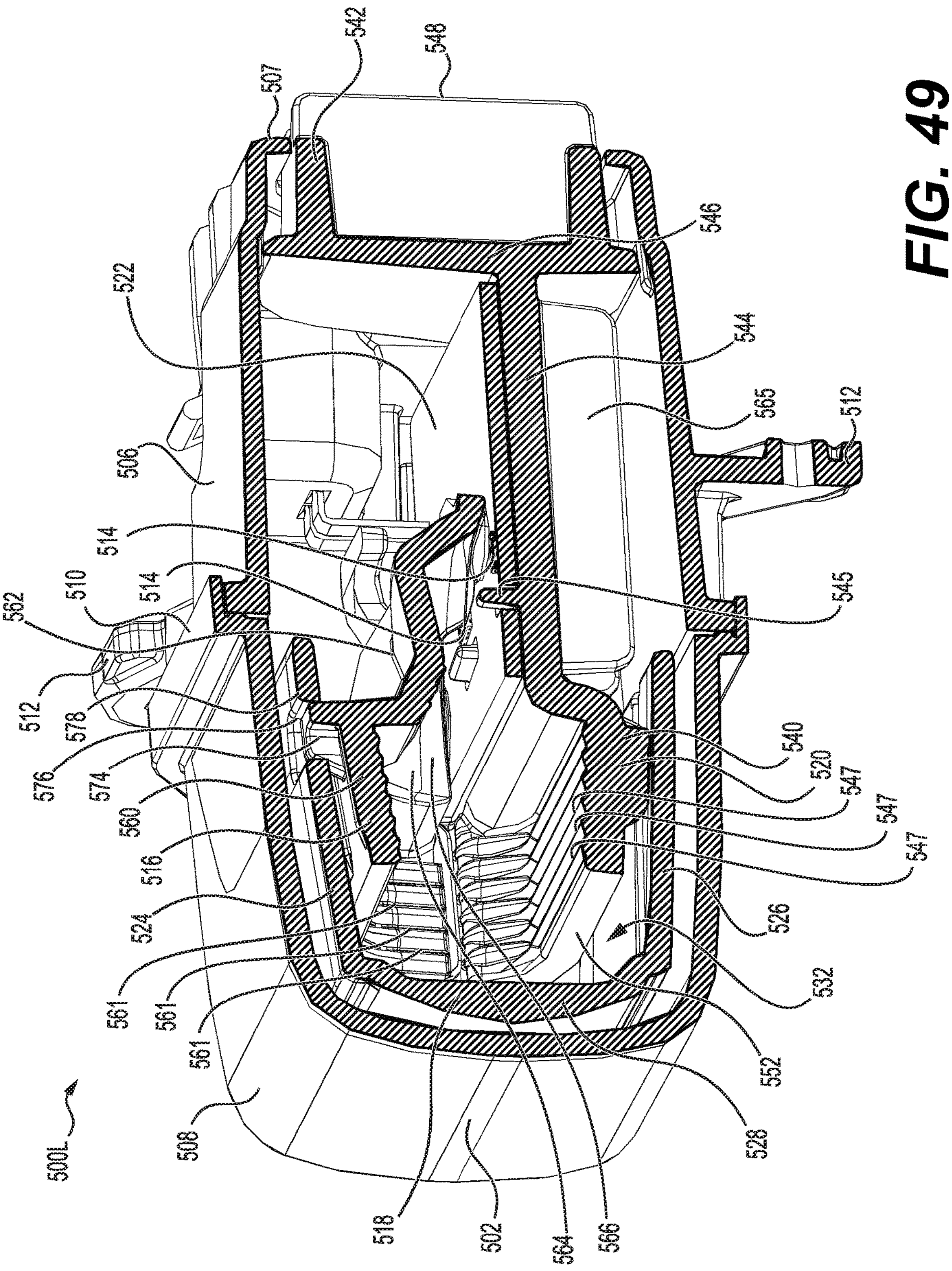
FIG. 49 is a perspective view, taken from a top, front, left side, of a cross-section of the low beam headlight unit taken along line 49-49 in FIG. 47.
Figure 50:
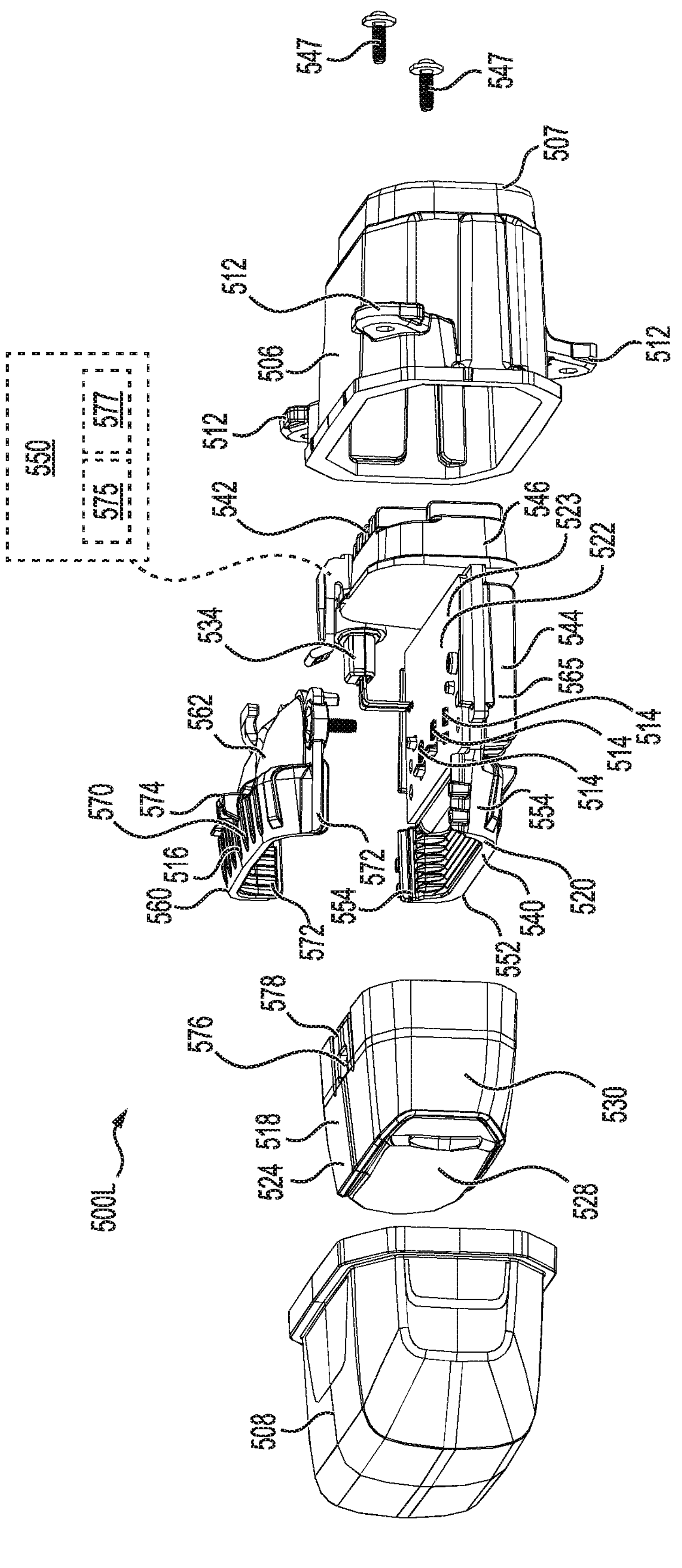
FIG. 50 is an exploded view of the low beam headlight unit of FIG. 46.

As shown in FIGS. 49 and 50, the low beam headlight unit 500L has a plurality of light-emitting diodes (LEDs) 514, a reflector 516 positioned to reflect light emitted by the LEDs 514, an optic lens 518 configured to transmit light emitted by the LEDs 514 and reflected by the reflector 516, a heat sink 520 for cooling the LEDs 514, and a connecting base 522 for electronically connecting the LEDs 514 to a controller 550 (schematically illustrated in FIG. 50). The LEDs 514, the reflector 516, the optics lens 518, the heat sink 520 and the connecting base 522 are at least partly enclosed between the housing 506 and the outer lens 508 within the internal space defined thereby.

As best shown in FIG. 49, the optic lens 518 is positioned to transmit light emitted by the LEDs 514 prior to transmission through the outer lens 508. In particular, the optic lens 518 is received within an internal volume defined by the outer lens 508. In this embodiment, the optic lens 518 is generally cup-shaped and has an upper wall 524, a lower wall 526, a front wall 528 and two lateral walls 530 defining an optic lens cavity 532 therebetween. As will be described below, some of the other components of the low beam headlight unit 500L extends within the optic lens cavity 532.

The heat sink 520 has a front portion 540, a rear portion 542 and a middle portion 544 disposed between the front and rear portions 540, 542. The middle portion 544 is configured to support other components of the low beam headlight unit 500L, namely the reflector 516 and the connecting base 522. In particular, as shown in FIG. 49, the connecting base 522 is disposed atop the middle portion 544. Notably, in this embodiment, the middle portion 544 has upwardly extending projections 545 which are received in respective openings defined by the connecting base 522. The projections 545 are positioned such that each projection 545 extends near, namely in front of, a respective one of the LEDs 514 in order to optimize heat transfer from the LEDs 514 to the projections 545. Furthermore, as shown in FIG. 49, in this embodiment, the middle portion 544 of the heat sink 520 includes internal fins 565 extending toward the internal wall of the housing 506 (i.e., downwardly) from a lower surface of the middle portion 544 (opposite the upper surface 523). The internal fins 565 provide additional surface area in order to optimize heat exchange by the heat sink 520.

Figure 47:
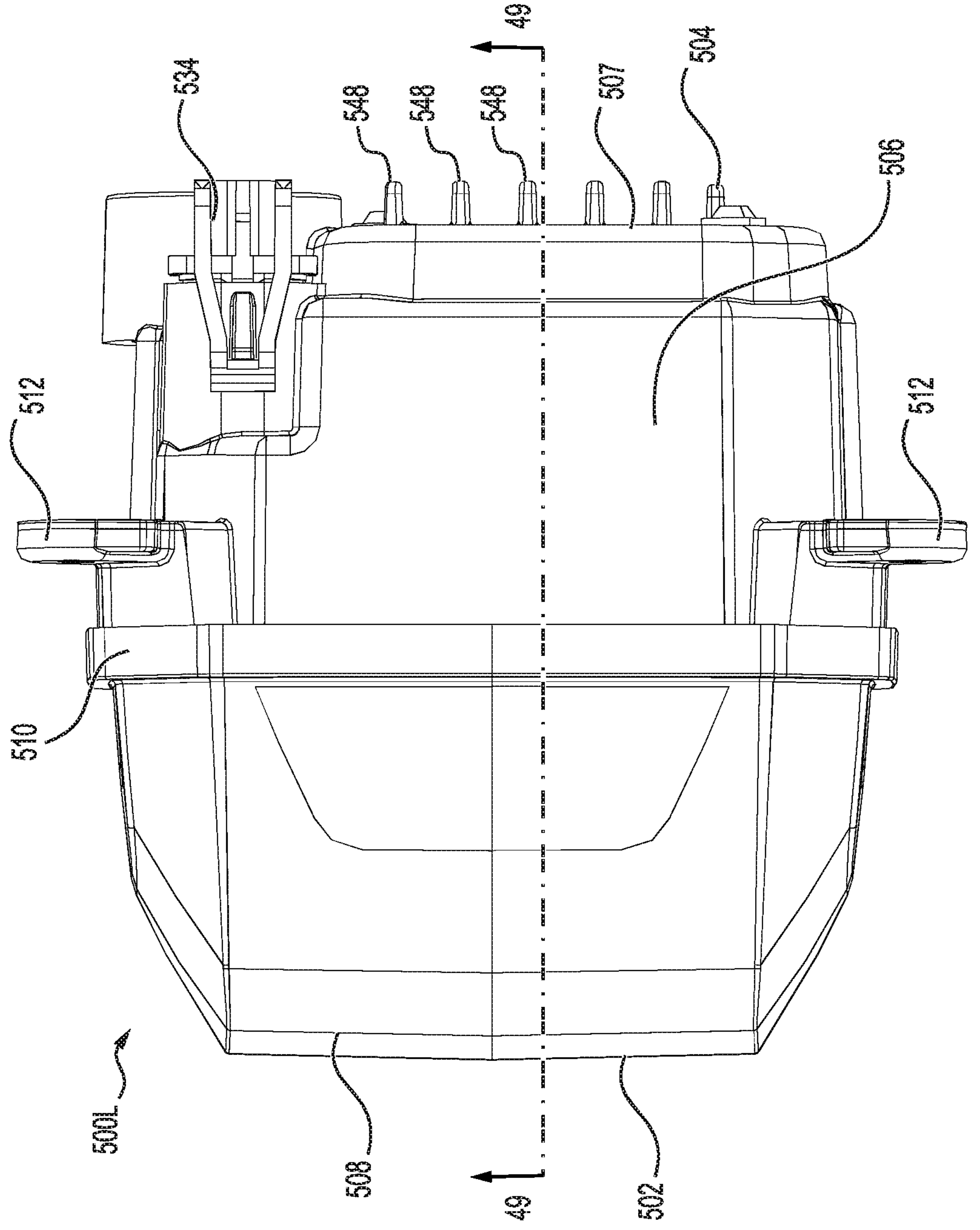
FIG. 47 is a top plan view of the low beam headlight unit of FIG. 46.
Figure 48:
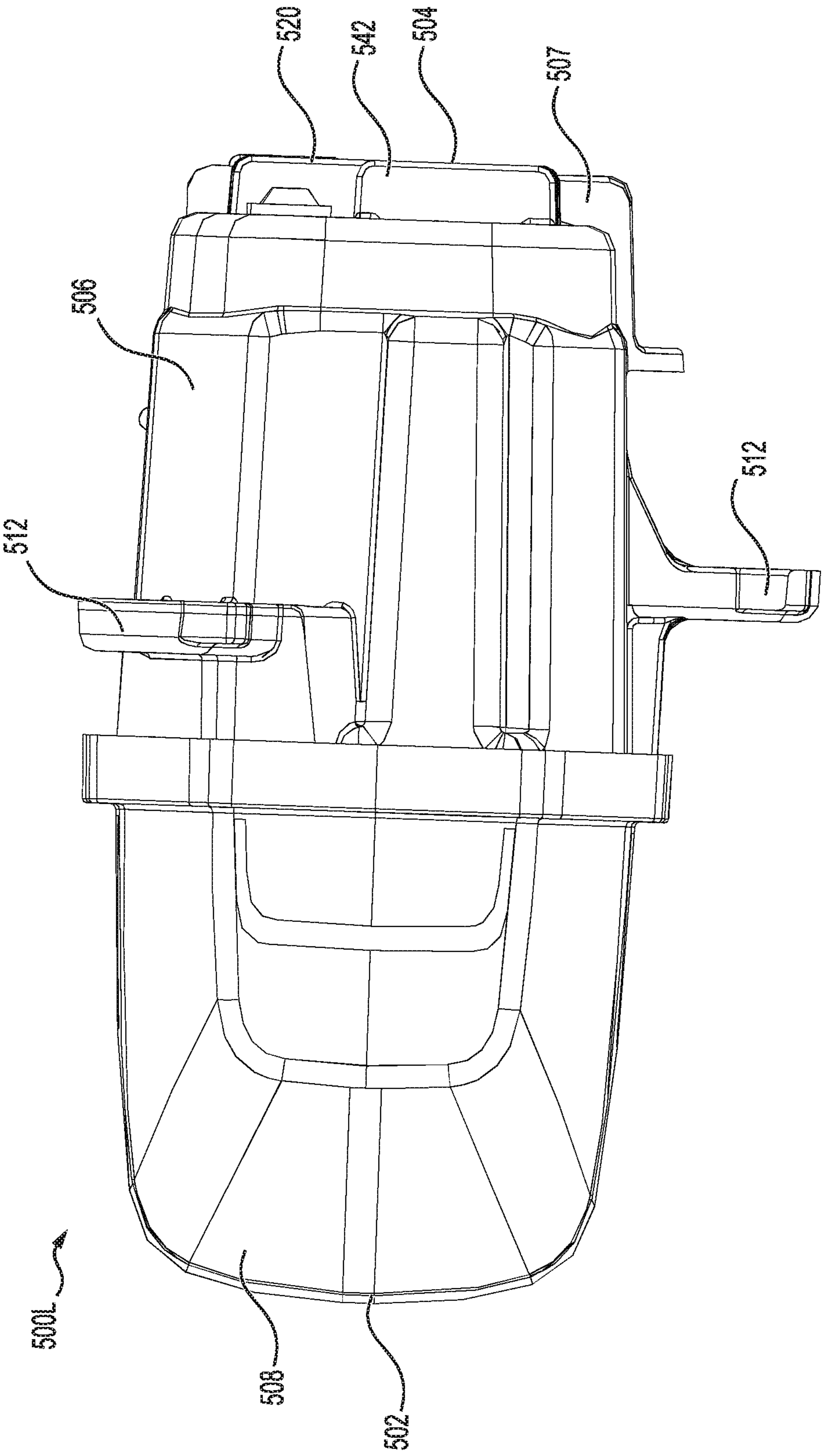
FIG. 48 is a left side elevation view of the low beam headlight unit of FIG. 46.

The rear portion 542 of the heat sink 520 includes a heat sink base 546 defining the rear end 504 of the low beam headlight unit 500L. Notably, the heat sink base 546 extends in part through an open rear end 507 (FIG. 49) of the housing 506. The heat sink base 546 is connected to the housing 506, namely fastened thereto, by two mechanical fasteners 547 (FIG. 50). In particular, the two fasteners 547 fastened the heat sink base 546 to the rear end 507 of the housing 506. The rear portion 542 of the heat sink 520 also includes a plurality of fins 548 extending rearwardly from the heat sink base 546. As shown in FIGS. 47 and 49, the fins 548 are disposed outside of the housing 506, namely being inserted through the open rear end 507 thereof. The fins 548 are configured to improve heat exchange with an exterior environment of the low beam headlight unit 500L so as to cool the low beam headlight unit 500L. For instance, referring to FIG. 4, in this embodiment, vents 549 are defined by the fairings 90 of the snowmobile 10 at the front end 12 thereof, positioned below respective ones of the headlight units 500L, 500H to route cool air within the headlight cavities in which the headlight units 500L, 500H are received. For the low beam headlight unit 500L, the air routed into the corresponding headlight cavity in which it is received flows between the fins 548 to cool the low beam headlight unit 500L.

In this embodiment, the front portion 540 of the heat sink 520 extends forward of the connecting base 522. In particular, as shown in FIG. 49, the front portion 540 of the heat sink 520 extends within the optic lens cavity 532 (i.e., between the upper and lower walls 524, 526). The front portion 540 of the heat sink 520 has a base section 552 extending generally laterally and two lateral end sections 554 extending at an angle from the base section 522. In particular, in this embodiment, the base section 552 extends generally parallel to the lower wall 526 of the optic lens 518 and the lateral end sections 554 curve upwardly from the base section 552. Notably, in this embodiment, a cross-sectional profile of the front portion 540 of the heat sink 520 is generally C-shaped to conform to a shape of the optic lens 518. The front portion 540 also has a plurality of ridges 551 (FIG. 51) disposed on an inner side (i.e., an upper side) of the front portion 540. The ridges 551 extend generally laterally along the base section 552, and generally downwardly along the lateral end sections 554. The ridges 551 may be helpful to provide a greater surface area for effecting heat transfer at the front portion 540. The extension of the heat sink 520 within the optic lens cavity 532 allows the heat sink 520 to rapidly heat the optic lens 518 by transferring some of the heat collected from the LEDs 514 to the optic lens 518. Notably, because the snowmobile 10 is used in cold temperatures, without adequate heating, moisture may coat the inner and outer surfaces of the optic lens 518 which could fog the light transmitted therethrough. By heating the optic lens 518 via the heat sink 520, collection of the moisture on the surfaces of the optic lens 518 is minimized and the transmission of light through optic lens 518 remains unaffected by the cold temperatures in which the snowmobile 10 is operated.

As shown in FIG. 49, in this embodiment, a majority of the heat sink 520, including for instance the front portion 540, the middle portion 544, and part of the rear portion 542, is disposed in a lower half of the low beam headlight unit 500L.

In this embodiment, the heat sink 520 is made of metallic material, namely aluminum. It is contemplated that the heat sink 520 could be made of a different thermally conductive material in other embodiments.

Figure 51:
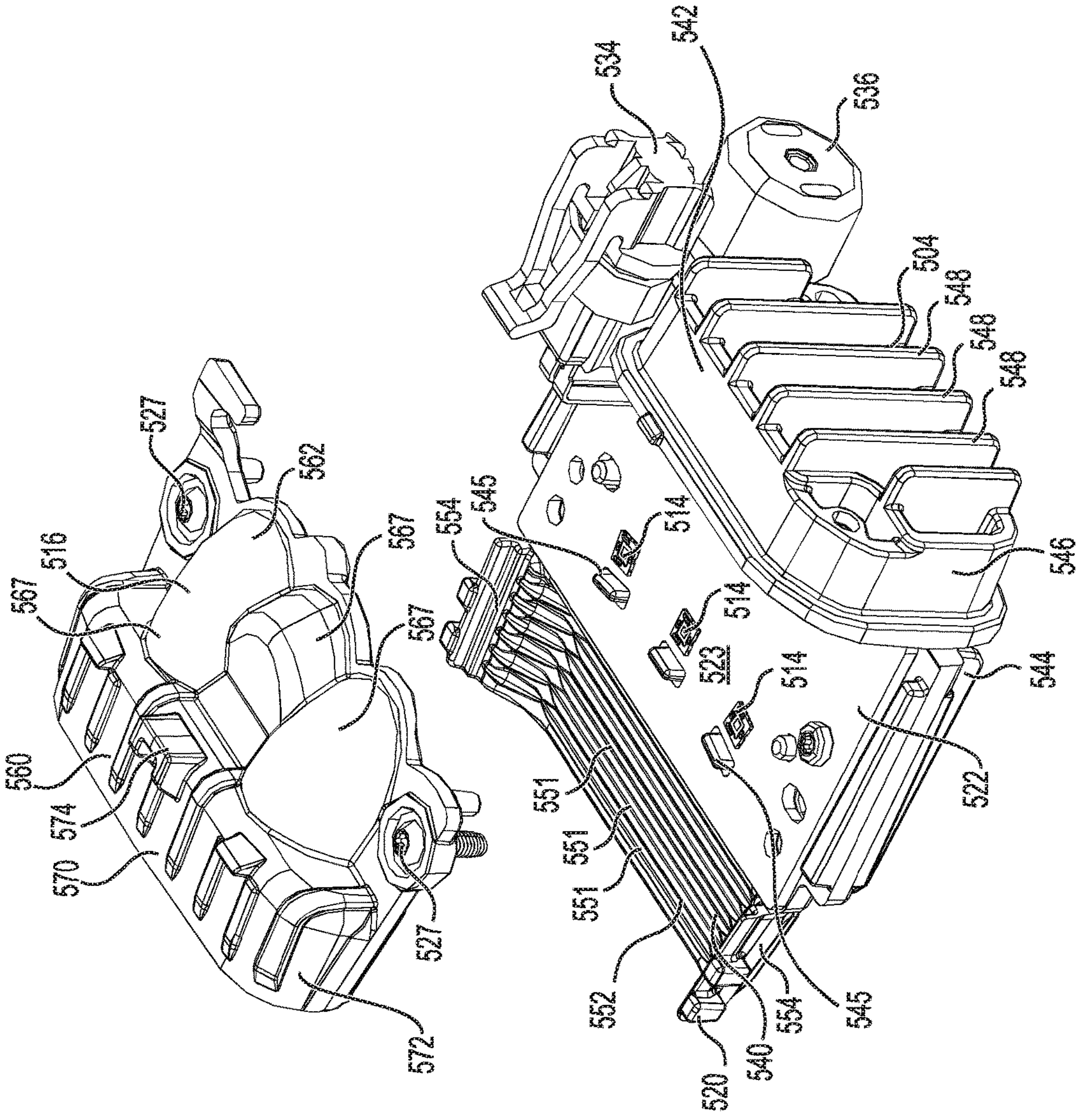
FIG. 51 is a perspective view, taken from a top, rear, left side, of part of the low beam headlight unit of FIG. 46 in an exploded configuration, including a reflector, a heat sink, a plurality of light-emitting diodes and a connecting base.

As shown in FIG. 51, the LEDs 514 are disposed on an upper surface 523 of the connecting base 522 and emit light upward toward the reflector 516 positioned thereabove. The LEDs 514 are disposed outside of the optic lens cavity 532 of the optic lens 518. In this embodiment, three LEDs 514 are provided and are spaced apart laterally from one another. More or fewer LEDs 514 may be provided in other embodiments. In this embodiment, the connecting base 522 is generally rectangular and is disposed atop the middle portion 540 of the heat sink 520. An electronic connector 534 is provided on the connecting base 522 for electronically connecting the connecting base 522 to the controller 550 (FIG. 50). As will be described below, the controller 550 is operable to control operation of the LEDs 514. The connector 534 extends through the rear open end 507 of the housing 506 so as to remain accessible for connection.

Figure 52:
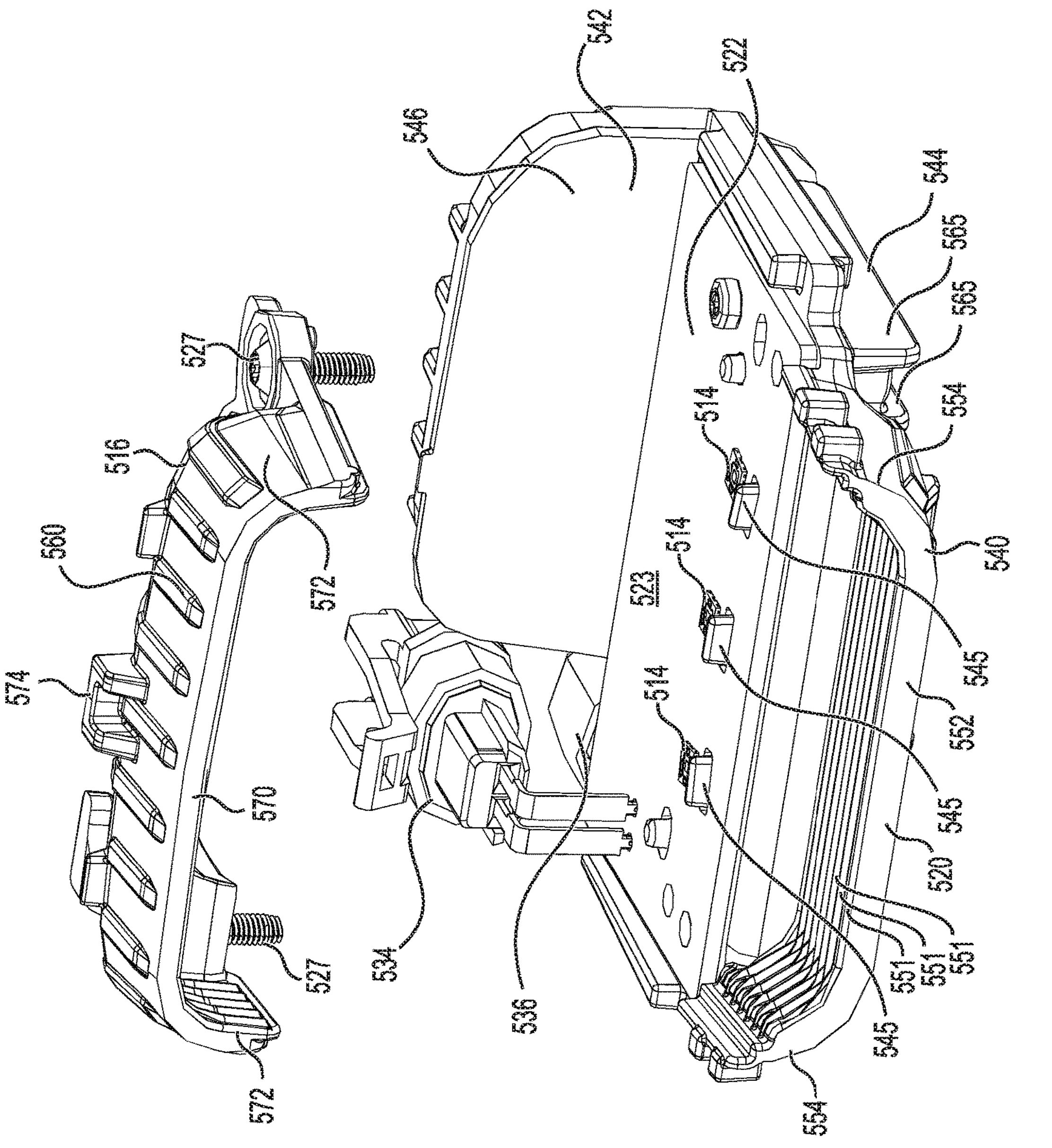
FIG. 52 is a perspective view, taken from a top, front, left side, of the part of the low beam headlight unit of FIG. 46 in an exploded configuration.

In this embodiment, as shown in FIGS. 51 and 52, a vent cap 536 is connected to the middle portion 544 of the heat sink 520, at a rear end thereof, and overlies a vent hole (not shown) defined by the middle portion 544 of the heat sink 520. The vent hole is covered by an impermeable membrane to prevent liquid particles from entering into the interior space of the low beam headlight unit 500L. The low beam headlight unit 500L is in fluid communication with the outside through an opening in the vent cap 536 and the vent hole such that air can flow into and out of the low beam headlight unit 500L through the vent cap 536.

With reference to FIG. 49, in this embodiment, the reflector 516 is positioned above the LEDs 514 such that light emitted by the LEDs 514 is projected upward onto the reflector 516. As such, the heat sink 520 is disposed below the reflector 516. In this embodiment, the reflector 516 has a front reflector portion 560 and a rear reflector portion 562 disposed rearwardly from the front reflector portion 560. As shown in FIG. 49, in this embodiment, a rear end of the front reflector portion 560 is vertically offset from a front end of the rear reflector portion 562. As can be seen, the front reflector portion 562 partly extends within the optic lens cavity 532, namely as part of the front reflector portion 562 is disposed between upper and lower walls 524, 526 of the optic lens 518.

As shown in FIG. 50, in this embodiment, the front reflector portion 560 has a generally C-shaped cross-sectional profile (taken along a plane extending laterally). Notably, the front reflector portion 560 has a base section 570, and two lateral end sections 572 extending at an angle relative to the base section 570. In particular, the two lateral end sections 572 are pointed downward towards the front portion 540 of the heat sink 520. The two lateral end sections 572 curve downwardly from the base section 570. The reflector 516 also has a plurality of ridges 561 disposed on an inner side (i.e., a lower side) of the front reflector portion 560. The ridges 561 extend generally laterally along the base section 570, and generally downwardly along the lateral end sections 572. The ridges 561 are configured to reflect light according to a particular desired reflecting path. Thus, as will be appreciated, in this embodiment, the front reflector portion 560 is substantially similar to the front portion 540 of the heat sink 520 and may be a mirror image thereof.

With reference to FIG. 49, the rear reflector portion 562 is disposed outside of the optic lens cavity 532 and extends above the LEDs 514 to reflect the light emitted thereby. Notably, a plurality of concave reflective surfaces 564 are provided at the rear reflector portion 562 to form concave recesses 566 facing the LEDs 514. Each concave recess 566 corresponds to one of the reflective formations 567 (FIG. 51) formed at the rear reflector portion 562. The reflective surfaces 564 are shaped and dimensioned to reflect the light emitted by the LEDs 514 as desired through the optic lens 518. In this embodiment, there are three reflective formations 567 and thus three concave recesses 566 provided, one for each of the LEDs 514. Notably, the reflective surfaces 564 defining a respective concave recess 566 are configured to reflect the light emitted by a corresponding one of the LEDs 514. As such, each concave recess 566 is disposed above the corresponding LED 514.

In this embodiment, as shown in FIGS. 49 and 50, the reflector 516 has an interlocking member 574 extending upwardly from a convex side (i.e., the upper side) of the reflector 516, at the front reflector portion 560. The interlocking member 574 is provided to interlock with the optic lens 518 so as to secure the optic lens 518 in place relative to the reflector 516. In particular, as shown in FIG. 49, the interlocking member 574 is received in an opening 576 of a tongue 578 of the optic lens 518 so as to be interlocked thereby. The tongue 578 is provided along the upper wall 524 of the optic lens 518, on the outer side thereof. As such, the optic lens 518 is connected to the heat sink 520. It is contemplated that, in other embodiments, the interlocking member 574 may instead be provided at the heat sink 520 (in which case the tongue 578 would be provided along the lower wall 526 of the optic lens 518).

In this embodiment, the reflector 516 is connected to the heat sink 520 and the connector base 522 by two fasteners 527 (e.g., screws, FIG. 51) that are received in respective openings defined by the connecting base 522 and the middle portion 544 of the heat sink 520.

Figure 53:
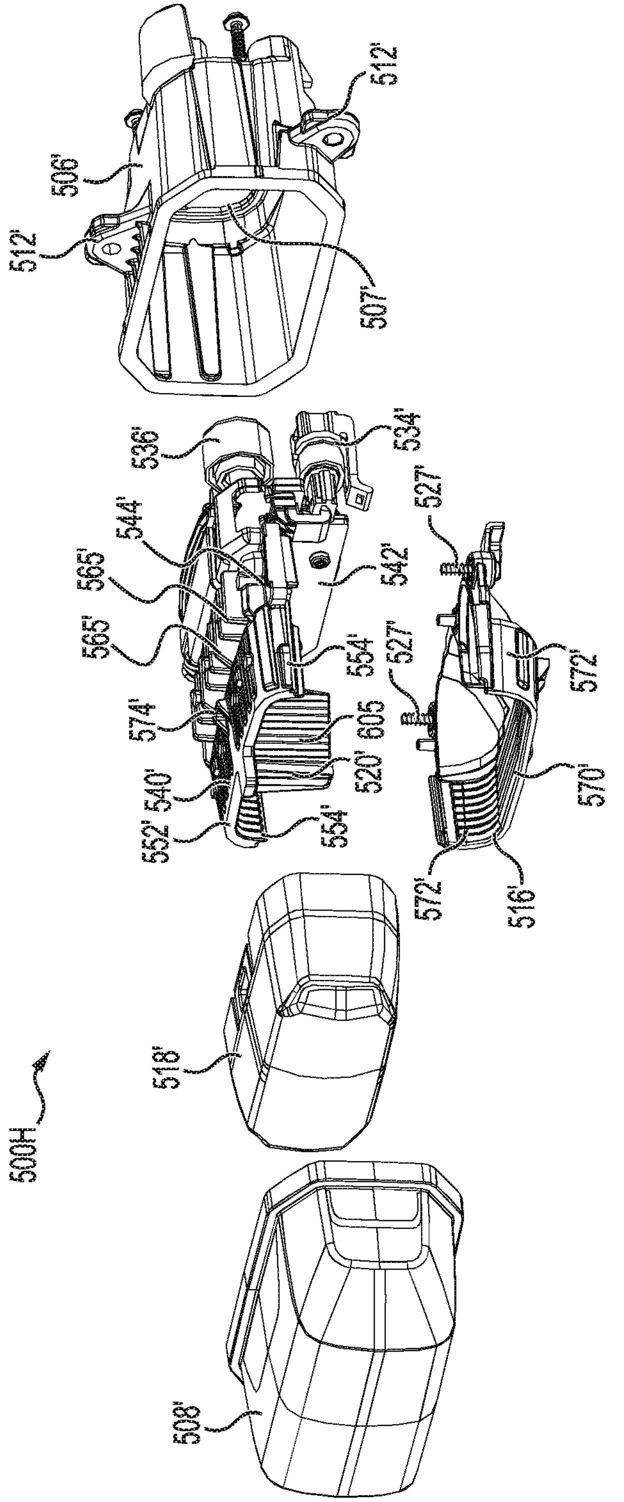
FIG. 53 is an exploded view of a high beam headlight unit of the headlight system of the snowmobile of FIG. 1.

The high beam headlight unit 500H will now be described with reference to FIGS. 53 and 54. As can be seen, the high beam headlight unit 500H shares many similarities with the low beam headlight unit 500L, namely having many similar components. As such, the components of the high beam headlight unit 500H that correspond to those of the low beam headlight unit 500L have been identified with the same reference numeral modified with the prime (') character as a suffix. Therefore, rather than describing the components of the high beam headlight unit 500H in detail herein, to avoid being repetitive, only the differences between the components of the high beam headlight unit 500H and the corresponding components of the low beam headlight unit 500L will be described, as well as the manner in which they are interconnected to one another if different than that described above with reference to the low beam headlight unit 500L.

Similarly to the low beam headlight unit 500L, the high beam headlight unit 500H has a housing 506', an outer lens 508', a plurality of light-emitting diodes (LEDs) 514', a reflector 516' positioned to reflect light emitted by the LEDs 514', an optic lens 518' configured to transmit light emitted by the LEDs 514' and reflected by the reflector 516', a heat sink 520' for cooling the LEDs 514', and a connecting base 522' for electronically connecting the LEDs 514' to the controller 550. In this embodiment, as will be described in more detail below, the positions of the reflector 516' and the heat sink 520' are inversed relative to the low beam headlight unit 500L. Notably, a majority of the heat sink 520' is disposed in an upper half of the high beam headlight unit 500H and is thus disposed above the reflector 516'.

Figure 54:
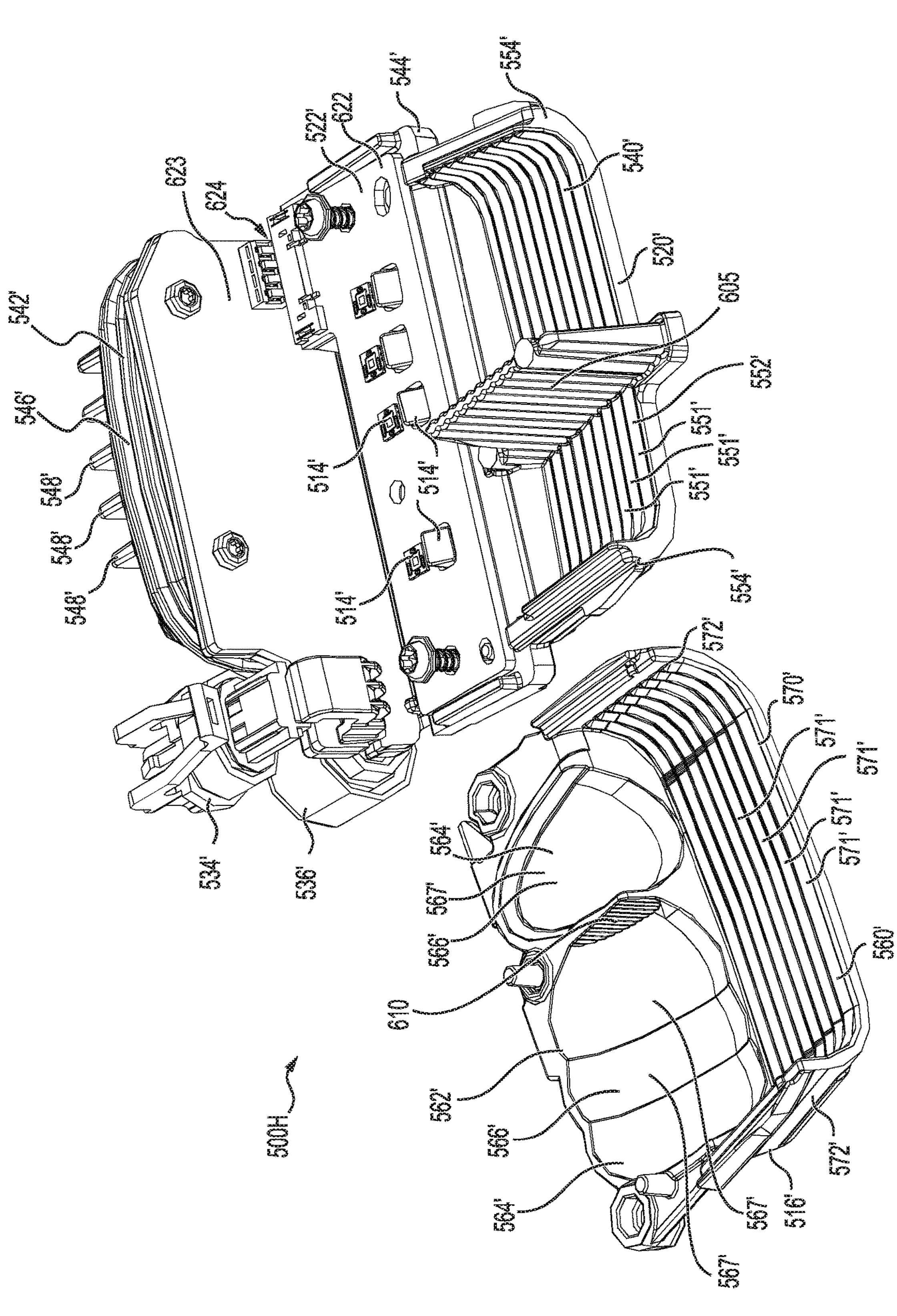
FIG. 54 is an exploded view of part of the high beam headlight unit of FIG. 53 with a reflector thereof flipped over to expose an inner side of the reflector.

As shown in FIG. 54, in this embodiment, the high beam headlight unit 500H has four LEDs 514'. The LEDs 514' are laterally spaced apart from one another. However, in contrast with the low beam headlight unit 500L, one of the LEDs 514' is further spaced from the other LEDs 514'. That is, a distance between one of the LEDs 514', namely a rightmost one of the LEDs 514', and the closest one of the other LEDs 514' is greater than a distance defined between consecutive ones of the other three LEDs 514'. The projections 545' of the heat sink 520' are thus positioned accordingly, with the rightmost projection 545' similarly being spaced apart from the other projections 545' by a greater distance than the other three projections 545'.

It is contemplated that more or fewer LEDs 514' may be provided in other embodiments.

In this embodiment, the reflector 516' of the high beam headlight unit 500H is disposed below the LEDs 514' such that light emitted by the LEDs 514' is projected downward onto the reflector 516'. In particular, the rear reflector portion 562' of the reflector 516' is disposed below the LEDs 514'. Furthermore, in this embodiment, the reflector 516' is shaped differently from the reflector 516. For instance, in addition to having four concave formations 567' rather than three, the reflective surfaces 564' defining the concave recesses 566' are shaped differently such that the light may be reflected differently by the reflector 516'. In addition, in this embodiment, the rear reflector portion 562' also has a partition wall 610 on the concave side thereof disposed between two of the concave recesses 566'. Furthermore, the rear end of the front reflector portion 560' is generally vertically aligned with a front end of the rear reflector portion 562'.

In addition, in this embodiment, the heat sink 520' is shaped differently from the heat sink 520. Notably, in this embodiment, the heat sink 520' has a generally W-shaped cross-sectional profile along at least part of a length thereof, namely along the front portion 540'. In particular, the front portion 540' has a base section 552' extending laterally, two lateral end sections 554' extending downward from the base section 552', and a middle projecting section 605 extending from the base section 552' and disposed between the lateral end sections 554'. The middle projecting section 605 extends further from the base section 552' than the lateral end sections 554'. In addition, the middle projecting section 605 is positioned so as to be aligned laterally between the rightmost one of the LEDs 514' and the consecutive LED 514'.

In this embodiment, as shown in FIG. 54, the connecting base 522' includes two connecting base members 622, 623 electronically connected to one another by a connection 624. The connecting base member 622 is disposed on the lower surface of the middle portion 544' of the heat sink 520' and fastened thereto. The connecting base member 623 is fastened to the rear portion 542', namely to an inner surface (i.e., a front surface) of the heat sink base 546'. The connecting base members 622, 623 extend generally perpendicular to one another. The connector 534' is provided on the connecting base member 623.

Furthermore, in this embodiment, the optic lens 518' is shaped differently from the optic lens 518 such that light transmits differently through the optic lens 518' than through the optic lens 518. For instance, a thickness of the walls of the optic lens 518' may be different from the thickness of the walls of the optic lens 518.

In this embodiment, the form factor of the low beam and high beam headlight units 500L, 500H is relatively similar. Notably, each of the low beam and high beam headlight units 500L, 500H has a width of less than 100 mm. More specifically, in this embodiment, each of the low beam and high beam headlight units 500L, 500H has a width of approximately 90 mm. This relative narrow width may allow multiple ones the headlight units 500L, 500H to be placed on the snowmobile 10 despite a limited width of the snowmobile 10.

Furthermore, as can be appreciated from the above description of the headlight system, the low and high beam headlight units 500L, 500H can facilitate installation and design of the snowmobile 10 since each headlight unit 500L, 500H has its own outer lens, in contrast to many conventional snowmobiles which have a large common outer lens provided for various multiple headlight units.

The controller 550 is in communication with the LEDs 514 of the low beam headlight unit 500L and the LEDs 514' of the high beam headlight unit 500H and is operable to selectively activate the LEDs 514 and the LEDs 514' based on an input signal indicative of a selection of a low beam operation mode or a high beam operation mode. The input signal may be triggered by the driver actuating one or more headlight control actuators (not shown) to generate the input signal indicating the driver's choice of the low beam operation mode or a high beam operation mode. In this embodiment, in the low beam operation mode, the controller 550 activates the LEDs 514 of the low beam headlight unit 500L and deactivates the LEDs 514' of the high beam headlight unit 500H. Conversely, in this embodiment, in the high beam operation mode, the controller 550 activates both the LEDs 514 and the LEDs 514' of both the low beam and high beam headlight units 500L, 500H.

As shown in FIG. 50, the controller 550 has a processor unit 575 for carrying out executable code, and a non-transitory memory unit 577 that stores the executable code in a non-transitory medium (not shown) included in the memory unit 577. The processor unit 575 includes one or more processors for performing processing operations that implement functionality of the controller 550. The processor unit 575 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory unit 577 may be a semiconductor memory (e.g., read-only memory (ROM) and/or random-access memory (RAM)), a magnetic storage medium, an optical storage medium, and/or any other suitable type of memory. While the controller 550 is represented as being one control unit in this implementation, it is understood that the controller 550 could comprise separate control units for controlling components separately and that at least some of these control units could communicate with each other.

Figure 55:
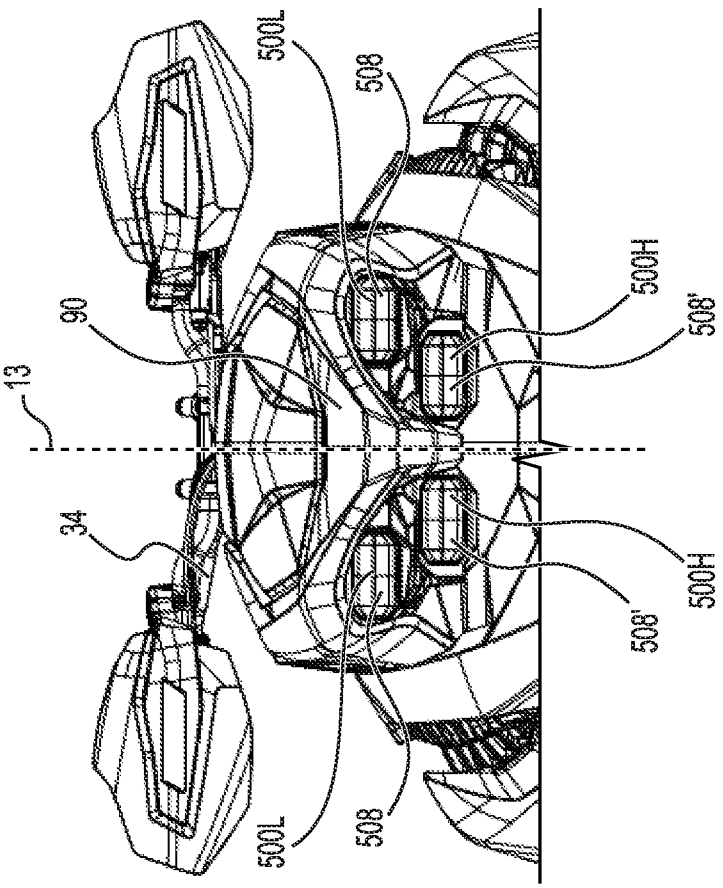
FIG. 55 is front elevation view of part of the snowmobile in accordance with an alternative embodiment in which the headlight system includes four headlight units.
Figure 56:
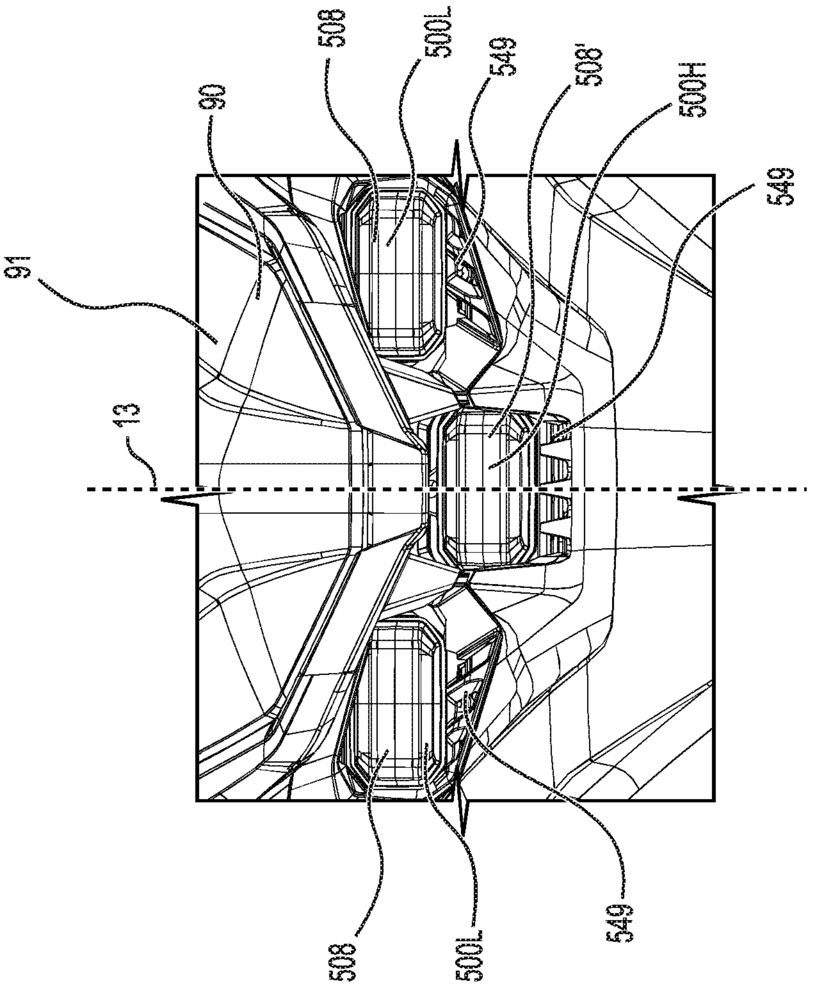
FIG. 56 is front elevation view of part of the snowmobile in accordance with an alternative embodiment in which the headlight system includes three headlight units.

With reference to FIGS. 55 and 56, the low beam and high beam headlight units 500L, 500H may be arranged differently in other embodiments. For instance, as shown in FIG. 55, in some embodiments, four headlight units 500L, 500H may be provided, namely two low beam headlight units 500L and two high beam headlight units 500H. As can be seen, in this example, one of each of the low beam and high beam headlight units 500L, 500H is disposed on either side of the longitudinal centerplane 13 of the snowmobile 10. In yet other embodiments, as shown in FIG. 56, three headlight units 500L, 500H may be provided, namely two low beam headlight units 500L and a single high beam headlight unit 500H. As can be seen, in this example, one of each of the low beam headlight units 500L is disposed on either side of the longitudinal centerplane 13 of the snowmobile 10 while the high beam headlight unit 500H is disposed laterally centrally of the snowmobile 10 such that the longitudinal centerplane 13 extends through the high beam headlight unit 500H.

Figure 69:
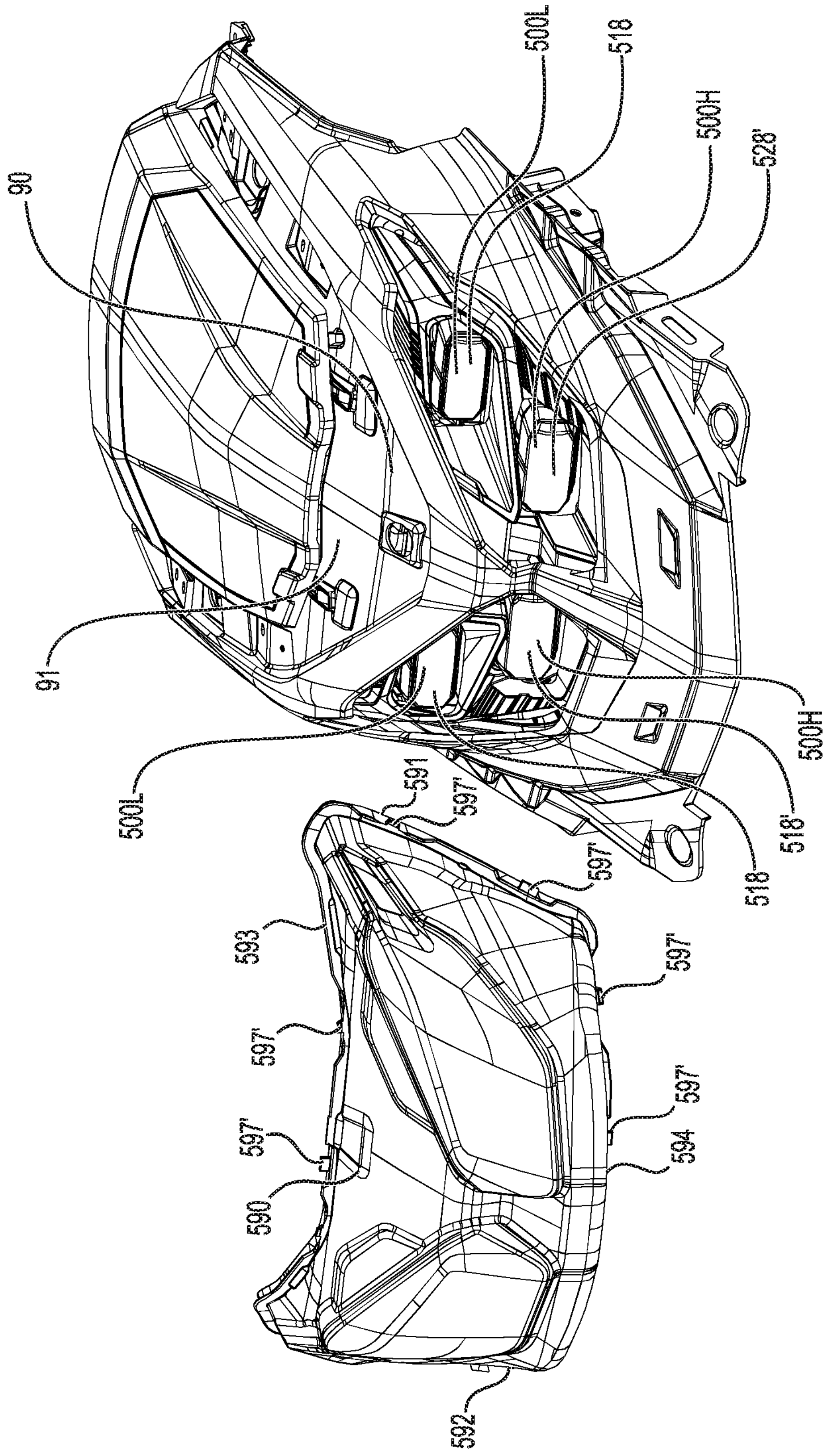
FIG. 69 is an exploded view of a front portion of the snowmobile according to another embodiment.
Figure 70:
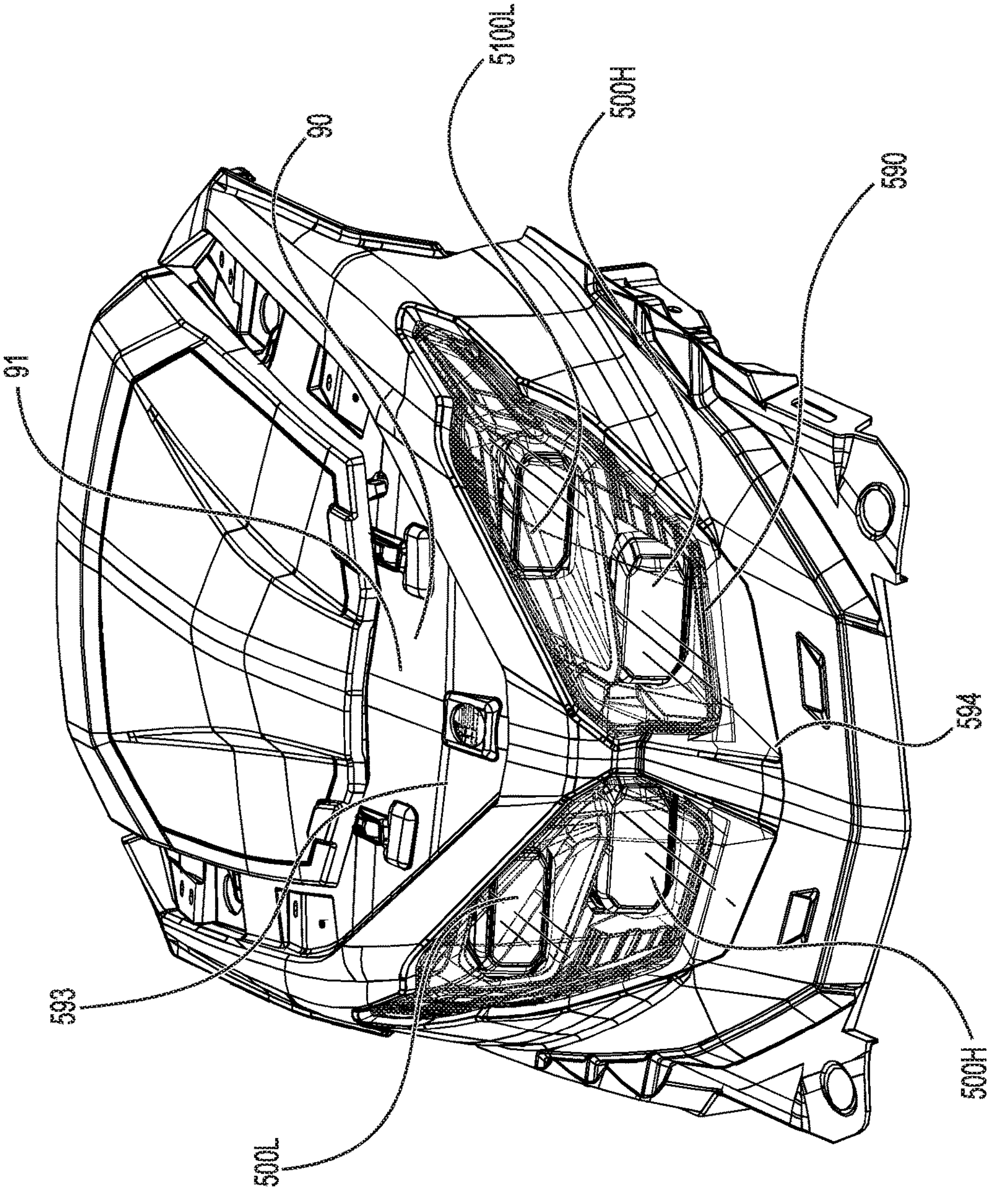
FIG. 70 is a perspective view, taken from a top, front, left side, of the front portion of the snowmobile of FIG. 69.

In an alternative embodiment, as shown in FIGS. 69 and 70, the snowmobile 10 has an external outer lens 590 that is removably connected to the hood 91 for covering and thereby protecting a plurality of the headlight units 500L, 500H simultaneously. For instance, in this alternative embodiment, the external outer lens 590 is provided to cover all of the low beam and high beam headlight units 500L, 500H together. In particular, the external outer lens 590 is dimensioned such that, when the external outer lens 590 is installed, the low beam and high beam headlight units 500L, 500H are disposed laterally between a left end 591 and a right end 592 of the external outer cover 590, and vertically between an upper end 593 and a lower end 594 of the external outer lens 590. As such, in this alternative embodiment, the external outer lens 590 extends across the longitudinal centerplane 13 of the snowmobile 10. The external outer lens 590 has a plurality of tabs 597' around respective ones of the ends 591, 592, 593, 594 that snap into respective openings (not shown) defined by the hood 91. Furthermore, in this alternative embodiment, as the external outer lens 590 provides protection to the headlight units 500L, 500H, the outer lenses 508, 508' of the low beam and high beam headlight units 500L, 500H are omitted as their protective function is fulfilled by the external outer lens 590. As such, once the external outer lens 590' is removed, the optic lenses 518, 518' of the headlight units 500L, 500H are exposed to the outside environment. It is contemplated that, in other embodiments, the outer lenses 508, 508' could be included irrespective of the inclusion of the external outer lens 590.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:

a frame including a tunnel;

a driver seat supported by the frame;

a rear suspension assembly connected to the frame, the rear suspension assembly being disposed at least partly beneath the tunnel;

an endless track supported by the rear suspension assembly;

a motor supported by the frame, the motor being operatively connected to the endless track for propulsion of the snowmobile;

a drive shaft driven by the motor;

a driven shaft operatively connected to the endless track; and a continuously variable transmission (CVT) operatively connecting the drive shaft to the endless track, the CVT comprising:

a drive pulley mounted to the drive shaft, the drive pulley being operatively connected to the motor via the drive shaft;

a driven pulley mounted to the driven shaft, the driven shaft operatively connecting the driven pulley to the endless track;

a belt operatively connecting the drive pulley to the driven pulley; and a CVT housing enclosing the drive pulley, the driven pulley and the belt, the CVT housing having a rigid mounting portion connected to the frame and to the motor, the motor being resiliently connected to the rigid mounting portion to allow movement of the motor relative to the CVT housing.

2. The snowmobile of claim 1, wherein the rigid mounting portion defines an opening, the driven shaft extending into the CVT housing through the opening.

3. The snowmobile of claim 1, wherein the rigid mounting portion is connected to the tunnel.

4. The snowmobile of claim 1, wherein the rigid mounting portion is made of a metallic material.

5. The snowmobile of claim 1, wherein:

the rigid mounting portion comprises at least one outer flange;

the motor has at least one transmission mount for connecting the CVT housing thereto; and the snowmobile further comprises at least one interconnecting member connected between the at least one transmission mount and the at least one outer flange of the rigid mounting portion.

6. The snowmobile of claim 5, further comprising at least one damping element for resiliently connecting the rigid mounting portion of the CVT housing to the motor, each damping element of the at least one damping element being disposed between a corresponding one of the at least one transmission mount and the at least one outer flange of the rigid mounting portion; and wherein each damping element of the at least one damping element is made of elastomeric material.

7. The snowmobile of claim 6, wherein:

the drive shaft is an output shaft of the motor;

the motor is an internal combustion engine comprising: a crankcase;

a crankshaft disposed in the crankcase;

a cylinder block connected to the crankcase and defining at least one cylinder; and the output shaft operatively connected to the crankshaft; and the crankcase comprises the at least one transmission mount.

8. The snowmobile of claim 1, wherein:

the CVT housing comprises a back plate assembly defining a first opening and a second opening, the drive shaft and the driven shaft extending into the CVT housing through the first and second openings respectively;

the back plate assembly comprises at least two separate plate members connected to one another, one of the at least two separate plate members being the rigid mounting portion; and the rigid mounting portion defines at least one of the first opening and the second opening.

9. The snowmobile of claim 8, wherein the rigid mounting portion is made of a different material than other ones of the at least two separate plate members.

10. The snowmobile of claim 8, wherein:

the at least two separate plate members includes a first plate member, a second plate member and the rigid mounting portion;

the first plate member defines the first opening through which the drive shaft extends into the CVT housing; and the rigid mounting portion defines the second opening through which the driven shaft extends into the CVT housing.

11. The snowmobile of claim 8, wherein:

the motor is disposed on a first lateral side of the CVT;

the back plate assembly is disposed on the first lateral side of the CVT; and the CVT housing further comprises a housing cover connected to the back plate assembly, the housing cover being disposed on a second lateral side of the CVT opposite the first lateral side.

12. The snowmobile of claim 1, wherein the CVT housing defines an air inlet and an air outlet.

13. The snowmobile of claim 8, wherein:

the CVT housing further comprises a removable cover connected to the back plate assembly; and the drive pulley, the driven pulley and the belt are enclosed between the back plate assembly and the removable cover.

14. The snowmobile of claim 13, wherein the CVT housing further comprises a peripheral guard enclosed between the back plate assembly and the removable cover, the peripheral guard surrounding at least in part the belt of the CVT.

15. The snowmobile of claim 14, wherein:

the CVT housing defines an air inlet and an air outlet;

the peripheral guard defines at least in part the air outlet; and the removable cover defines at least in part the air inlet.

16. The snowmobile of claim 13, wherein the CVT housing further comprises an intermediate cover enclosed between the back plate assembly and the removable cover, the drive pulley being disposed between the intermediate cover and a fixed assembly.

17. The snowmobile of claim 13, wherein the CVT housing further comprises an acoustic member enclosed between the back plate assembly and the removable cover, the acoustic member being made of acoustic material to dampen noise emitted by the CVT, the acoustic member being at least partly vertically aligned with the drive pulley and the driven pulley.

18. The snowmobile of claim 1, wherein:

the CVT housing defines a drive opening, the drive shaft extending into the CVT housing through the drive opening;

the CVT further comprises a sealing member connected to the CVT housing and covering at least in part the drive opening, the sealing member surrounding a part of the motor extending through the drive opening to form a seal between the CVT housing and the part of the motor, the sealing member being configured to allow relative movement between the CVT housing and the motor;

the drive shaft is an output shaft of the motor;

the drive pulley is mounted to the output shaft and moves together with the motor relative to the CVT housing; and the driven pulley moves together with the CVT housing relative to the motor.

19. The snowmobile of claim 18, wherein:

during operation, the CVT housing is fixed relative to the frame;

the sealing member is a flexible sealing member; and the sealing member is disposed at least in part in the drive opening.

* * * * *